US012626144B2

(12) United States Patent
Li et al.

(10) Patent No.: US 12,626,144 B2
(45) Date of Patent: May 12, 2026

(54) DATA PROCESSING METHOD, FEDERATED LEARNING TRAINING METHOD, AND RELATED APPARATUS AND DEVICE

(71) Applicant: HUAWEI TECHNOLOGIES CO., LTD., Guangdong (CN)

(72) Inventors: Gang Li, Shenzhen (CN); Yunfeng Shao, Beijing (CN); Lei Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 253 days.

(21) Appl. No.: 17/989,777

(22) Filed: Nov. 18, 2022

(65) Prior Publication Data
US 2023/0082173 A1 Mar. 16, 2023

Related U.S. Application Data

(63) Continuation of application No. PCT/CN2021/072421, filed on Jan. 18, 2021.

(30) Foreign Application Priority Data

May 19, 2020 (CN) .......................... 202010427897.1

(51) Int. Cl.
| | |
|---|---|
| *G06N 3/098* | (2023.01) |
| *G06N 20/00* | (2019.01) |
| *H04L 9/40* | (2022.01) |

(52) U.S. Cl.
CPC ............. *G06N 3/098* (2023.01); *G06N 20/00* (2019.01); *H04L 63/0428* (2013.01)

(58) Field of Classification Search
None
See application file for complete search history.

(56) References Cited

U.S. PATENT DOCUMENTS

| | | | | |
|---|---|---|---|---|
| 11,276,001 | B1 * | 3/2022 | Sutherland | ............. G06V 10/95 |
| 2005/0268330 | A1 * | 12/2005 | Di Rienzo | .......... H04W 12/068 |
| | | | | 713/182 |

(Continued)

OTHER PUBLICATIONS

"Energy-efficient privacy-preserving data aggregation protocols based on slicing" posted at <https://jwcn-eurasipjournals.springeropen.com/articles/10.1186/s13638-020-1643-6> on Jan. 14, 2020 (Year: 2020).*

(Continued)

*Primary Examiner* — Scott B Christensen

(57) ABSTRACT

The technology of this application relates to a training method that includes a first terminal obtaining a to-be-trained first machine learning model from the server. The first terminal is any one of a plurality of terminals. The first terminal trains the first machine learning model by using local data stored by the first terminal, to obtain trained model parameters. The first terminal determines, based on a collaboration relationship, a first collaborative terminal corresponding to the first terminal, and sends a part or all of the trained model parameters of the first terminal to the server by using the first collaborative terminal. The collaboration relationship is delivered by the server to the first terminal. The foregoing manner can improve security of data exchange between the server and the terminal.

20 Claims, 22 Drawing Sheets

(56) References Cited

U.S. PATENT DOCUMENTS

| | | | |
|---|---|---|---|
| 2007/0140479 A1* | 6/2007 | Wang | H04L 9/30 |
| | | | 380/30 |
| 2017/0353855 A1* | 12/2017 | Joy | H04W 12/02 |
| 2021/0051169 A1* | 2/2021 | Karame | G06N 20/00 |

OTHER PUBLICATIONS

Lu et al., "Privacy-Preserving Asynchronous Federated Learning Mechanism for Edge Network Computing". Feb. 8, 2020 (Year: 2020).*

* cited by examiner

| $I_1$ | $I_2$ | $I_3$ | $I_4$ | $I_5$ | $I_6$ | $I_7$ | $I_8$ | $I_9$ | $I_{10}$ |
|---|---|---|---|---|---|---|---|---|---|
| 1 | 2 | 3 | 4 | 5 | 6 | 7 | 8 | 9 | 10 |

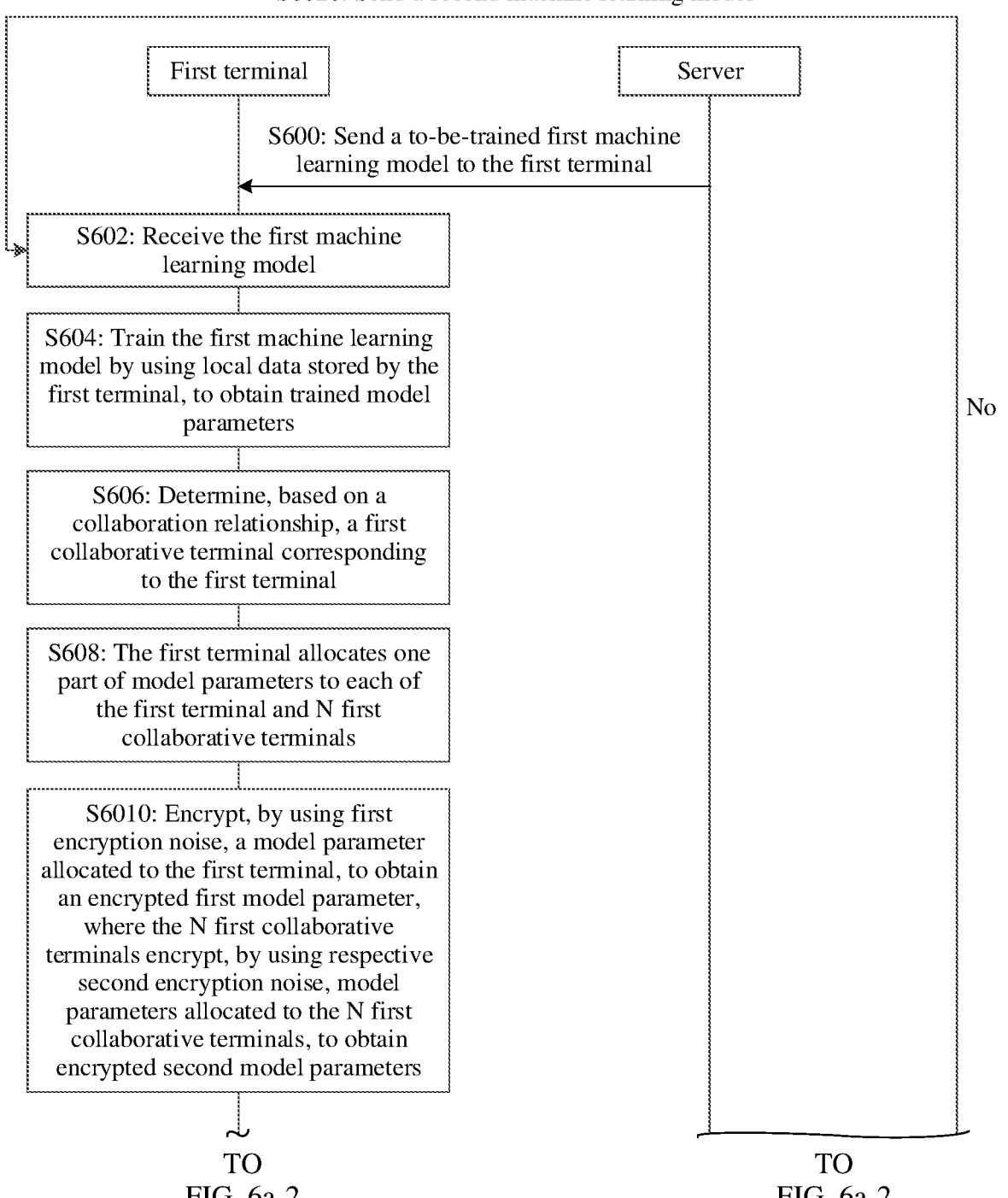

S6020: Send a second machine learning model

First terminal                                                    Server

S600: Send a to-be-trained first machine
learning model to the first terminal

S602: Receive the first machine
learning model

S604: Train the first machine learning
model by using local data stored by the
first terminal, to obtain trained model
parameters S606: Determine, based on a
collaboration relationship, a first
collaborative terminal corresponding
to the first terminal S608: The first terminal allocates one
part of model parameters to each of
the first terminal and N first
collaborative terminals S6010: Encrypt, by using first
encryption noise, a model parameter
allocated to the first terminal, to obtain
an encrypted first model parameter,
where the N first collaborative
terminals encrypt, by using respective
second encryption noise, model
parameters allocated to the N first
collaborative terminals, to obtain
encrypted second model parameters No TO
FIG. 6a-2

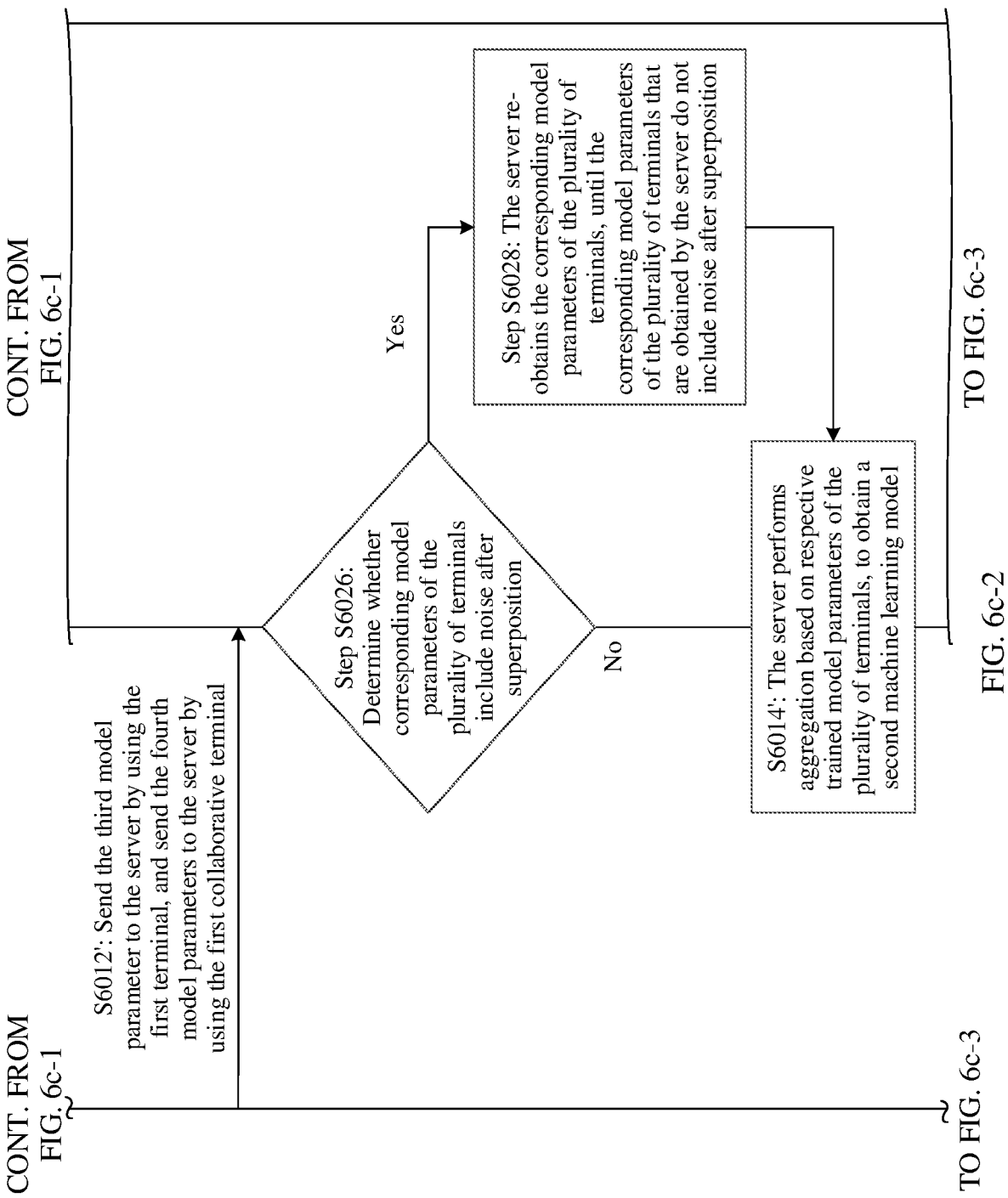

CONT. FROM
FIG. 6c-1

CONT. FROM
FIG. 6c-1

S6012': Send the third model parameter to the server by using the first terminal, and send the fourth model parameters to the server by using the first collaborative terminal Step S6026: Determine whether corresponding model parameters of the plurality of terminals include noise after superposition Yes Step S6028: The server re-obtains the corresponding model parameters of the plurality of terminals, until the corresponding model parameters of the plurality of terminals that are obtained by the server do not include noise after superposition No S6014': The server performs aggregation based on respective trained model parameters of the plurality of terminals, to obtain a second machine learning model TO FIG. 6c-3

CONT. FROM

S6016': Determine whether the trained second machine learning model meets a convergent state Yes S6018': Determine the second machine learning model as a trained result of a federated learning system S6022': Send the second machine learning model

CONT. FROM

S6024': Receive the second machine learning model

S700

Receive input data

S702

Input the received input data into a trained second machine learning model, and process the input data by using the second machine learning model, to obtain a processing result

S704

Output the processing result

DATA PROCESSING METHOD, FEDERATED LEARNING TRAINING METHOD, AND RELATED APPARATUS AND DEVICE

CROSS-REFERENCE TO RELATED APPLICATION(S)

This application is a continuation of International Application No. PCT/CN2021/072421, filed on Jan. 18, 2021, which claims priority to Chinese Patent Application No. 202010427897.1, filed on May 19, 2020. The disclosures of the aforementioned applications are hereby incorporated by reference in their entireties.

TECHNICAL FIELD

This application relates to the field of data security protection technologies, and in particular, to a data processing method, a federated learning training method, and a related apparatus and device.

BACKGROUND

With help of the Internet, big data, machine learning, and artificial intelligence technologies are evolving rapidly. Face-swipe payment, assisted diagnosis, personalized services, and the like are gradually popular and profoundly change production and lifestyle of people. However, behind these smart products, a large amount of sensitive personal data such as physiological features, medical records, and social networks of users are recklessly collected by enterprises and institutions at any moment. Large-scale data collection can improve machine learning performance and achieve both economic and social benefits, which, however, also brings greater risks and challenges to personal privacy protection, as mainly presented in the following two aspects: First, data leaks are frequently caused by unreliable data collectors, which not only causes great economic and reputation losses to enterprises, but also poses great threats to social stability and national security. Second, numerous studies have shown that attackers can perform backward inference by analyzing output results of machine learning models, to obtain sensitive information of individuals in training data.

In conventional machine learning training, various data is first collected by a data collector in a centralized manner, and then model training is performed by a data analyzer. This mode is referred to as centralized learning. The data collector and the data analyzer may be a same party, for example, a mobile application developer. Alternatively, the data collector and the data analyzer may be different parties. For example, the developer shares the data with another data analysis institution. It can be learned that, in the centralized learning mode, for users, once data is collected, it is difficult to have control over the data, and it is not clear where and how the data is to be used. In recent years, some researchers have tried to train a global model while keeping various data locally. A typical example of this work is federated learning proposed by Google in 2017. Specifically, a plurality of federal clients in a federated learning system do not give their own data during model training, but train local models based on a global model parameter delivered by a server and local data sets of the clients, and return local model parameters for aggregation by the server to update the global model parameter. An updated global model parameter is re-delivered to the clients, so that the clients may perform retraining based on the updated global model parameter by using local data. Such steps of "uploading" and "delivering" are repeated a plurality of times, until the server determines that a trained machine learning model meets a convergent state. In this way, a federated learning training process can be completed. In actual application, the local data of the clients and the local models of the clients are not transmitted, and the local data is not subject to backward inference. Federated learning can protect data privacy while maintaining data integrity to a relatively high degree.

It can be learned that, federated learning can complete model training without sharing the local data with the server, and achieve an effect of conventional centralized learning training. However, an existing federated learning training method cannot ensure security of the model parameter uploaded by the client to the server. If the model parameter is stolen by an attacker outside the federated learning system, the attacker may restore the local data of the client by using the model parameter or reconstruct the local model based on the model parameter. This brings a great risk of data leakage to the client. Therefore, how to improve security of data in federated learning is a technical problem that needs to be resolved urgently.

SUMMARY

This application provides a data processing method, a federated learning training method, and a related apparatus and device. When a machine learning model is trained by using a federated learning system, each terminal in the federated learning system may send a trained model parameter of each terminal to a server by using a collaborative terminal that has a collaboration relationship with the terminal, to improve security of data exchange between the server and the terminal.

According to a first aspect, a federated learning training method is provided. The method is applied to a federated learning system, the federated learning system includes a server and a plurality of terminals, the server stores a corresponding collaboration relationship of each terminal in the federated learning system, and the collaboration relationship indicates a corresponding collaborative terminal of each terminal. The method includes: A first terminal obtains a to-be-trained first machine learning model from the server. The first terminal is any one of the plurality of terminals. The first terminal trains the first machine learning model by using local data stored by the first terminal, to obtain trained model parameters. The first terminal determines, based on a collaboration relationship, a first collaborative terminal corresponding to the first terminal, and sends a part (or all) of the trained model parameters of the first terminal to the server by using the first collaborative terminal. The collaboration relationship is delivered by the server to the first terminal. When the server aggregates trained model parameters of the plurality of terminals to obtain a second machine learning model that meets a convergent state, the server determines the second machine learning model as a trained result of the federated learning system.

By implementing this embodiment of this application, when the machine learning model is trained by using the federated learning system, each terminal in the federated learning system may send trained model parameters of each terminal to the server by using a collaborative terminal that has a collaboration relationship with the terminal. This can prevent an attacker from obtaining the trained model parameters of each terminal after attacking the terminal, to avoid a potential risk of data leakage, thereby improving security of data exchange between the server and the terminal.

In a possible implementation, the sending a part or all of the trained model parameters of the first terminal to the server by using the first collaborative terminal includes: sending all the trained model parameters of the first terminal to the server by using the first collaborative terminal; or sending the trained model parameters of the first terminal to the server jointly by using the first terminal and the first collaborative terminal. By implementing this embodiment of this application, when the machine learning model is trained by using the federated learning system, each terminal in the federated learning system may send all trained model parameters of each terminal to the server by using a collaborative terminal that has a collaboration relationship with the terminal, or each terminal may send trained model parameters of each terminal to the server by using the terminal and a collaborative terminal that has a collaboration relationship with the terminal. This can prevent an attacker from obtaining the trained model parameters of each terminal after attacking the terminal, to avoid a potential risk of data leakage, thereby improving security of data exchange between the server and the terminal.

In a possible implementation, the method further includes: The first terminal determines a quantity of first collaborative terminals required in collaboration with the first terminal to send the model parameters to the server. That the first terminal determines, based on a collaboration relationship, a first collaborative terminal corresponding to the first terminal includes: The first terminal determines the first collaborative terminal based on the determined quantity and the collaboration relationship. By implementing this embodiment of this application, each terminal in the federated learning system may determine, based on a quantity of collaborative terminals and a collaboration relationship, a collaborative terminal corresponding to the terminal. When the machine learning model is trained by using the federated learning system, each terminal in the federated learning system may send all trained model parameters of each terminal to the server by using the determined collaborative terminal, or each terminal may send trained model parameters of each terminal to the server together with the determined collaborative terminal. This can prevent an attacker from obtaining the trained model parameters of each terminal after attacking the terminal, to avoid a potential risk of data leakage, thereby improving security of data exchange between the server and the terminal.

In a possible implementation, a quantity of first collaborative terminals corresponding to the first terminal is N. When a part of the trained model parameters of the first terminal are sent to the server by using the first collaborative terminal, the trained model parameters of the first terminal are divided into N+1 parts. N is a positive integer greater than 1. After the first terminal determines, based on the collaboration relationship, the first collaborative terminal corresponding to the first terminal, before the sending a part or all of the trained model parameters of the first terminal to the server by using the first collaborative terminal, the method further includes: The first terminal allocates one part of model parameters to each of the first terminal and the N first collaborative terminals. Different terminals correspond to different model parameters. The first terminal encrypts, by using first encryption noise, a model parameter allocated to the first terminal, to obtain an encrypted first model parameter. The N first collaborative terminals encrypt, by using respective second encryption noise, model parameters allocated to the N first collaborative terminals, to obtain encrypted second model parameters. No noise is included after superposition of the first encryption noise and the respective second encryption noise of the N first collaborative terminals. The sending a part or all of the trained model parameters of the first terminal to the server by using the first collaborative terminal includes: sending the first model parameter to the server by using the first terminal, and sending the second model parameters to the server by using the first collaborative terminals. By implementing this embodiment of this application, when the machine learning model is trained by using the federated learning system, each terminal in the federated learning system may send a part of the trained model parameters of each terminal to the server by using a collaborative terminal that has a collaboration relationship with the terminal. Herein, the trained model parameters of each terminal are model parameters obtained by using respective encryption noise by each terminal and the collaborative terminal corresponding to each terminal. This can prevent an attacker from obtaining the trained model parameters of each terminal after attacking the terminal, to avoid a potential risk of data leakage, thereby improving security of data exchange between the server and the terminal.

In a possible implementation, a quantity of first collaborative terminals corresponding to the first terminal is N. When all the trained model parameters of the first terminal are sent to the server by using the first collaborative terminal, the trained model parameters of the first terminal include N parts. N is a positive integer greater than 1. After the first terminal determines, based on the collaboration relationship, the first collaborative terminal corresponding to the first terminal, before the sending a part or all of the trained model parameters of the first terminal to the server by using the first collaborative terminal, the method further includes: The first terminal allocates one part of model parameters to each of the N first collaborative terminals. Different terminals correspond to different model parameters. The first terminal encrypts target data by using first encryption noise, to obtain an encrypted third model parameter. The target data is null. The N first collaborative terminals encrypt, by using respective second encryption noise, model parameters allocated to the N first collaborative terminals, to obtain encrypted fourth model parameters. No noise is included after superposition of the first encryption noise and the respective second encryption noise of the N first collaborative terminals. The sending a part or all of the trained model parameters of the first terminal to the server by using the first collaborative terminal includes: sending the third model parameter to the server by using the first terminal, and sending the fourth model parameters to the server by using the first collaborative terminal. By implementing this embodiment of this application, when the machine learning model is trained by using the federated learning system, each terminal in the federated learning system may send all trained model parameters of each terminal to the server by using a collaborative terminal that has a collaboration relationship with the terminal. Herein, the trained model parameters of each terminal are model parameters obtained by using respective encryption noise by each terminal and the collaborative terminal corresponding to each terminal. This can prevent an attacker from obtaining the trained model parameters of each terminal after attacking the terminal, to avoid a potential risk of data leakage, thereby improving security of data exchange between the server and the terminal.

In a possible implementation, the server stores a corresponding public key of each terminal in the federated learning system, the terminal in the federated learning system stores a public key that is delivered by the server and that corresponds to a collaborative terminal having a collaboration relationship with the terminal, the N first collaborative terminals include a first collaborative sub-terminal, and the method further includes: The first terminal generates the first encryption noise based on a random seed. The first terminal encrypts the first encryption noise by using a public key corresponding to the first collaborative sub-terminal, to obtain first intermediate noise. The first intermediate noise is used by the first collaborative sub-terminal to decrypt the first intermediate noise by using a private key corresponding to the first collaborative sub-terminal, to obtain the second encryption noise; and the first collaborative sub-terminal is any one of the N first collaborative terminals. By implementing this embodiment of this application, each terminal in the federated learning system may generate respective encryption noise by using a random seed and a public key corresponding to a collaborative terminal, so that model parameters may be encrypted by using the generated encryption noise, thereby improving security of data transmitted by the terminal to the server.

In a possible implementation, the trained model parameters of the first terminal are compressed model parameters. By implementing this embodiment of this application, when it is ensured that accuracy of the machine learning model does not change, the terminal in the federated learning system may send compressed model parameters to the server, thereby improving efficiency of data transmission between the terminal and the server.

In a possible implementation, the trained model parameters of the first terminal include corresponding index values, and the index values are used to represent storage addresses corresponding to the model parameters. The sending a part or all of the trained model parameters of the first terminal to the server by using the first collaborative terminal includes: The first terminal sends, to the first collaborative terminal, an index value corresponding to a model parameter that needs to be sent by the first terminal to the server by using the first collaborative terminal. The first collaborative terminal obtains the corresponding model parameter based on the index value, and sends the obtained model parameter to the server.

According to a second aspect, an embodiment of this application provides another federated learning training method. The method is applied to a federated learning system, the federated learning system includes a server and a plurality of terminals, the server stores a corresponding collaboration relationship of each terminal in the federated learning system, the collaboration relationship indicates a corresponding collaborative terminal of each terminal, and the method may include: The server sends a to-be-trained first machine learning model to each of the plurality of terminals. The server obtains a part or all of model parameters that are determined by each of the plurality of terminals based on the collaboration relationship and that are sent by the collaborative terminal. The plurality of model parameters are obtained by each terminal by training the first machine learning model by using local data stored by the terminal, and the collaboration relationship is delivered by the server to the terminal. The server aggregates the plurality of model parameters to obtain a second machine learning model. When the server determines that the second machine learning model meets a convergent state, the server determines the second machine learning model as a trained result of the federated learning system.

By implementing this embodiment of this application, when the machine learning model is trained by using the federated learning system, each terminal in the federated learning system may send trained model parameters of each terminal to the server by using a collaborative terminal that has a collaboration relationship with the terminal. This can prevent an attacker from obtaining the trained model parameters of each terminal after attacking the terminal, to avoid a potential risk of data leakage, thereby improving security of data exchange between the server and the terminal.

In a possible implementation, the plurality of model parameters are model parameters obtained through encryption by using respective encryption noise by each terminal and the collaborative terminal corresponding to each terminal. Before the server aggregates the plurality of model parameters to obtain a second machine learning model, the method further includes: The server determines whether corresponding model parameters of the plurality of terminals include noise after superposition. If no noise is included, the server performs the step of aggregating, by the server, the plurality of model parameters to obtain a second machine learning model. That the server aggregates the plurality of model parameters to obtain a second machine learning model includes: The server performs average calculation on the plurality of model parameters to obtain a global model parameter, and trains the first machine learning model based on the global model parameter to obtain the second machine learning model. By implementing this embodiment of this application, because the plurality of model parameters obtained by the server are model parameters obtained through encryption by using the respective encryption noise by each terminal and the collaborative terminal corresponding to each terminal, when the server determines that the corresponding model parameters of the plurality of terminals do not include noise after superposition, training may be performed based on the plurality of model parameters. This can avoid a failure to cancel encryption noise, thereby avoiding adverse impact (for example, an accuracy decrease of the machine learning model) caused by noise on accuracy of the machine learning model.

In a possible implementation, the method further includes: If noise is included, the server re-obtains the corresponding model parameters of the plurality of terminals, until the corresponding model parameters of the plurality of terminals that are obtained by the server do not include noise after superposition. By implementing this embodiment of this application, because the plurality of model parameters obtained by the server are model parameters obtained through encryption by using the respective encryption noise by each terminal and the collaborative terminal corresponding to each terminal, when the server determines that the corresponding model parameters of the plurality of terminals include noise after superposition, the server may re-obtain the corresponding model parameters of the plurality of terminals, to avoid a failure to cancel encryption noise, thereby avoiding adverse impact (for example, an accuracy decrease of the machine learning model) caused by noise on accuracy of the machine learning model.

According to a third aspect, an embodiment of this application provides a data processing method. The method includes: receiving input data; inputting the input data into a trained second machine learning model, and processing the input data by using the second machine learning model, to obtain a processing result, where the trained second machine learning model is obtained by using the federated learning training method according to the first aspect or the second aspect; and outputting the processing result.

By implementing this embodiment of this application, because the second machine learning model is obtained by performing training by using corresponding local data of a plurality of different terminals, regardless of whether the local data of the terminals differs greatly or little, in this implementation, the trained second machine learning model can have a strong generalization capability, and when the input data is processed by using the trained second machine learning model, processing accuracy of the input data can be improved. For example, when the input data is an image, image recognition accuracy can be improved. For another example, when the input data is voice, voice recognition accuracy can be improved.

According to a fourth aspect, an embodiment of this application provides a terminal. The terminal is used in a federated learning system, the federated learning system includes a server and a plurality of terminals, the server stores a corresponding collaboration relationship of each terminal in the federated learning system, the collaboration relationship indicates a corresponding collaborative terminal of each terminal, and a first terminal includes: an obtaining unit, configured to obtain a to-be-trained first machine learning model from the server, where the first terminal is any one of the plurality of terminals; a training unit, configured to train the first machine learning model by using local data stored by the first terminal, to obtain trained model parameters; a first determining unit, configured to determine, based on a collaboration relationship, a first collaborative terminal corresponding to the first terminal; and a sending unit, configured to send a part or all of the trained model parameters of the first terminal to the server by using the first collaborative terminal, where the collaboration relationship is delivered by the server to the first terminal; and when the server aggregates trained model parameters of the plurality of terminals to obtain a second machine learning model that meets a convergent state, the server determines the second machine learning model as a trained result of the federated learning system.

By implementing this embodiment of this application, when the machine learning model is trained by using the federated learning system, each terminal in the federated learning system may send trained model parameters of each terminal to the server by using a collaborative terminal that has a collaboration relationship with the terminal. This can prevent an attacker from obtaining the trained model parameters of each terminal after attacking the terminal, to avoid a potential risk of data leakage, thereby improving security of data exchange between the server and the terminal.

In a possible implementation, the sending unit is specifically configured to: send all the trained model parameters of the first terminal to the server by using the first collaborative terminal; or send the trained model parameters of the first terminal to the server jointly by using the first terminal and the first collaborative terminal.

In a possible implementation, the first terminal further includes: a second determining unit, configured to determine a quantity of first collaborative terminals required in collaboration with the first terminal to send the model parameters to the server. The first determining unit is specifically configured to: the first terminal determines the first collaborative terminal based on the determined quantity and the collaboration relationship.

In a possible implementation, a quantity of first collaborative terminals corresponding to the first terminal is N. When a part of the trained model parameters of the first terminal are sent to the server by using the first collaborative terminal, the trained model parameters of the first terminal include N+1 parts. N is a positive integer greater than 1. The first terminal further includes:

a first processing unit, configured to: allocate one part of model parameters to each of the first terminal and the N first collaborative terminals, where different terminals correspond to different model parameters; and encrypt, by using first encryption noise, a model parameter allocated to the first terminal, to obtain an encrypted first model parameter, where the N first collaborative terminals encrypt, by using respective second encryption noise, model parameters allocated to the N first collaborative terminals, to obtain encrypted second model parameters; and no noise is included after superposition of the first encryption noise and the respective second encryption noise of the N first collaborative terminals. The sending unit is specifically configured to: send the first model parameter to the server by using the first terminal, and send the second model parameters to the server by using the first collaborative terminals.

In a possible implementation, a quantity of first collaborative terminals corresponding to the first terminal is N. When all the trained model parameters of the first terminal are sent to the server by using the first collaborative terminal, the trained model parameters of the first terminal include N parts. N is a positive integer greater than 1. The first terminal further includes: a second processing unit, configured to: allocate one part of model parameters to each of the N first collaborative terminals, where different terminals correspond to different model parameters; and encrypt target data by using first encryption noise, to obtain an encrypted third model parameter, where the target data is null; the N first collaborative terminals encrypt, by using respective second encryption noise, model parameters allocated to the N first collaborative terminals, to obtain encrypted fourth model parameters; and no noise is included after superposition of the first encryption noise and the respective second encryption noise of the N first collaborative terminals. The sending unit is specifically configured to: send the third model parameter to the server by using the first terminal, and send the fourth model parameters to the server by using the first collaborative terminal.

In a possible implementation, the server stores a corresponding public key of each terminal in the federated learning system, the terminal in the federated learning system stores a public key that is delivered by the server and that corresponds to a collaborative terminal having a collaboration relationship with the terminal, the N first collaborative terminals include a first collaborative sub-terminal, and the first terminal further includes: a noise encryption unit, configured to: generate the first encryption noise based on a random seed; and encrypt the first encryption noise by using a public key corresponding to the first collaborative sub-terminal, to obtain first intermediate noise, where the first intermediate noise is used by the first collaborative sub-terminal to decrypt the first intermediate noise by using a private key corresponding to the first collaborative sub-terminal, to obtain the second encryption noise; and the first collaborative sub-terminal is any one of the N first collaborative terminals.

In a possible implementation, the trained model parameters of the first terminal include corresponding index values, and the index values are used to represent storage addresses corresponding to the model parameters. The sending unit is specifically configured to: the first terminal sends, to the first collaborative terminal, an index value corresponding to a model parameter that needs to be sent by the first terminal to the server by using the first collaborative terminal. The first collaborative terminal obtains the corresponding model parameter based on the index value, and sends the obtained model parameter to the server.

According to a fifth aspect, an embodiment of this application provides a server. The server is used in a federated learning system, the federated learning system includes the server and a plurality of terminals, the server stores a corresponding collaboration relationship of each terminal in the federated learning system, the collaboration relationship indicates a corresponding collaborative terminal of each terminal, and the server includes: a sending unit, configured to send a to-be-trained first machine learning model to each of the plurality of terminals; an obtaining unit, configured to obtain a part or all of model parameters that are determined by each of the plurality of terminals based on the collaboration relationship and that are sent by the collaborative terminal, where the plurality of model parameters are obtained by each terminal by training the first machine learning model by using local data stored by the terminal, and the collaboration relationship is delivered by the server to the terminal; a training unit, configured to aggregate the plurality of model parameters to obtain a second machine learning model; and a determining unit, configured to: when the server determines that the second machine learning model meets a convergent state, the server determines the second machine learning model as a trained result of the federated learning system.

By implementing this embodiment of this application, when the machine learning model is trained by using the federated learning system, each terminal in the federated learning system may send trained model parameters of each terminal to the server by using a collaborative terminal that has a collaboration relationship with the terminal. This can prevent an attacker from obtaining the trained model parameters of each terminal after attacking the terminal, to avoid a potential risk of data leakage, thereby improving security of data exchange between the server and the terminal.

In a possible implementation, the plurality of model parameters are model parameters obtained through encryption by using respective encryption noise by each terminal and the collaborative terminal corresponding to each terminal. The server further includes: a judging unit, configured to determine whether corresponding model parameters of the plurality of terminals include noise after superposition; and a first execution unit, configured to: when the judging unit determines that the corresponding model parameters of the plurality of terminals do not include noise after superposition, perform the step of aggregating, by the training unit, the plurality of model parameters to obtain a second machine learning model. The training unit is specifically configured to: perform average calculation on the plurality of model parameters to obtain a global model parameter, and train the first machine learning model based on the global model parameter to obtain the second machine learning model.

In a possible implementation, the server further includes: a second execution unit, configured to: when the judging unit determines that the corresponding model parameters of the plurality of terminals include noise after superposition, re-obtain the corresponding model parameters of the plurality of terminals, until the corresponding model parameters of the plurality of terminals that are obtained by the server do not include noise after superposition.

According to a sixth aspect, an embodiment of this application provides a data processing apparatus. The apparatus may include: a receiving unit, configured to receive input data; a processing unit, configured to: input the input data into a trained second machine learning model, and process the input data by using the second machine learning model, to obtain a processing result, where the trained second machine learning model is obtained by using the federated learning training method according to the first aspect or the second aspect; and an output unit, configured to output the processing result.

By implementing this embodiment of this application, because the second machine learning model is obtained by performing training by using corresponding local data of a plurality of different terminals, regardless of whether the local data of the terminals differs greatly or little, in this implementation, the trained second machine learning model can have a strong generalization capability, and when the input data is processed by using the trained second machine learning model, processing accuracy of the input data can be improved. For example, when the input data is an image, image recognition accuracy can be improved. For another example, when the input data is voice, voice recognition accuracy can be improved.

According to a seventh aspect, an embodiment of this application provides another terminal. The terminal may include a memory and a processor. The memory is configured to store a computer program that supports the terminal in performing the foregoing method, the computer program includes program instructions, and the processor is configured to invoke the program instructions to perform the method in the first aspect.

According to an eighth aspect, an embodiment of this application provides another server. The server may include a memory and a processor. The memory is configured to store a computer program that supports the server in performing the foregoing method, the computer program includes program instructions, and the processor is configured to invoke the program instructions to perform the method in the second aspect.

According to a ninth aspect, an embodiment of this application provides a data processing device. The device may include a memory and a processor. The memory is configured to store a computer program that supports the data processing device in performing the foregoing method, the computer program includes program instructions, and the processor is configured to invoke the program instructions to perform the method in the third aspect.

According to a tenth aspect, an embodiment of this application further provides a computer-readable storage medium. The computer storage medium stores a computer program, the computer program includes program instructions, and when the program instructions are executed by a processor, the processor is enabled to perform the method in the first aspect.

According to an eleventh aspect, an embodiment of this application further provides a computer-readable storage medium. The computer storage medium stores a computer program, the computer program includes program instructions, and when the program instructions are executed by a processor, the processor is enabled to perform the method in the second aspect.

According to a twelfth aspect, an embodiment of this application further provides a computer-readable storage medium. The computer storage medium stores a computer program, the computer program includes program instructions, and when the program instructions are executed by a processor, the processor is enabled to perform the method in the third aspect.

According to a thirteenth aspect, an embodiment of this application further provides a computer program. The computer program includes computer software instructions, and when the computer software instructions are executed by a computer, the computer is enabled to perform any federated learning training method according to the first aspect.

According to a fourteenth aspect, an embodiment of this application further provides a computer program. The computer program includes computer software instructions, and when the computer software instructions are executed by a computer, the computer is enabled to perform any federated learning training method according to the second aspect.

According to a fifteenth aspect, an embodiment of this application further provides a computer program. The computer program includes computer software instructions, and when the computer software instructions are executed by a computer, the computer is enabled to perform any data processing method according to the third aspect.

BRIEF DESCRIPTION OF DRAWINGS

FIG. 6*a*-1 and FIG. 6*a*-2 are example schematic flowcharts of another federated learning training method according to an embodiment of this application;

FIG. 6*b*-1 and FIG. 6*b*-2 are example schematic flowcharts of another federated learning training method according to an embodiment of this application;

FIG. 6*c*-1 to FIG. 6*c*-3 are example schematic flowcharts of another federated learning training method according to an embodiment of this application;

DESCRIPTION OF EMBODIMENTS

Figure 1A:
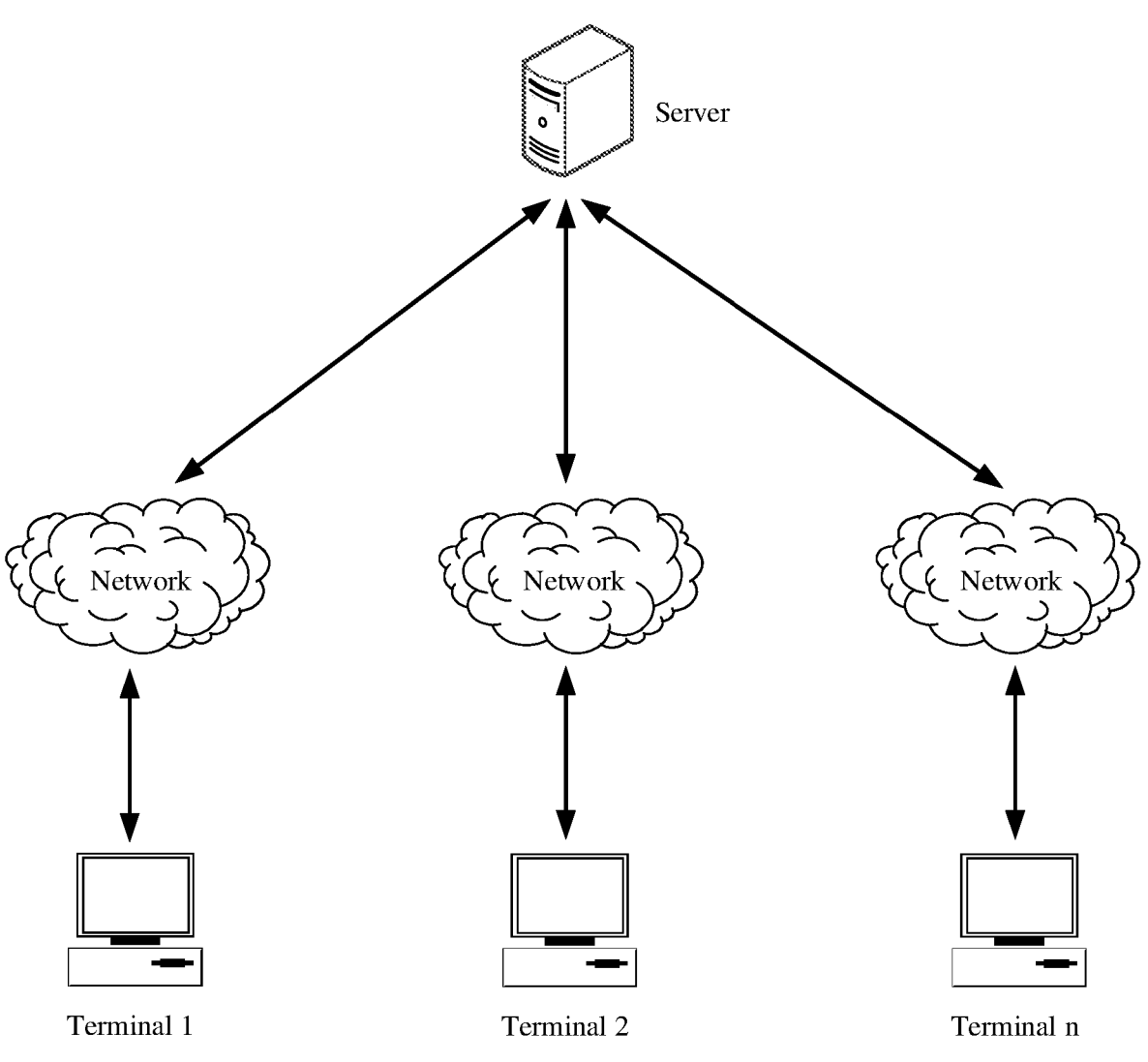
FIG. 1*a* is an example schematic diagram of a network architecture of a federated learning system according to an embodiment of this application.

The following clearly describes technical solutions in embodiments of this application with reference to accompanying drawings. It is clear that the described embodiments are merely some but not all embodiments of this application.

In the specification and accompanying drawings of this application, the terms "first", "second", and the like are intended to distinguish between different objects or distinguish between different processing on a same object, but do not indicate a particular order of the objects. In addition, the terms "including", "comprising", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. It should be noted that, in embodiments of this application, the term such as "example" or "for example" is used to represent giving an example, an illustration, or description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner. In embodiments of this application, "A and/or B" represents two meanings: A and B, and A or B. "A, and/or B, and/or C" represents any one of A, B, and C, or represents any two of A, B, and C, or represents A, B, and C. The following describes the technical solutions of this application with reference to the accompanying drawings.

With development of artificial intelligence (AI) technologies, algorithm accuracy usually depends on training and analysis of massive user data to further provide services such as personalized recommendation and context awareness. Therefore, a large amount of user personal information needs to be transmitted to different algorithms and systems. This situation undoubtedly increases a risk of user personal information leakage. In addition, some third-party applications may use user data without user authorization. Such a privacy data security problem is more prominent on A1 terminals. How to balance privacy protection and technology application becomes a problem that needs to be considered in development of the A1 terminal industry. Based on this, a federated learning network proposed by Google may be used as a terminal-side artificial intelligence algorithm, which has advantages such as instant response, reliability improvement, and privacy protection, and has gradually become one of development trends of model training.

In embodiments of this application, federated learning is also referred to as joint learning or alliance learning, and refers to designing a machine learning framework on a premise that privacy protection and data security are met, so that institutions collaborate without exchanging data, to improve a machine learning effect. A core of federated learning is to resolve problems of data silos and data privacy protection by establishing a data "federation" to benefit all participants, to promote overall continuous technological progress.

In embodiments of this application, an implementation policy of federated learning is establishing a virtual sharing model. The virtual sharing model is an optimal model (also referred to as a global model) established based on aggregated data. In actual application, data does not move when the virtual model is established. Therefore, this implementation does not leak privacy or violate a law. In addition, the established sharing model serves a local target only in a respective region. In such a federal mechanism, each participant has a same identity and status, thereby achieving "common prosperity". Herein, the sharing model may be specifically a machine learning model.

In embodiments of this application, the "machine learning model" is also referred to as a "model", for example, a "first machine learning model", a "second machine learning model", or a "third machine learning model", and may receive input data, and generate a predicted output based on the received input data and a current model parameter. The machine learning model may be a regression model, an artificial neural network (ANN), a deep neural network (DNN), a support vector machine (SVM), another machine learning model, or the like.

FIG. 1a is a schematic diagram of a network architecture of a federated learning system according to an embodiment of this application. As shown in FIG. 1a, the network architecture may include a plurality of terminals (for example, a terminal 1, a terminal 2, . . . , and a terminal n) and a server. The server is connected to the terminals. In actual application, the server may communicate with the plurality of terminals by using a network.

In this embodiment of this application, the "plurality of" should be understood as at least two. For example, there may be two, there may be three, or there may be four (or more).

Figure 1B:
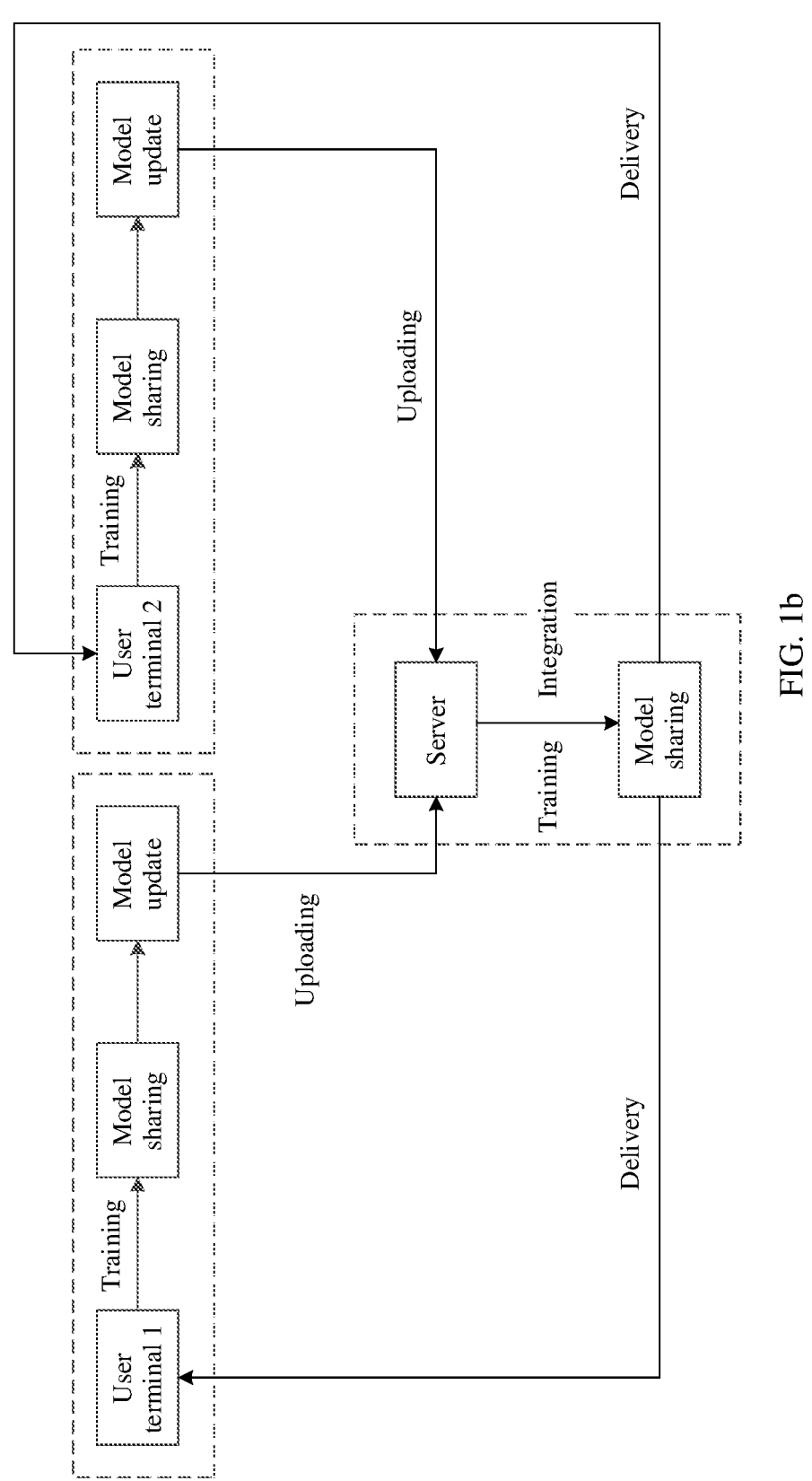
FIG. 1*b* is an example schematic diagram of a federated machine learning process according to an embodiment of this application.

In a conventional technology, a federated machine learning process may be shown in FIG. 1b, and includes the following steps:

Step A1: The server delivers a shared machine learning model to each terminal.

Step A2: Each terminal trains the model by using local data of the terminal, and uploads a trained model parameter (for example, a weight) to the server.

Step A3: The server performs weighted averaging on model parameters uploaded by the plurality of terminals, to obtain a new machine learning model.

Step A4: The server delivers an updated global model parameter to each terminal, and the terminal retrains the model by using the local data of the terminal to obtain a new model parameter, and uploads the model parameter obtained through retraining to the server for training. Training stops when a trained machine learning model on the server is in a convergent state.

Step A5: The server delivers the trained machine learning model to each terminal in the federated learning system.

So far, a training process of the machine learning model is completed by the federated learning system.

This implementation cannot ensure whether the model parameter uploaded by the terminal to the server is secure. If the model parameter is stolen by an attacker outside the federated learning system, the attacker may restore the local data of the terminal by using the model parameter or reconstruct the local model based on the model parameter. This brings a great risk of data leakage to the terminal. Based on this, a model parameter transmission process is improved in this application. For example, the terminal in the federated learning system may transmit model parameters to the server by using a collaborative terminal corresponding to the terminal. For another example, each terminal in the federated learning system and the collaborative terminal corresponding to each terminal encrypt, by using respective encryption noise, model parameters to be transmitted to the server. These implementations can prevent an attacker from obtaining the trained model parameters of each terminal after attacking the terminal, to avoid a potential risk of data leakage, thereby improving security of data exchange between the server and the terminal.

An embodiment of this application provides a federated learning training method. The training method is applied to training of a specific task/prediction model (referred to as a task model for short below). Specifically, the method may be used to train various task models constructed based on a deep learning network, which may include but are not limited to a classification model, a recognition model, a segmentation model, and a detection model. A task model (for example, a second machine learning model) obtained by using the training method described in this application may be widely applied to a plurality of specific application scenarios such as image recognition and audio recognition, to implement intelligent application scenarios.

Figure 1C:
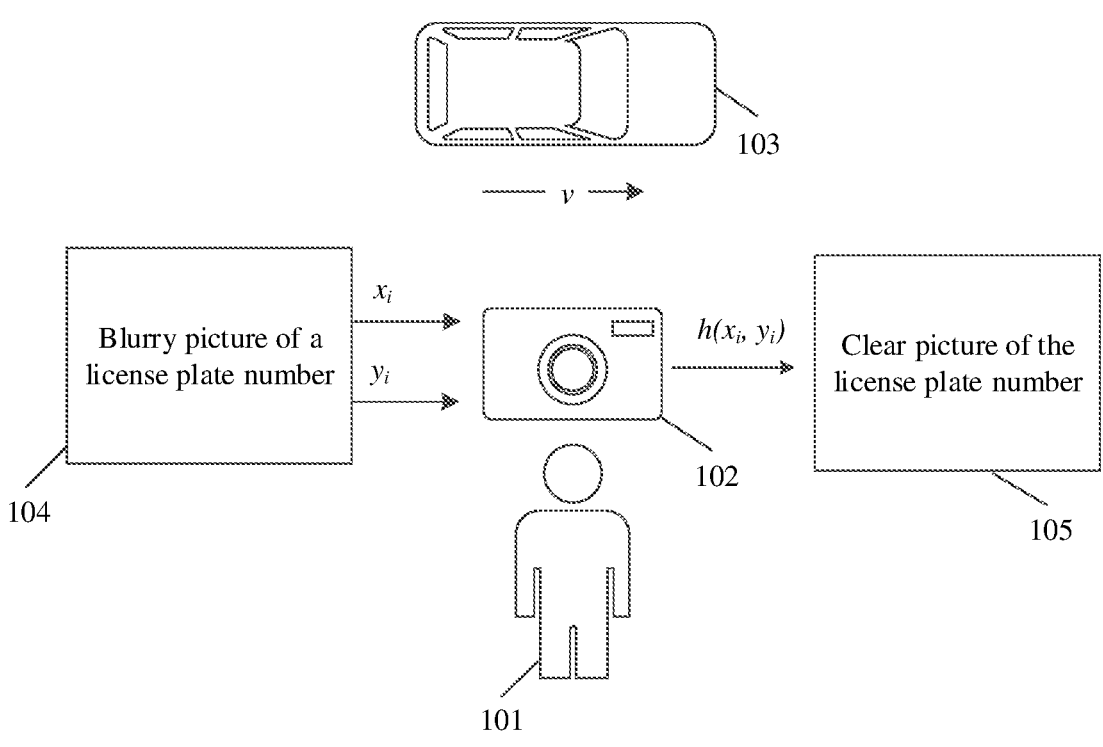
FIG. 1*c* is an example schematic diagram of a first application scenario according to an embodiment of this application.

First Application Scenario:

An image recognition application scenario is used as an example. In a specific implementation scenario, as shown in FIG. 1c, a car 103 runs on a road at a high speed, and a passerby 101 captures a license plate number of the car 103 by using a digital camera 102. However, because the car 103 has a relatively high speed v, a motion blur phenomenon occurs on an input signal 104 of the digital camera. The input signal is a two-dimensional digital image signal, and the digital camera 102 is equipped with a machine learning model 100. Specifically, the machine learning model is a machine learning model that is trained by using the federated learning system shown in FIG. 1a and described in this application, for example, a second machine learning model. Specifically, when the machine learning model is trained by using the federated learning system, so that the machine learning model on the server is in a convergent state (for example, a loss function converges), it indicates that a training stage of the machine learning model is completed, and the terminal may enter an application stage of the machine learning model. In actual application, the machine learning model may be implemented in a chip in a form of a dedicated circuit, or may be a software module running in an image signal processor. An output signal 105 is obtained after the input signal 104 is processed in the machine learning model in the digital camera 102. The processing includes car motion model estimation, motion blur removal, and the like. Definition of license plate number information included in the output signal is improved, and accurate recognition can be achieved.

Figure 1D:
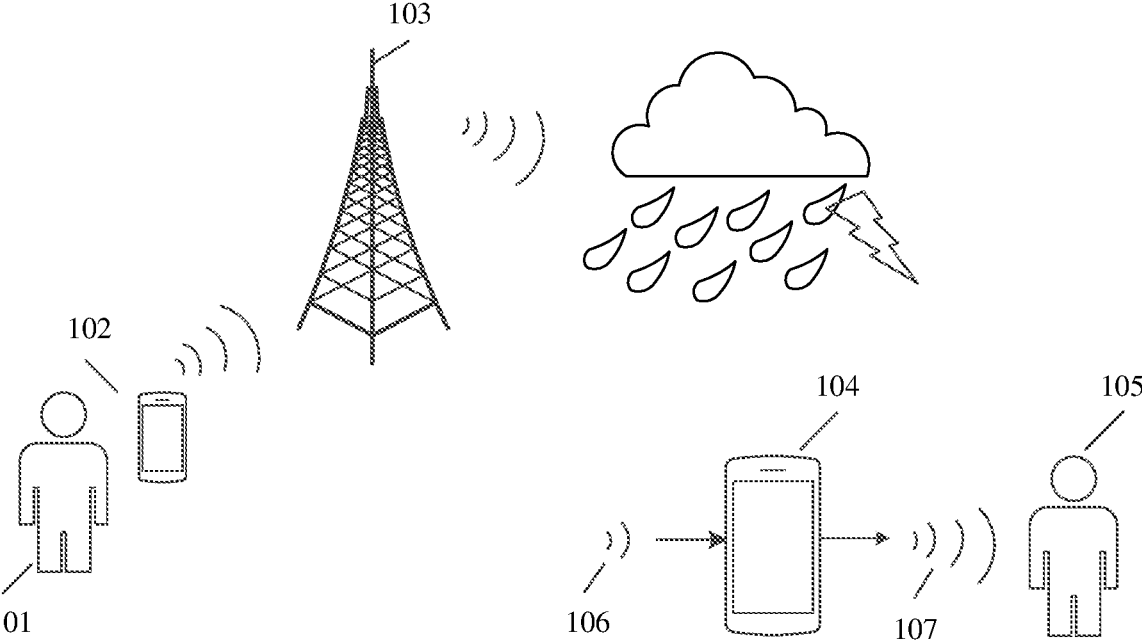
FIG. 1*d* is an example schematic diagram of a second application scenario according to an embodiment of this application.

Second Application Scenario:

Audio recognition is used as an example. In a specific implementation scenario, as shown in FIG. 1d, a neural network related processor is disposed in smartphones 102 and 104. Herein, the machine learning model is a machine learning model that is trained by using the federated learning system shown in FIG. 1a and described in this application, for example, a second machine learning model. When the machine learning model is trained by using the federated learning system, so that the machine learning model on the server is in a convergent state (for example, a loss function converges), it indicates that a training stage of the machine learning model is completed, and the terminal may enter an application stage of the machine learning model. For example, a mobile smartphone client 101 initiates a voice call to a mobile smartphone client 105. A voice signal is sent by the smartphone 102, and forwarded by a base station 103 to the smartphone 104. When the voice call is initiated, a heavy rainstorm occurs and is accompanied by a strong thunderstorm. As a result, an input signal 106 is severely weakened and includes relatively large noise. Herein, the input signal may be a one-dimensional digital voice signal. The smartphone 104 is equipped with a machine learning model. Specifically, the machine learning model may be implemented in a chip in a form of a dedicated circuit, or may be a program instruction running in a central processing unit (Central Processing Unit, CPU) or another processor. Therefore, the input signal 106 is processed in the machine learning model of the smartphone 104 to obtain an output signal 107. The processing includes noise removal, effective signal enhancement, and the like. The output signal completely retains voice information transmitted by a calling user, thereby avoiding interference from the harsh natural environment to the signal.

It should be noted that both the first application scenario and the second application scenario described above are merely examples, and should not constitute a limitation. It should be further noted that the first application scenario and the second application scenario are scenarios based on actual application on a terminal side.

In embodiments of this application, federated learning may be applied to different fields.

For example, in the financial field, a risk control model jointly established by a plurality of institutions can more accurately recognize credit risks and jointly counter fraud. A federal anti-money laundering model established by a plurality of banks can resolve problems of a small quantity of samples and low data quality in this field.

For another example, in the smart retail field, federated learning can effectively improve efficiency of information and resource matching. For example, a bank has features of purchasing power of users, a social platform has features of personal preferences of users, and an e-commerce platform has features of products. A conventional machine learning model cannot directly learn from heterogeneous data, while federated learning can perform joint modeling on a basis of protecting data privacy of the three parties, to provide more accurate product recommendation services for users to break down data barriers and build cross-field collaboration.

For another example, in the healthcare field, federated learning is more significant for improving a level of collaboration in the healthcare industry. In a process of promoting smart healthcare, patient privacy data such as symptoms, pathology reports, and test results is usually distributed in different types of medical institutions across different regions, such as a plurality of hospitals and clinics, and federated learning enables cross-regional collaboration between institutions without moving local data. A prediction model established by multi-party collaboration can predict cancer, genetic diseases, and other difficult diseases more accurately. If all medical institutions could establish a federated learning alliance, health care of people may step to a whole new level.

The following describes the method provided in this application from a model training side and a model application side.

A federated learning training method provided in embodiments of this application may relate to computer vision processing, natural language processing, and the like, and may be specifically applied to data processing methods such as data training, machine learning, and deep learning, to perform symbolic and formal intelligent information modeling, extraction, preprocessing, training, and the like on training data, to finally obtain a trained machine learning model (that is, a target model/rule). In addition, in a data processing method provided in embodiments of this application, the trained machine learning model may be used. Input data (for example, an image or a voice segment in this application) is input into the trained machine learning model, to obtain output data (for example, an image recognition result). It should be noted that the federated learning training method and the data processing method that are provided in embodiments of this application is technology generated based on a same concept, and may be understood as two parts in a system, or two stages of a complete procedure: a model training stage and a model application stage.

Embodiments of this application relate to a large quantity of machine learning model applications. Therefore, for ease of understanding, the following first describes related terms and concepts such as neural networks in embodiments of this application.

(1) Image/Video Recognition

In embodiments of this application, image/video recognition is recognizing, based on an image, a category to which the image belongs, an attribute of the image, or the like by using a related method such as image processing, machine learning, or computer graphics, for example, recognizing, in the first application scenario, a category to which the license plate number belongs.

(2) Text Recognition

In embodiments of this application, text recognition is also referred to as natural language recognition, and is recognizing, based on a text by using a related method such as linguistics, computer science, or artificial intelligence, an intent, an emotion, another attribute, or the like expressed by the text, for example, recognizing, in the second application scenario, an intent expressed by a text.

It should be noted that, in specific functions of the machine learning model described in this application, image/video recognition, text recognition, and the like are merely examples, and do not constitute a limitation.

(3) Neural Network

The neural network may include neurons. The neuron may be an operation unit that uses $x_s$ and an intercept $b$ as inputs, and an output of the operation unit may be:

$$h_{w,b}(x) = f(w^T x) = f\left(\sum_{s=1}^{n} w_s x_s + b\right) \qquad (1\text{-}1)$$

$s=1, 2, \ldots, n$, n is a natural number greater than 1, $w_s$ is a weight of $x_s$, b is a bias of the neuron, and $f$ is an activation function (activation function) of the neuron, and is configured to introduce a non-linear feature into the neural network to convert an input signal in the neuron into an output signal. The output signal of the activation function may be used as an input of a next convolutional layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(4) Deep Neural Network

The deep neural network (DNN) is also referred to as a multi-layer neural network, and may be understood as a neural network having many hidden layers. There is no special metric for "many" herein. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron in an $i^{th}$ layer is definitely connected to any neuron in an $(i+1)^{th}$ layer. Although the DNN seems complex, work of each layer is actually not complex, which is simply shown in the following linear relationship expression: $\vec{y}=\alpha(w\vec{x}+b)$, where $\vec{x}$ is an input vector, $\vec{y}$ is an output vector, b is a bias vector, w is a weight matrix (also referred to as a coefficient), and $\alpha(\ )$ is an activation function. At each layer, the output vector $\vec{y}$ is obtained by performing such a simple operation on the input vector $\vec{x}$. Because the DNN has many layers, there are also many coefficients w and bias vectors b. Definitions of these parameters in the DNN are as follows: The coefficient w is used as an example. It is assumed that in a three-layer DNN, a linear coefficient from the fourth neuron at the second layer to the second neuron at the third layer is defined as $$w_{24}^3.$$

The superscript 3 represents a layer at which the coefficient w is located, and the subscript corresponds to an output third-layer index 2 and an input second-layer index 4. It is concluded that, a coefficient from a $k^{th}$ neuron at an $(L-1)^{th}$ layer to a $j^{th}$ neuron at an $L^{th}$ layer is defined as $$w_{jk}^L.$$

It should be noted that the input layer does not have the parameter w. In the deep neural network, more hidden layers make the network more capable of describing a complex case in the real world. Theoretically, a model with more parameters is more complex, and has a larger "capacity", which means that the model can complete a more complex learning task. Training the deep neural network is a process of learning a weight matrix, and a final objective of the training is to obtain a weight matrix of all layers of the trained deep neural network (a weight matrix including vectors w at many layers).

(5) Convolutional Neural Network

The convolutional neural network (CNN) is a deep neural network with a convolutional structure. The convolutional neural network includes a feature extractor including a convolutional layer and a sub-sampling layer. The feature extractor may be considered as a filter. A convolution process may be considered as performing convolution on input data (such as image data, where the image data is used as an example for description) or a convolutional feature map by using a trainable filter. The convolutional layer is a neuron layer that is in the convolutional neural network and at which convolution processing is performed on an input signal. In the convolutional layer of the convolutional neural network, a neuron may be connected to only some neurons at an adjacent layer. One convolutional layer generally includes several feature maps. Each feature map may include some neurons arranged in a rectangle. Neurons in a same feature map share a weight. The shared weight herein is a convolution kernel. The shared weight may be understood as that a manner of extracting image information is unrelated to a position. An implied principle is that a part of an image has the same statistical information as another part. This means that image information learned from the part can be used for the another part. Therefore, the same image information obtained through learning can be used for all positions on the image. At the same convolutional layer, a plurality of convolution kernels may be used to extract different image information. Generally, a larger quantity of convolution kernels indicates more abundant image information reflected by a convolution operation.

The convolution kernel may be initialized in a form of a matrix of a random size. In a process of training the convolutional neural network, the convolution kernel may obtain a proper weight through learning. In addition, a direct benefit brought by the shared weight is reducing connections between layers of the convolutional neural network, and reducing a risk of overfitting.

(6) Recurrent Neural Network

The recurrent neural network (RNN) is used to process sequence data. A conventional neural network model starts from an input layer to a hidden layer and then to an output layer, and the layers are fully connected, while nodes in each layer are unconnected. Although this ordinary neural network resolves many problems, it is still incompetent to many problems. For example, if it is expected to predict a next word in a sentence, a preceding word usually needs to be used, because words in a sentence are not independent. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training of the RNN is the same as training of the conventional CNN or DNN. An error back propagation algorithm is also used, but there is a difference: If the RNN is expanded, a parameter such as w of the RNN is shared. This is different from the conventional neural network described in the foregoing example. In addition, during use of a gradient descent algorithm, an output in each step depends not only on a network in a current step, but also on a network status in several previous steps. This learning algorithm is referred to as a back propagation through time (BPTT).

Why is the recurrent neural network still required when the convolutional neural network is available? A reason is simple. In the convolutional neural network, there is a premise that elements are independent of each other, and an input and an output are also independent, such as a cat and a dog. However, in the real world, many elements are interconnected. For, the stock changes with time. For another example, a person says "I like traveling, and the most favorite place is Yunnan. In the future, when there is a chance, I will go to (_____). Herein, people should know that "Yunnan" is to be filled in. This is because peoples perform inference from the context. However, how do machines do that? Then, the RNN emerges. The RNN is intended to make the machine capable of memorizing like a person. Therefore, an output of the RNN needs to depend on current input information and historical memorized information.

(7) Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually a process before the first update, to be specific, parameters are pre-configured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

For example, in embodiments of this application, a target model/rule may be a trained machine learning model. For example, the trained neural network is a second machine learning model. The target model/rule may implement processing on input data. For example, when the input data is an image, accurate image recognition may be performed. For another example, when the input data is a text, accurate text recognition may be performed. Therefore, a determining result of the target model/rule on the input data is compared with a real result that is actually expected, and then a weight vector of each layer of neural network in an initial model is updated based on a difference between the two (certainly, there is usually a process before the first update, that is, a parameter is preconfigured for each layer in the initial model). For example, if a value of the determining result of the target model/rule is higher, the weight vector is adjusted to obtain a lower value. The weight vector is continuously adjusted until the target model/rule can predict a value that is very close to the real result. Therefore, "how to compare the determining result with the real result to obtain a difference" needs to be predefined. This leads to a loss function or an objective function, which is an important equation for measuring the difference between the determining result and the real result. The loss function is used as an example. A larger output value (loss) of the loss function indicates a larger difference. In this case, training of the initial model turns to a process of minimizing the loss.

(8) Back Propagation Algorithm

The convolutional neural network may correct a value of a parameter in an initial super-resolution model in a training process according to an error back propagation (BP) algorithm, so that an error loss of reconstructing the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

(9) Collaborative Terminal

In embodiments of this application, the collaborative terminal is a terminal that is in a federated learning system and that performs data transmission in collaboration with another terminal. In actual application, the collaborative terminal may include various devices that can be used by a user, such as a mobile phone, a tablet computer, a personal digital assistant (PDA), and a mobile Internet device (MID). This is not specifically limited in embodiments of the present technology.

Figure 2A:
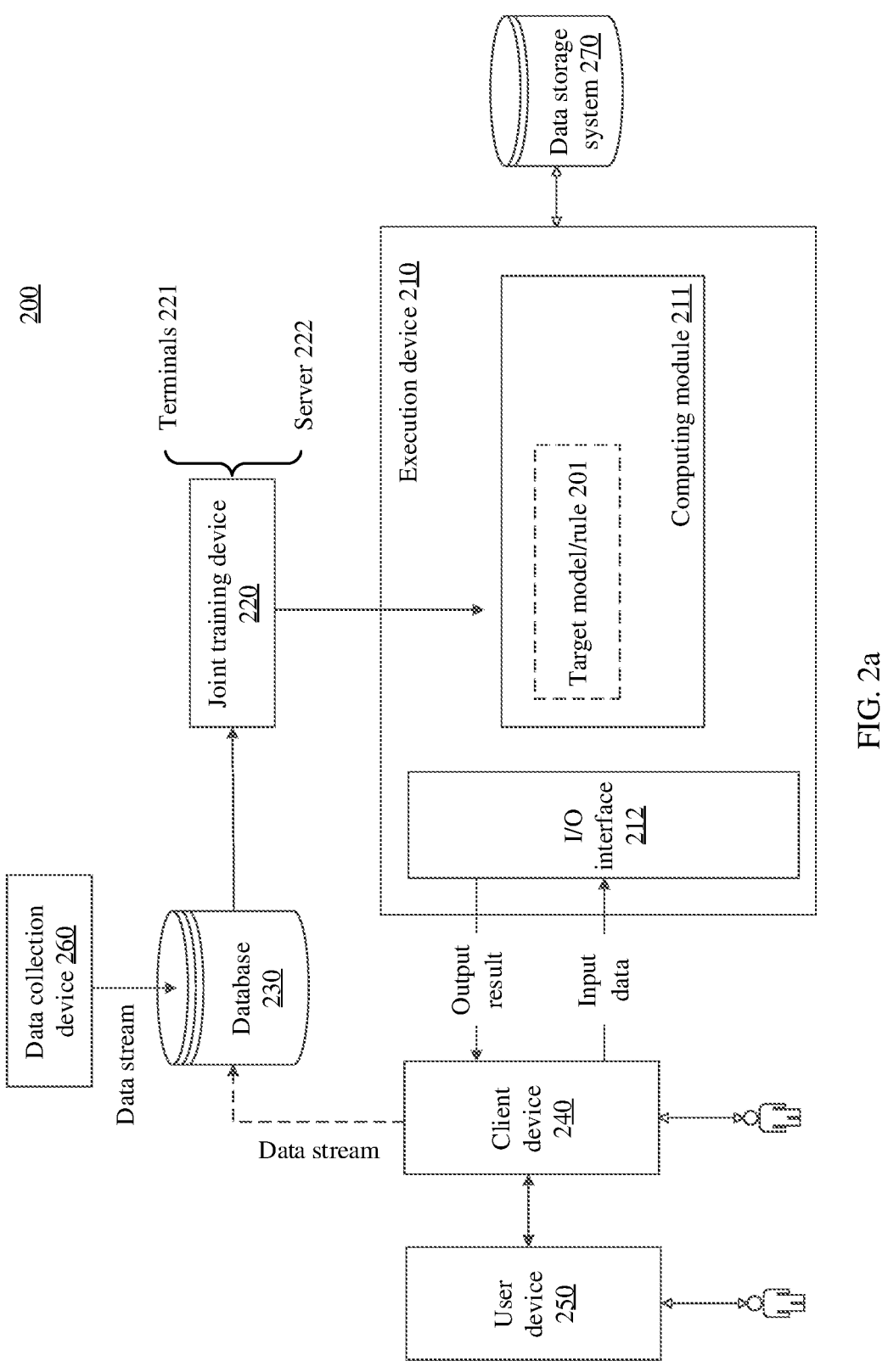
FIG. 2*a* is an example schematic diagram of a structure of a system architecture 200 according to an embodiment of this application.

The following describes a system architecture designed in embodiments of this application. Referring to FIG. 2a, an embodiment of this application provides a system architecture 200. As shown in the system architecture 200, a joint training device 220 includes a plurality of terminals 221 and a server 222. Each of the plurality of terminals 221 has a corresponding database. A data collection device 260 is configured to collect or generate training data, and store the training data in a database 230. In this embodiment of this application, the training data may be a plurality of images, a plurality of voice segments, or the like with tags. Each of the plurality of terminals 221 trains, based on training data maintained in the corresponding database 230, a machine learning model delivered by the server, to obtain trained model parameters, and then uploads the trained model parameters to the server, so that the server aggregates the plurality of model parameters, to generate a target model/rule 201.

Specifically, a process of training a machine learning model by using the joint training device 220 may include: A first terminal is used as an example. The first terminal is any one of the plurality of terminals 221. The first terminal 221 receives a first machine learning model and a collaboration relationship that are delivered by the server 222. The first terminal 221 trains the first machine learning model by using local data stored by the first terminal, to obtain trained model parameters. The first terminal 221 determines, based on the collaboration relationship, a first collaborative terminal corresponding to the first terminal, and sends a part or all of the trained model parameters of the first terminal to the server 222 by using the first collaborative terminal, so that the server 222 may obtain a plurality of model parameters. Then, the server 222 may aggregate the plurality of model parameters to obtain a second machine learning model. When the server 222 determines that the second machine learning model does not meet a convergent state (for example, a loss function converges), the joint training device 220 enters an iterative training process. Specifically, the iterative training process may include: The server delivers the second machine learning model to the first terminal 221, so that the first terminal 221 may retrain the second machine learning model by using the local data stored by the first terminal, to obtain retrained model parameters, and uploads the retrained model parameters to the server 222 for training, until the server 222 determines that the second machine learning model meets the convergent state, which indicates that the training process is completed. For a detailed description of how the joint training device 220 obtains a trained second machine learning model based on a training data set, refer to a related description in a subsequent embodiment. The trained second machine learning model can be used to implement the data processing method provided in embodiments of this application. That is, input data is input into the trained second machine learning model, and the input data is processed by using the second machine learning model, to obtain a processing result. Herein, the input data may be an image, a text, or the like.

In embodiments provided in this application, the target model/rule 201 is obtained by training a machine learning model (for example, the machine learning model is a deep neural network). It should be noted that in actual application, the training data maintained in the corresponding database 230 of each terminal is not necessarily all collected by the data collection device 260, and may be received from another device. In addition, it should be noted that each terminal does not necessarily perform training of the target model/rule 201 completely based on the training data maintained in the database 230, and may obtain training data from a cloud side or generate training data to perform model training. The foregoing description should not be construed as a limitation on embodiments of this application.

The target model/rule 201 obtained through training by the joint training device 220 may be applied to different systems or devices, for example, applied to an execution device 210 shown in FIG. 2*a*. The execution device 210 may be a terminal, for example, a mobile phone terminal, a tablet computer, a notebook computer, AR/VR, or an in-vehicle terminal, or may be a server, a cloud side, or the like. The execution device 210 may perform the data processing method in embodiments of this application. For example, the data processing method may include an image processing method and a text processing method. In FIG. 2*a*, an I/O interface 212 is configured in the execution device 210, to exchange data with an external device. A user may input data to the I/O interface 212 by using a client device 240. In this embodiment of this application, the input data may include a to-be-recognized image or video, or a to-be-recognized voice segment.

When a computing module 211 of the execution device 210 performs computing or other related processing, the execution device 210 may invoke data, code, and the like in a data storage system 270 for corresponding processing, and may store, in the data storage system 270, data, instructions, and the like that are obtained through corresponding processing.

Finally, the I/O interface 212 returns a processing result such as an image, video, or voice recognition result or classification result to the client device 240, so that the client device 240 can provide the result to a user device 250. The user device 250 may be a lightweight terminal that needs to use the target model/rule 201, for example, a mobile phone terminal, a laptop computer, an AR/VR terminal, or an in-vehicle terminal, to respond to a corresponding requirement of a terminal user, for example, perform image recognition on an image input by the terminal user and output a recognition result to the terminal user, or classify a text input by the terminal user and output a classification result to the terminal user.

It should be noted that the joint training device 220 may generate corresponding target models/rules 201 for different purposes, or referred to as different tasks, based on different training data, and the corresponding target models/rules 201 may be used to complete the tasks, to provide required results for users.

In a case shown in FIG. 2*a*, a user may manually specify data to be input into the execution device 210, for example, operating in an interface provided by the I/O interface 212. In another case, the client device 240 may automatically input data to the I/O interface 212 and obtain a result. If the client device 240 needs to be authorized by the user to automatically input the data, the user may set a corresponding right in the client device 240. The user may view, on the client device 240, the result output by the execution device 210. A specific presentation form may be a specific manner such as display, sound, or an action. The client device 240 may also serve as a data collection end, and store collected image data, video data, or voice data in the database 230.

After receiving the output result, the client device 240 may transmit the result to the user device 250. The user device 250 may be a terminal, such as a mobile phone terminal, a tablet computer, a notebook computer, AR/VR, or an in-vehicle terminal. In an example, the user device 250 may run the target model/rule 201 to implement a specific function.

It should be noted that FIG. 2*a* is merely a schematic diagram of a system architecture according to an embodiment of this application. A position relationship between a device, a component, a module, and the like shown in the figure constitutes no limitation. For example, in FIG. 2*a*, the data storage system 270 is an external memory relative to the execution device 210. In another case, the data storage system 270 may alternatively be configured in the execution device 210.

As shown in FIG. 2*a*, the target model/rule 201 is obtained through training based on the joint training device 220. The target model/rule 201 may be an image recognition model in the first application scenario and a voice recognition model in the second application scenario. Specifically, the target model/rule 201 provided in this embodiment of this application is, for example, an image recognition model, or for another example, a voice recognition model. In actual application, both the image recognition model and the voice recognition model may be convolutional neural network models.

For ease of understanding and convenience of description, in the embodiments of this application, an example in which a machine learning model is a convolutional neural network is used for further description. As described in the foregoing basic concept description, the convolutional neural network is a deep neural network with a convolutional structure, and is a deep learning architecture. The deep learning architecture refers to performing multi-level learning at different abstract levels by using a machine learning algorithm. As a deep learning architecture, the CNN is a feed-forward artificial neural network. Each neuron in the feed-forward artificial neural network may respond to an image input into the neural network.

Figure 2B:
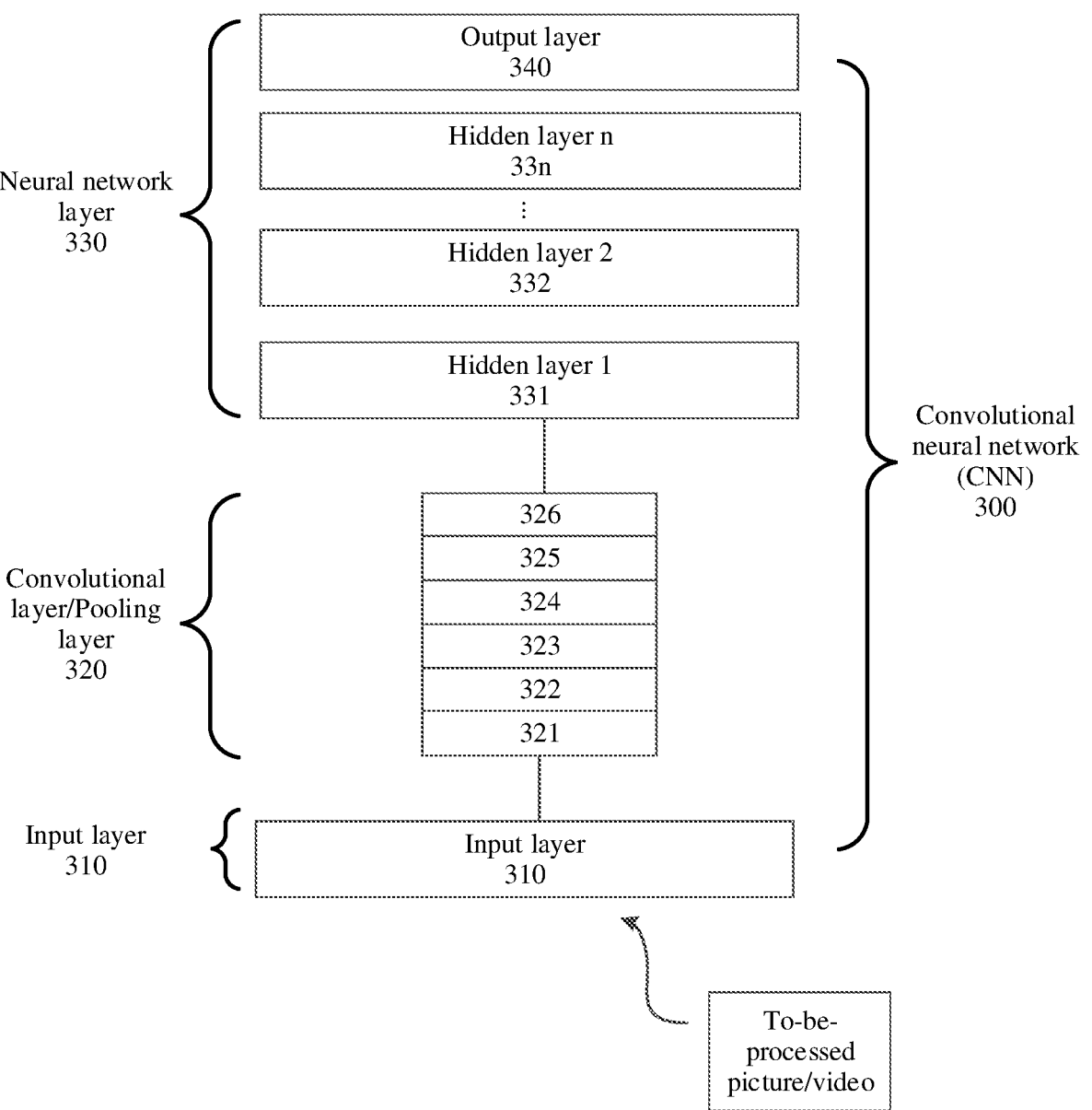
FIG. 2*b* is an example schematic diagram of a structure of a convolutional neural network according to an embodiment of this application.

In a possible implementation, as shown in FIG. 2*b*, a convolutional neural network (CNN) 300 may include an input layer 310, a convolutional layer/pooling layer 320 (the pooling layer is optional), and a neural network layer 330. Convolutional Layer/Pooling Layer 320:

Convolutional Layer:

As shown in FIG. 2*b*, the convolutional layer/pooling layer 320 may include, for example, layers 321 to 326. For example, in an implementation, the layer 321 is a convolutional layer, the layer 322 is a pooling layer, the layer 323 is a convolutional layer, the layer 324 is a pooling layer, the layer 325 is a convolutional layer, and the layer 326 is a pooling layer. In another implementation, the layers 321 and 322 are convolutional layers, the layer 323 is a pooling layer, the layers 324 and 325 are convolutional layers, and the layer 326 is a pooling layer. That is, an output of a convolutional layer may be used as an input of a subsequent pooling layer, or may be used as an input of another convolutional layer to continue to perform a convolution operation.

The following describes an internal working principle of a convolutional layer by using the convolutional layer 321 as an example.

The convolutional layer 321 may include a plurality of convolution operators. The convolution operator is also referred to as a kernel, and a function of the convolution operator in image processing is equivalent to a filter for extracting specific information from an input image matrix. The convolution operator may be essentially a weight matrix, and the weight matrix is usually predefined. In a process of performing a convolution operation on an image, a weight matrix usually performs processing in a horizontal direction of one pixel after another pixel (or two pixels after two other pixels, which depends on a value of a stride) on an input image, to extract a specific feature from the image. A size of the weight matrix should be related to a size of the picture. It should be noted that a depth dimension of the weight matrix is the same as a depth dimension of the input picture. During a convolution operation, the weight matrix extends to an entire depth of the input picture. Therefore, convolution with a single weight matrix generates a convolution output of a single depth dimension. However, in most cases, the single weight matrix is not used, but instead, a plurality of weight matrices of a same size (rows×columns), namely, a plurality of homogeneous matrices, are used. Outputs of the weight matrices are stacked to form a depth dimension of a convolutional picture. The dimension herein may be understood as being determined based on the foregoing "plurality". Different weight matrices may be used to extract different features in an image. For example, one weight matrix is used to extract edge information of the image, another weight matrix is used to extract a specific color of the image, and still another weight matrix is used to blur unwanted noise in the image. Sizes (rows×columns) of the plurality of weight matrices are the same. Sizes of feature maps extracted from the plurality of weight matrices with the same size are also the same, and then the plurality of extracted feature maps with the same size are combined to form an output of the convolution operation.

Weight values in these weight matrices need to be obtained through a large amount of training in actual application. Each weight matrix including weight values obtained through training may be used to extract information from an input image, so that the convolutional neural network 300 performs correct prediction.

When the convolutional neural network has a plurality of convolutional layers, a relatively large quantity of general features are usually extracted at an initial convolutional layer. The general feature may also be referred to as a low-level feature. As a depth of the convolutional neural network increases, a feature extracted at a subsequent convolutional layer is more complex, for example, a high-level semantic feature. A feature with higher-level semantics is more applicable to a to-be-resolved problem.

Pooling Layer:

Because a quantity of training parameters usually needs to be reduced, a pooling layer usually needs to be periodically introduced behind a convolutional layer. For the layers 321 to 326 shown in 320 in FIG. 2b, one convolutional layer may be followed by one pooling layer, or a plurality of convolutional layers may be followed by one or more pooling layers. Specifically, the pooling layer is configured to sample data and reduce an amount of data. For example, the data is image data, and in an image processing process, a space size of an image may be reduced by the pooling layer. The pooling layer may include an average pooling operator and/or a maximum pooling operator, to perform sampling on the input picture to obtain a picture with a relatively small size. The average pooling operator may calculate, within a specific range, an average value of pixel values in an image as a result of average pooling. The maximum pooling operator may be used to select a pixel with a maximum value in a specific range as a maximum pooling result. In addition, similar to that the size of the weight matrix at the convolutional layer needs to be related to the size of the picture, an operator at the pooling layer also needs to be related to the size of the picture. A size of a processed picture output from the pooling layer may be less than a size of a picture input to the pooling layer. Each sample in the picture output from the pooling layer represents an average value or a maximum value of a corresponding sub-region of the picture input to the pooling layer.

Neural Network Layer 330:

After processing of the convolutional layer/pooling layer 320, the convolutional neural network 300 still cannot output required output information. As described above, the convolutional layer/pooling layer 320 only extracts a feature and reduces parameters brought by an input image. However, to generate final output information (required category information or other related information), the convolutional neural network 300 needs to use the neural network layer 330 to generate a quantity of outputs of one or a set of required classes. Therefore, the neural network layer 330 may include a plurality of hidden layers (331 and 332 to 33n shown in FIG. 2b) and an output layer 340. Parameters included in the plurality of hidden layers may be obtained through pretraining based on related training data of a specific task type. For example, the task type may include image recognition, image classification, or super-resolution image reconstruction.

The output layer 340 is behind the plurality of hidden layers in the neural network layer 330, and is the last layer of the entire convolutional neural network 300. The output layer 340 has a loss function similar to classification cross entropy, and is specifically configured to calculate a prediction error. Once forward propagation (for example, in FIG. 2b, propagation in a direction from 310 to 340 is forward propagation) of the entire convolutional neural network 300 is completed, back propagation (for example, in FIG. 2b, propagation in a direction from 340 to 310 is back propagation) starts to update a weight value and a bias of each layer mentioned above, to reduce a loss of the convolutional neural network 300 and an error between a result output by the convolutional neural network 300 by using the output layer and an ideal result.

Figure 2C:
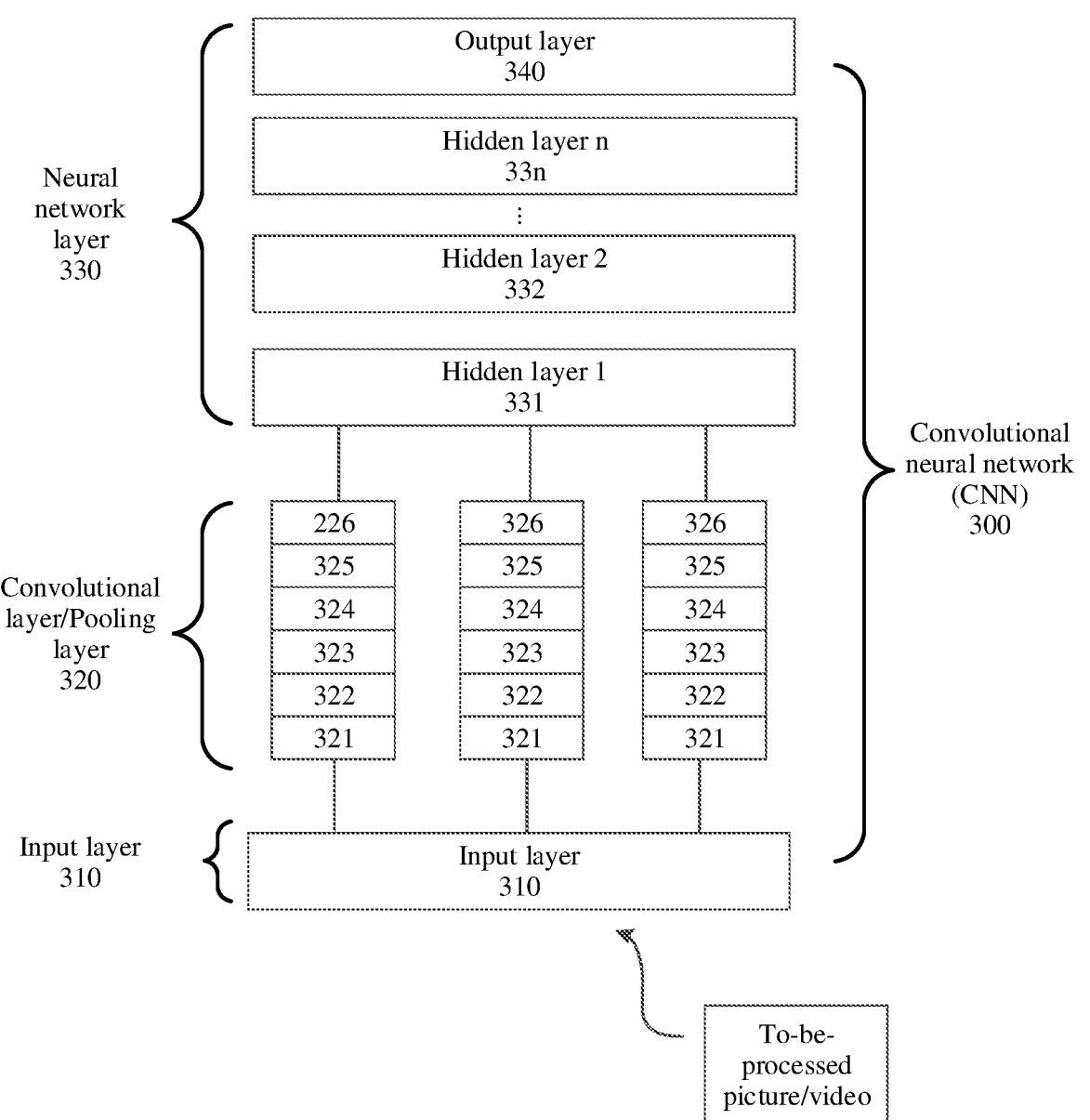
FIG. 2*c* is an example schematic diagram of a structure of another convolutional neural network according to an embodiment of this application.

It should be noted that the convolutional neural network 300 shown in FIG. 2b is merely used as an example of a convolutional neural network. In specific application, the convolutional neural network may alternatively exist in a form of another network model. For example, a plurality of convolutional layers/pooling layers shown in FIG. 2c are parallel, and respectively input extracted features to the neural network layer 330 for processing.

The following describes a chip hardware structure provided in an embodiment of this application.

Figure 3:
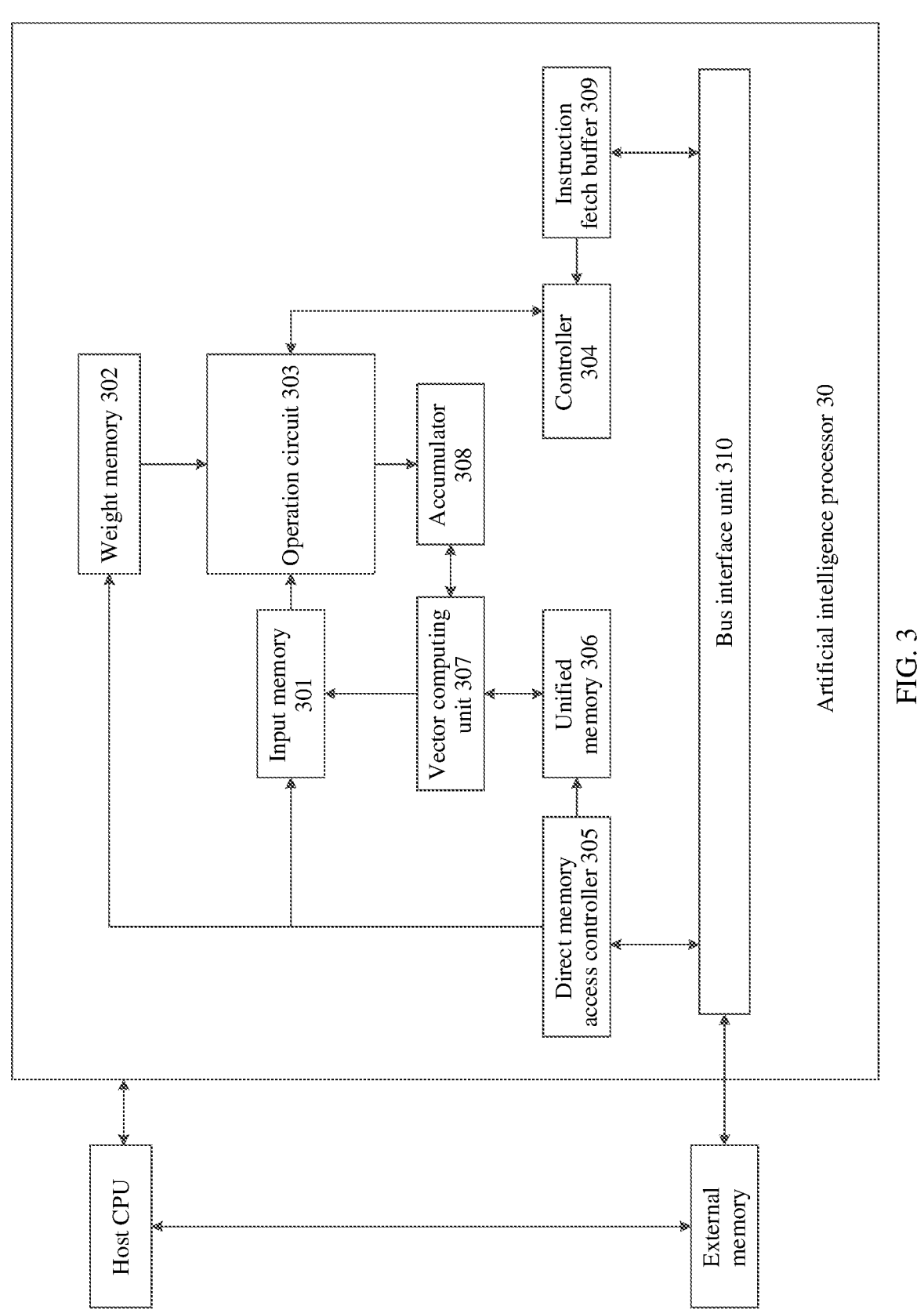
FIG. 3 is an example schematic diagram of a hardware structure of a chip according to this application.

FIG. 3 shows a chip hardware structure according to an embodiment of this application. The chip includes an artificial intelligence processor 30. The chip may be disposed in the execution device 210 shown in FIG. 2*a*, to complete computing work of the computing module 211. Alternatively, the chip may be disposed in the joint training device 220 shown in FIG. 2*a*, and specifically, may be disposed in the plurality of terminals 221, or may be disposed in the server 222, to complete training work of the joint training device 220 and output the target model/rule 201. Algorithms of the layers in the convolutional neural networks shown in FIG. 2*b* and FIG. 2*c* may be implemented in the chip shown in FIG. 3.

The artificial intelligence processor 30 may be any processor suitable for large-scale exclusive OR operation processing, such as a neural-network processing unit (NPU), a tensor Processing Unit (TPU), or a graphics processing unit (GPU). The NPU is used as an example. The NPU may be connected to a host CPU as a coprocessor, and assigned a task by the host CPU. A core part of the NPU is an operation circuit 303. The operation circuit 303 is controlled by using a controller 304 to extract matrix data from a memory (301 and 302) and perform multiplication and addition operations.

In some implementations, the operation circuit 303 internally includes a plurality of process engines (PE). In some implementations, the operation circuit 303 is a two-dimensional systolic array. Alternatively, the operation circuit 303 may be a one-dimensional systolic array or another electronic circuit that can perform mathematical operations such as multiplication and addition. In some implementations, the operation circuit 303 is a general-purpose matrix processor.

For example, it is assumed that there is an input matrix A, a weight matrix B, and an output matrix C. The operation circuit 303 obtains weight data of the matrix B from the weight memory 302, and buffers the data in each PE in the operation circuit 303. The operation circuit 303 obtains input data of the matrix A from the input memory 301, performs a matrix operation on the input data of the matrix A and the weight data of the matrix B, and stores an obtained partial result or final result of the matrices in an accumulator 308.

The unified memory 306 is configured to store input data and output data. The weight data is directly transferred to the weight memory 302 by using a direct memory access controller (DMAC) 305. The input data is also transferred to the unified memory 306 by using the DMAC.

A bus interface unit (BIU) 310 is used for interaction between the DMAC and an instruction fetch buffer 309. The bus interface unit 310 is further used by the instruction fetch memory 309 to obtain an instruction from an external memory. The bus interface unit 310 is further used by the direct memory access controller 305 to obtain original data of the input matrix A or the weight matrix B from the external memory.

The DMAC is mainly configured to transfer input data in the external memory DDR to the unified memory 306, or transfer weight data to the weight memory 302, or transfer input data to the input memory 301.

A vector computing unit 307 may include a plurality of operation processing units, and if necessary, further processing, such as vector multiplication, vector addition, an exponential operation, a logarithm operation, or value comparison, is performed on an output of the operation circuit 303. The vector computing unit 307 is mainly used for computing of a non-convolutional layer or a fully connected layer (FC) in a neural network, and may specifically process computing such as pooling and normalization. For example, the vector computing unit 307 may apply a non-linear function to the output, for example, a vector of an accumulated value, of the operation circuit 303 to generate an activation value. In some implementations, the vector computing unit 307 generates a normalized value, a combined value, or both.

In some implementations, the vector computing unit 307 stores a processed vector in the unified memory 306. In some implementations, a vector processed by the vector computing unit 307 can be used as an activation input to the operation circuit 303, for example, for use in a subsequent layer in the neural network. As shown in FIG. 2*b*, if a current processing layer is the hidden layer 1 (231), the vector processed by the vector computing unit 307 can be further used for computing in the hidden layer 2 (232).

The instruction fetch buffer 309 connected to the controller 304 is configured to store instructions used by the controller 304.

The unified memory 306, the input memory 301, the weight memory 302, and the instruction fetch memory 309 are all on-chip memories. The external memory is independent of the NPU hardware architecture.

An operation of each layer in the convolutional neural networks shown in FIG. 2*b* and FIG. 2*c* may be performed by the operation circuit 303 or the vector computing unit 307.

Figure 4A:
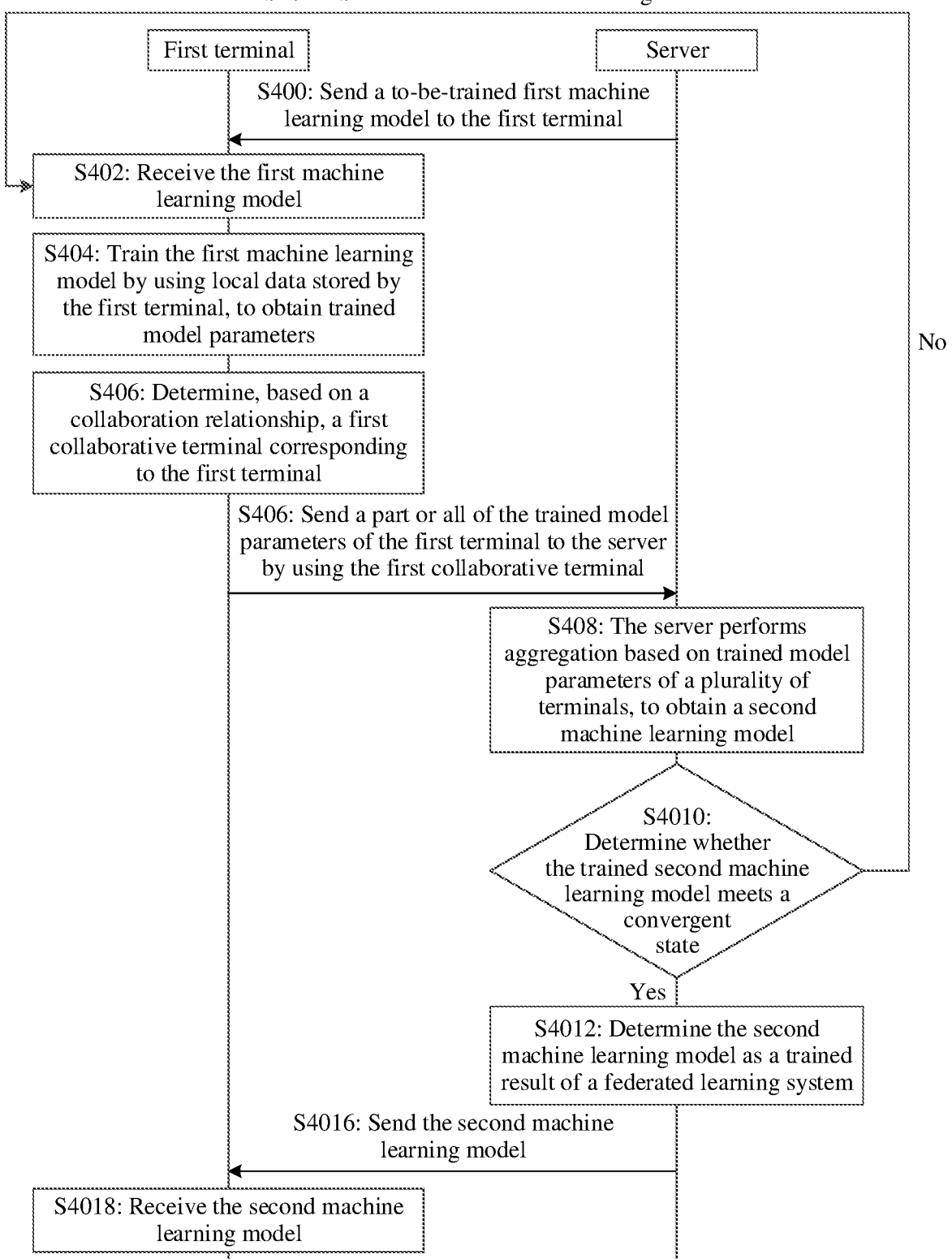
FIG. 4*a* is an example schematic flowchart of a federated learning training method according to an embodiment of this application.

The following describes in detail the methods in embodiments of this application. FIG. 4*a* shows a federated learning training method according to an embodiment of this application. The method may be performed by the federated learning system shown in FIG. 1*a*. The federated learning system may include a plurality of terminals and a server. Specifically, the server stores a corresponding collaboration relationship of each terminal in the federated learning system, the collaboration relationship indicates a corresponding collaborative terminal of each terminal, and the method may include but is not limited to the following steps.

Step S400: The server sends a to-be-trained first machine learning model to a first terminal. The first terminal is any one of the plurality of terminals.

Step S402: The first terminal receives the first machine learning model sent by the server.

Step S404: The first terminal trains the first machine learning model by using local data stored by the first terminal, to obtain trained model parameters.

User behavior prediction is used as an example. The first machine learning model may be trained by using an original feature X of a user and a tag feature Y of the user. Specifically, the original feature X of the user may be represented by using basic data of the user, and the tag feature Y of the user refers to an expected answer. For example, in the financial field, the tag feature Y of the user is a user credit that needs to be predicted. For another example, in the sales field, the tag feature Y of the user is a purchasing desire of the user. For another example, in the educational field, the tag feature Y of the user is a degree to which a student has mastered knowledge. Herein, the original feature X of the user and the tag feature of the user constitute complete training sample data (X, Y).

In this embodiment of this application, corresponding local data of the terminals may be the same or different. For example, for user behavior prediction, users of data sets are not exactly the same, or user features are not exactly the same. Specifically, using a federated learning system including two data owners as an example, data distribution may be classified into the following cases:

(1) There are a relatively large user feature overlap part and a relatively small user overlap part between local data corresponding to a terminal 1 and local data corresponding to a terminal 2.

(2) There are a relatively large user overlap part and a relatively small user feature overlap part between local data corresponding to a terminal 1 and local data corresponding to a terminal 2.

(3) There are a relatively small user overlap part and a relatively small user feature overlap part between local data corresponding to a terminal 1 and local data corresponding to a terminal 2.

It may be understood that, the corresponding local data of each terminal may include training sample data, and may also include test sample data. The training sample data may be used to train a machine learning model. The test sample data may be used to evaluate quality and accuracy of a trained machine learning model.

In this embodiment of this application, the trained model parameters may include a weight, and may include gradient information, or the like.

Step S406: The first terminal determines, based on a collaboration relationship, a first collaborative terminal corresponding to the first terminal, and sends a part or all of the trained model parameters of the first terminal to the server by using the first collaborative terminal. The collaboration relationship is delivered by the server to the first terminal.

In this embodiment of this application, before performing step S400, the server may send, to the first terminal, in advance the collaboration relationship corresponding to the first terminal. Alternatively, when performing step S400, the server may send, to the first terminal, the collaboration relationship corresponding to the first terminal. This is not specifically limited herein.

In this embodiment of this application, the collaboration relationship may be determined based on a benefit of the terminal. For example, the federated learning system includes three terminals and a server, and the three terminals are a terminal 1, a terminal 2, and a terminal 3. When the terminal 1 and the terminal 2 perform training by using local data of the terminal 1 and the terminal 2, because the local data corresponding to the terminal 1 and the local data corresponding to the terminal 2 have a relatively small user overlap part and a relatively small user feature overlap part, model parameters generated by the terminal 1 through training can increase a benefit for the terminal 2. In this case, collaboration is generated between the terminal 2 and the terminal 1, and the terminal 2 is a collaborative terminal of the terminal 1.

In this embodiment of this application, an example in which the federated learning system includes three terminals and a server is used. A collaboration relationship between the three terminals may be shown in FIG. 4b. A "directed edge" shown in the figure is used to represent a collaboration relationship between a terminal and a collaborative terminal. A direction of the directed edge indicates flow in or out of data. For a terminal 1, a terminal 2 is a collaborative terminal corresponding to the terminal 1, that is, the terminal 1 may transmit, by using the terminal 2, model parameters that are trained by the terminal 1 by using local data of the terminal 1. For the terminal 2, a terminal 3 is a collaborative terminal corresponding to the terminal 2, that is, the terminal 2 may transmit, by using the terminal 3, model parameters that are trained by the terminal 2 by using local data of the terminal 2. For the terminal 3, the terminal 1 is a collaborative terminal of the terminal 3, that is, the terminal 3 may transmit, by using the terminal 1, model parameters that are trained by the terminal 3 by using local data of the terminal 3.

In an example, the first terminal may alternatively determine a first collaborative terminal by using a determined quantity of collaborative terminals and the collaboration relationship. Specifically, the first terminal determines a quantity of first collaborative terminals required in collaboration with the first terminal to send the model parameters to the server, and then determines the first collaborative terminal based on the determined quantity of collaborative terminals and the collaboration relationship. In this embodiment of this application, quantities, determined by the terminals, of collaborative terminals may be the same or different. This is not specifically limited in this embodiment of this application.

Specifically, the first terminal may determine, based on a transmission percentage D, the quantity of first collaborative terminals required in collaboration with the first terminal to send the model parameters to the server. For example, when the transmission percentage is D=50%, it means that the first terminal needs one collaborative terminal to send the trained model parameters of the first terminal to the server together with the first terminal. In this case, the first terminal allocates 50% model parameters to each of the first terminal and the first collaborative terminal. The first terminal sends 50% model parameters to the server. The first collaborative terminal sends, to the server, 50% model parameters that are allocated by the first terminal to the first collaborative terminal. For another example, when the transmission percentage is D=25%, it means that the first terminal needs three collaborative terminals to send the trained model parameters of the first terminal to the server together with the first terminal. In this case, the first terminal allocates 25% model parameters to each of the first terminal and the three first collaborative terminals. The first terminal sends 25% model parameters to the server. Each of the three first collaborative terminals sends, to the server, 25% model parameters that are allocated by the first terminal to the first collaborative terminal.

For example, the federated learning system includes four terminals and a server, where the four terminals are a terminal 1, a terminal 2, a terminal 3, and a terminal 4. For the terminal 1, the terminal 2, the terminal 3, and the terminal 4 are collaborative terminals corresponding to the terminal 1. For the terminal 2, the terminal 3 is a collaborative terminal corresponding to the terminal 2. For the terminal 3, the terminal 1 and the terminal 4 are collaborative terminals of the terminal 3. For the terminal 4, the terminal 1 is a collaborative terminal corresponding to the terminal 4. In an example, the transmission percentage is set to D=50% for the four terminals. In this case, for the terminal 1, the terminal 1 may transmit, by using the terminal 2, a part or all of model parameters that are trained by the terminal 1 by using local data of the terminal 1. For the terminal 2, the terminal 2 may transmit, by using the terminal 3, a part or all of model parameters that are trained by the terminal 2 by using local data of the terminal 2. For the terminal 3, the terminal 3 may transmit, by using the terminal 1, a part or all of model parameters that are trained by the terminal 3 by using local data of the terminal 3. For the terminal 4, the terminal 4 may transmit, by using the terminal 1, a part or all of model parameters that are trained by the terminal 4 by using local data of the terminal 4. In an example, the transmission percentage is set to D=25% for the terminal 1, the transmission percentage is set to D=50% for the terminal 2, the transmission percentage is set to D=50% for the terminal 3, and the transmission percentage is set to D=100% for the terminal 4. In this case, for the terminal 1, the terminal 1 may transmit, by using the terminal 2, the terminal 3, and the terminal 4, a part of model parameters that are trained by the terminal 1 by using the local data of the terminal 1. For the terminal 2, the terminal 2 may transmit, by using the terminal 3, a part or all of model parameters that are trained by the terminal 2 by using the local data of the terminal 2. For the terminal 3, the terminal 3 may transmit, by using the terminal 1, a part or all of model parameters that are trained by the terminal 3 by using the local data of the terminal 3. For the terminal 4, the terminal 4 may transmit, by using the terminal 1, all the model parameters that are trained by the terminal 4 by using the local data of the terminal 4. It should be noted that the foregoing examples are merely examples, and should not constitute a limitation.

In this embodiment of this application, an implementation process in which the first terminal sends a part or all of the trained model parameters of the first terminal to the server by using the first collaborative terminal may include: sending all the trained model parameters of the first terminal to the server by using the first collaborative terminal; or sending the trained model parameters of the first terminal to the server jointly by using the first terminal and the first collaborative terminal.

In the foregoing example, the federated learning system includes four terminals and a server, where the four terminals are a terminal 1, a terminal 2, a terminal 3, and a terminal 4. For the terminal 1, the terminal 2, the terminal 3, and the terminal 4 are collaborative terminals corresponding to the terminal 1. For the terminal 2, the terminal 3 is a collaborative terminal corresponding to the terminal 2. For the terminal 3, the terminal 1 and the terminal 4 are collaborative terminals of the terminal 3. For the terminal 4, the terminal 1 is a collaborative terminal corresponding to the terminal 4. In an example, the transmission percentage is set to D=50% for the terminal 1. In this case, for the terminal 1, the terminal 1 may transmit, by using the terminal 2, a part or all of model parameters that are trained by the terminal 1 by using local data of the terminal 1. Specifically, in a case, the terminal 1 may transmit, by using the terminal 2, all the model parameters that are trained by the terminal 1 by using the local data of the terminal 1. In this case, the terminal 1 does not send a model parameter to the server. In another case, the terminal 1 may transmit, by using the terminal 2, a part of model parameters that are trained by the terminal 1 by using the local data of the terminal 1. In this case, the terminal 1 sends a part of model parameters to the server.

Figures 4B, 4C:
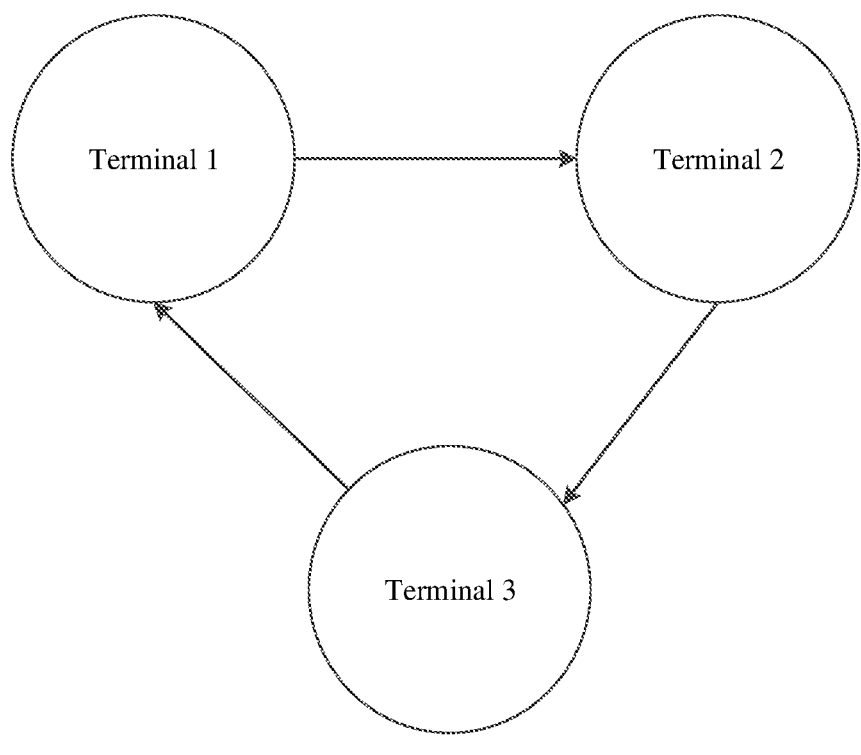
FIG. 4*b* is an example schematic diagram of a collaboration relationship according to an embodiment of this application.
FIG. 4*c* is an example schematic diagram of stored model parameters according to an embodiment of this application.

In this embodiment of this application, the trained model parameters of the first terminal may include corresponding index values of the model parameters, and the index values are used to represent storage addresses corresponding to the model parameters. As shown in FIG. 4c, the trained model parameters of the first terminal are stored in storage addresses whose address numbers are $I_1, I_2, \ldots$, and $I_6$. A model parameter "1" is stored at the address number $I_1$. A model parameter "2" is stored at the address number $I_2$. An implementation process of sending all the trained model parameters of the first terminal to the server by using the first collaborative terminal may include: The first terminal sends, to the first collaborative terminal, index values corresponding to all the model parameters that need to be sent by the terminal to the server by using the first collaborative terminal. The first collaborative terminal obtains the corresponding model parameters based on the corresponding index values of all the model parameters, and sends the obtained model parameters to the server. In this way, the server may obtain all the trained model parameters of the first terminal.

It may be understood that, the model parameters may be stored in continuous storage addresses, or may be stored in discontinuous storage addresses. The foregoing continuous storage addresses whose address numbers are $I_1, I_2, \ldots$, and $I_6$ are merely used as an example, and should not constitute a limitation.

In this embodiment of this application, an implementation process of sending the trained model parameters of the first terminal to the server jointly by using the first terminal and the first collaborative terminal may include: The first terminal sends, to the first collaborative terminal, index values corresponding to a part of model parameters that need to be sent by the terminal to the server by using the first collaborative terminal. The first collaborative terminal obtains the corresponding model parameters based on the corresponding index values of the part of model parameters, and sends the obtained model parameters to the server. At the same time, the first terminal further sends, to the server, a model parameter that needs to be transmitted by the first terminal. In this way, the server may obtain all the trained model parameters of the first terminal.

Step S408: The server perform aggregates trained model parameters of a plurality of terminals, to obtain a second machine learning model.

In this embodiment of this application, after the server obtains all the model parameters of the plurality of terminals, the server may aggregate the plurality of model parameters. Specifically, the server may perform average calculation on the plurality of model parameters based on a corresponding weight coefficient of each model parameter, to obtain the second machine learning model. The second machine learning model includes an averaged global model parameter. Herein, the weight coefficient is a percentage of a data amount of each terminal to a total data amount in the federated learning system. In actual training, trained machine learning models have different performance due to different training data of the terminals. The weight coefficient can function to avoid an unsatisfactory effect of the second machine learning model obtained by the server through training (for example, accuracy of the second machine learning model is excessively low).

Step S4010: The server determines whether the trained second machine learning model meets a convergent state. If the convergent state is met, step S4012 is performed. If the convergent state is not met, step S4014 is performed.

In this embodiment of this application, the server may obtain a loss value based on a loss function of the second machine learning model, and then determine, based on the loss value, whether the second machine learning model meets the convergent state. Specifically, the server stores a first loss value corresponding to the first machine learning model, the server obtains a second loss value based on the loss function of the second machine learning model, calculates a difference between the first loss value and the second loss value, and determines whether the difference is less than or equal to a preset threshold. If the difference is less than or equal to the preset threshold, the server determines that the trained second machine learning model meets the convergent state. It means that a training process of the to-be-trained first machine learning model is completed by using the federated learning system. If the difference is greater than the preset threshold, the server needs to retrain the second machine learning model.

In an actual training process, the preset threshold may be set based on a requirement of a user. The preset threshold is not specifically limited in this embodiment of this application.

Step S4012: When the server determines that the second machine learning model meets the convergent state, the server determines the second machine learning model as a trained result of the federated learning system.

Step S4014: When the server determines that the second machine learning model does not meet the convergent state, the server delivers the second machine learning model to the first terminal, so that the first terminal retrains the second machine learning model by using the local data stored by the first terminal, to obtain trained model parameters, until the server obtains, based on trained model parameters of a plurality of terminals, a second machine learning model meeting the convergent state.

Step S4016: The server sends the second machine learning model to the first terminal.

Step S4018: The first terminal receives the second machine learning model.

It may be understood that, when the server determines that the second machine learning model meets the convergent state, the server determines the second machine learning model as a trained result of the federated learning system, and the server sends the second machine learning model to the first terminal. In this case, the first terminal may input test sample data to the second machine learning model, to implement a specific function of the second machine learning model.

By implementing this embodiment of this application, when the machine learning model is trained by using the federated learning system, each terminal in the federated learning system may send trained model parameters of each terminal to the server by using a collaborative terminal that has a collaboration relationship with the terminal. This can prevent an attacker from obtaining the trained model parameters of each terminal after attacking the terminal, to avoid a potential risk of data leakage, thereby improving security of data exchange between the server and the terminal.

Figure 5:
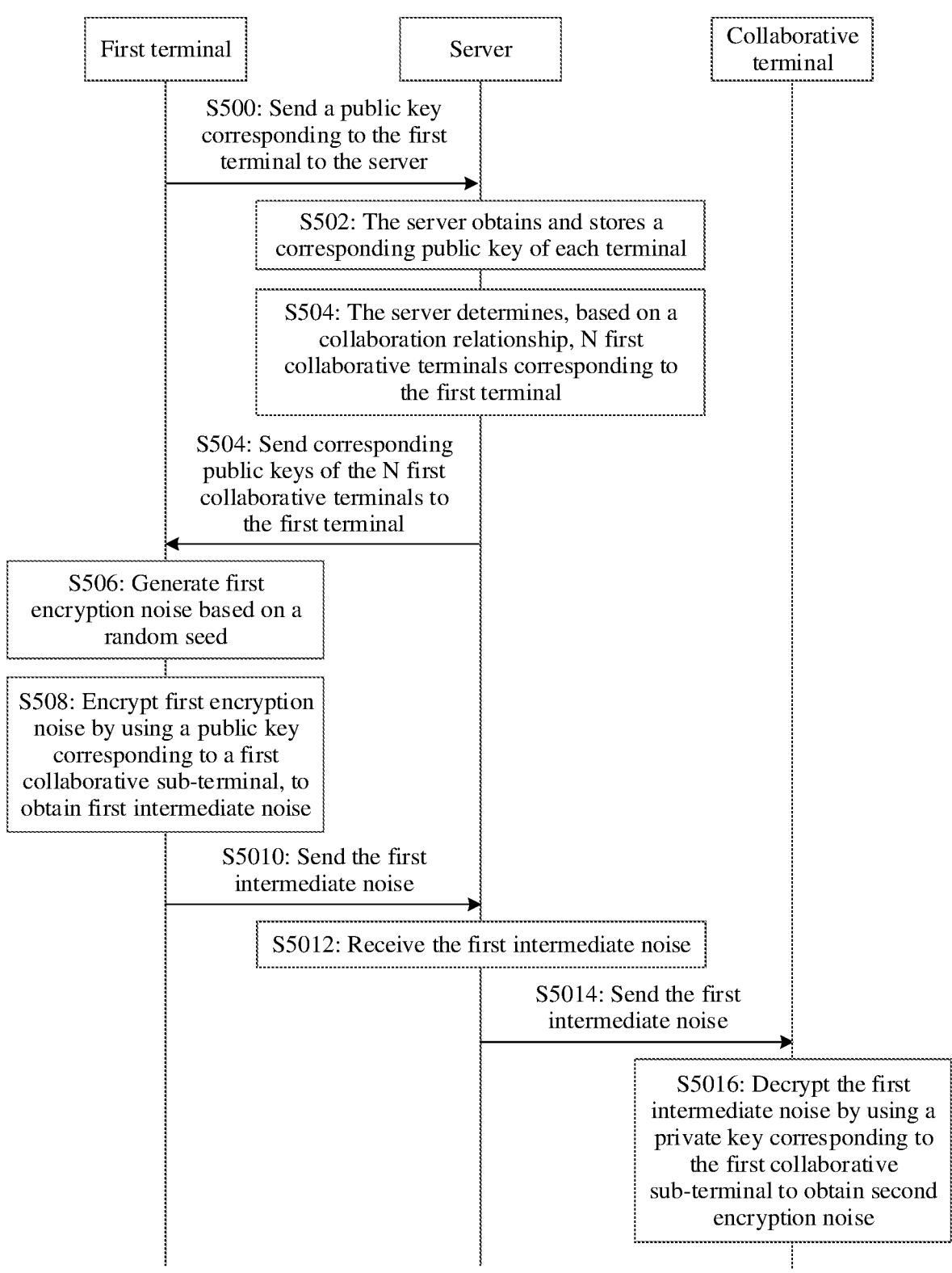
FIG. 5 is an example schematic flowchart of a noise encryption method according to an embodiment of this application.

An embodiment of this application further provides a method for encrypting, based on a public key and a private key, a model parameter transmitted by a terminal to a server. Herein, the public key is used for encryption, and the private key is used for decryption. FIG. 5 shows a noise encryption method according to an embodiment of this application. The method is applied to a federated learning system, the federated learning system includes a server and a plurality of terminals, and the method may include but is not limited to the following steps.

Step S500: A first terminal sends a public key corresponding to the first terminal to the server. The first terminal is any one of the plurality of terminals.

Step S502: The server obtains and stores a corresponding public key of each terminal.

Step S504: The server determines, based on a collaboration relationship, N first collaborative terminals corresponding to the first terminal, and sends corresponding public keys of the N first collaborative terminals to the first terminal. N is a positive integer greater than 1.

Step S506: The first terminal generates first encryption noise based on a random seed.

In this embodiment of this application, random seeds corresponding to the terminals may be the same or different. This is not specifically limited herein.

Step S508: The first terminal encrypts first encryption noise by using a public key corresponding to a first collaborative sub-terminal, to obtain first intermediate noise. The first collaborative sub-terminal is any one of the N first collaborative terminals.

Step S5010: The first terminal sends the first intermediate noise to the server.

Step S5012: The server receives the first intermediate noise.

Step S5014: The server sends the first intermediate noise to the first collaborative sub-terminal.

Step S5016: The first collaborative sub-terminal decrypts the first intermediate noise by using a private key corresponding to the first collaborative sub-terminal to obtain second encryption noise.

For example, the federated learning system includes a terminal 1, a terminal 2, and a server. With reference to the noise encryption method described in this application, the terminal 1 and the terminal 2 send corresponding public keys to the server. For example, a public key corresponding to the terminal 1 is a public key 1, and a public key corresponding to the terminal 2 is a public key 2. After obtaining the corresponding public keys of the two terminals, the server stores the public key 1 and the public key 2. For the terminal 1, the server determines, based on a collaboration relationship, that a collaborative terminal corresponding to the terminal 1 is the terminal 2, and sends the public key corresponding to the terminal 2 to the terminal 1. The terminal 1 generates first encryption noise based on a random seed, and encrypts the first encryption noise by using the public key corresponding to the terminal 2, to obtain first intermediate noise. Then, the terminal 1 sends the first intermediate noise to the server, and the server sends the first intermediate noise to the terminal 2. In this case, the terminal 2 may decrypt the first intermediate noise by using a private key corresponding to the terminal 2, to obtain second encryption noise.

It should be noted that, in this embodiment of this application, the first encryption noise and the second encryption noise are different encryption noise. For example, the first encryption noise is noise, the second encryption noise is noise', and the first encryption noise and the second encryption noise meet noise!=noise'.

It may be understood that, when a model parameter to be sent to the server is encrypted by using the encryption method described in this application, security of data exchange between the terminal and the server can be improved.

Figures 2, 6A:
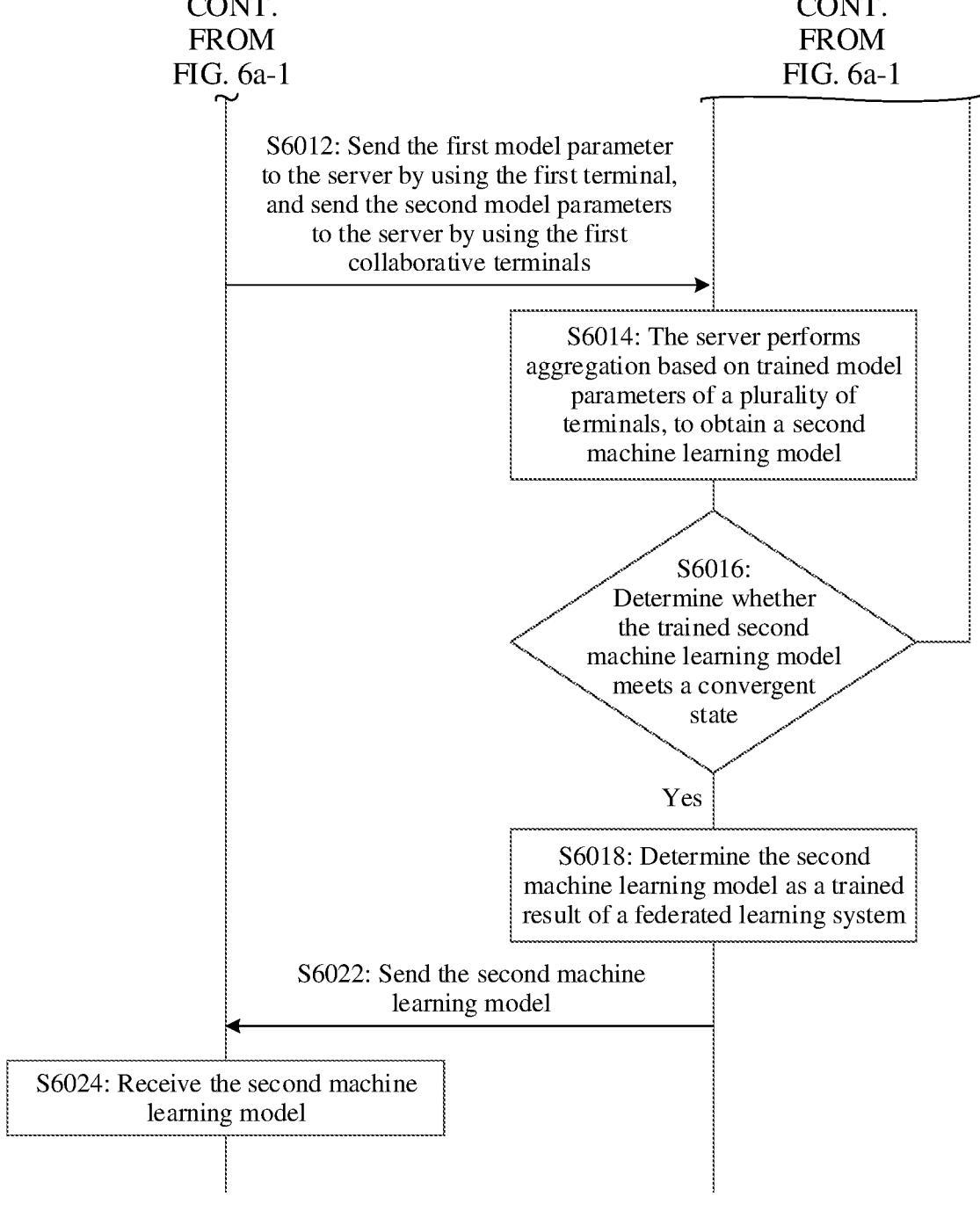
Figures 1, 6B:
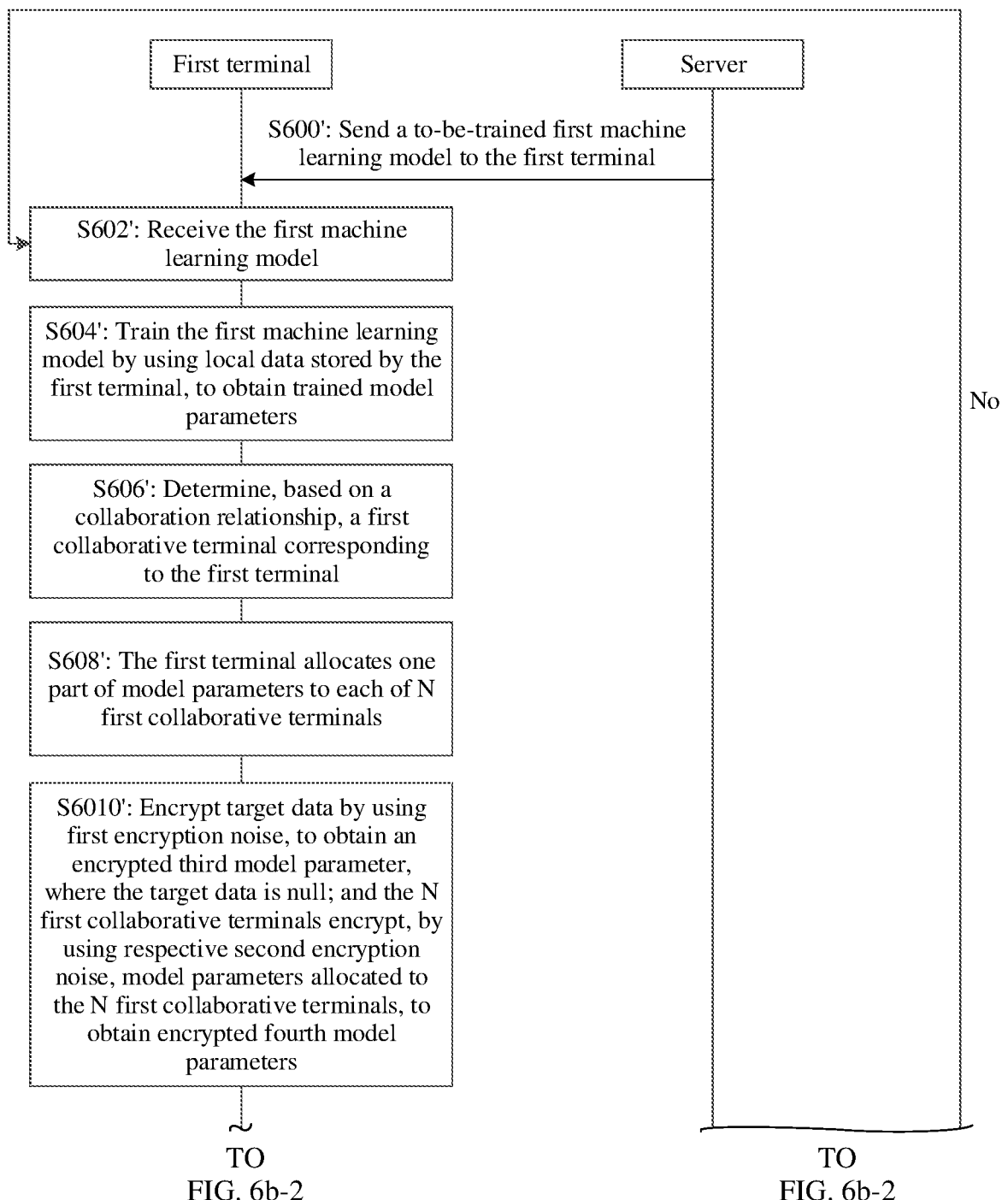
Figures 2, 6B:
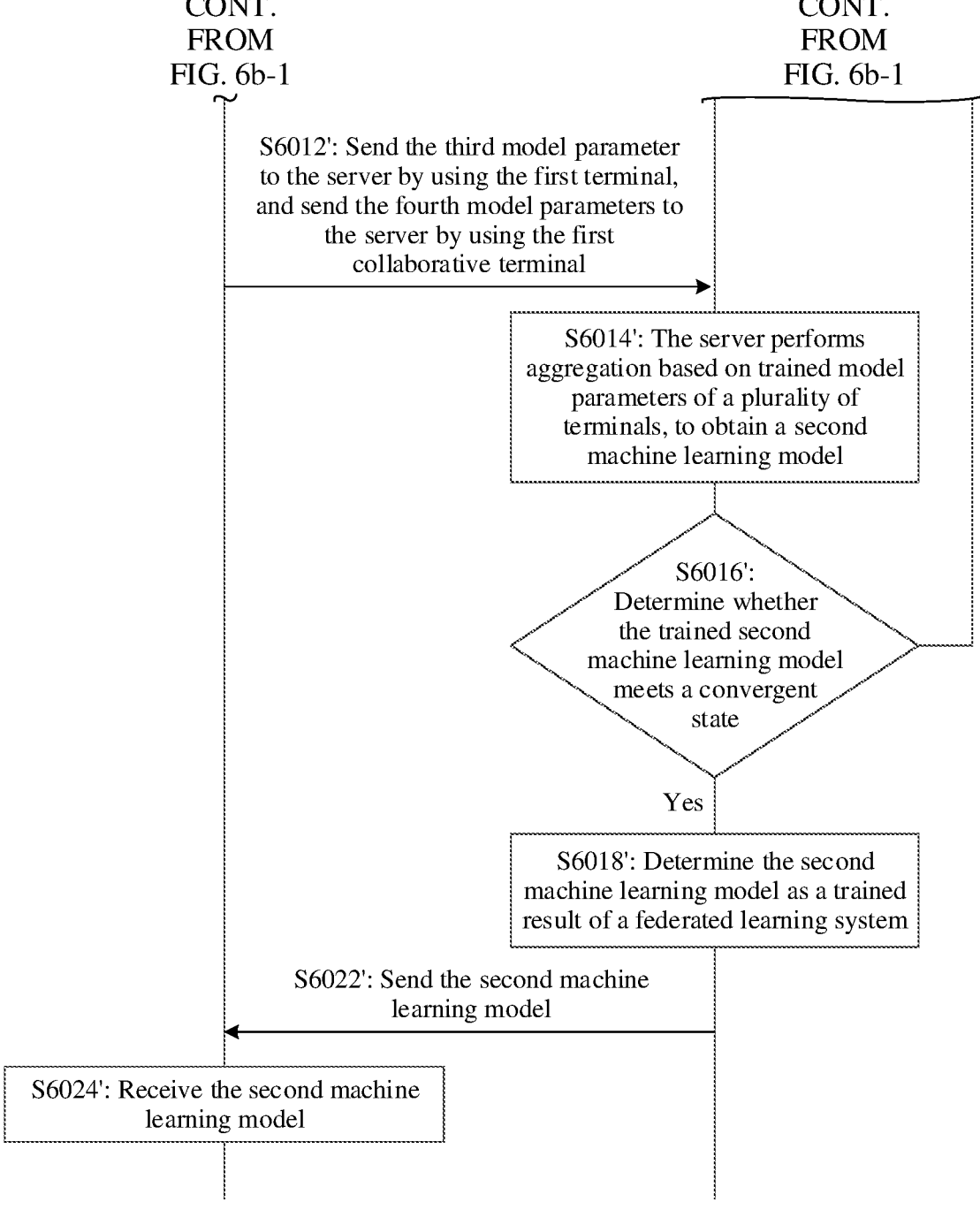

Based on the noise encryption method shown in FIG. 5, as shown in FIG. 6a-1 and FIG. 6a-2, an embodiment of this application further provides another federated learning training method. Specifically, how the method is implemented when a part of trained model parameters of a first terminal are sent to a server by using a first collaborative terminal is described. For example, trained model parameters of the first terminal are divided into N+1 parts, and a quantity of first collaborative terminals corresponding to the first terminal is N. In this case, one part of model parameters is sent to the server by using the first terminal, and N parts of model parameters are respectively sent to the server by using the N first collaborative terminals. Specifically, the method may be performed by the federated learning system shown in FIG. 1a. The federated learning system may include a plurality of terminals and a server. Specifically, the server stores a corresponding collaboration relationship of each terminal in the federated learning system, the collaboration relationship indicates a corresponding collaborative terminal of each terminal, and the method may include but is not limited to the following steps.

Step S600: The server sends a to-be-trained first machine learning model to a first terminal. The first terminal is any one of the plurality of terminals.

Step S602: The first terminal receives the first machine learning model sent by the server.

Step S604: The first terminal trains the first machine learning model by using local data stored by the first terminal, to obtain trained model parameters.

Step S606: The first terminal determines, based on a collaboration relationship, a first collaborative terminal corresponding to the first terminal.

In this embodiment of this application, for specific implementations of step S600 to step S606, refer to descriptions of step S400 to step S406.

Step S608: The first terminal allocates one part of model parameters to each of the first terminal and N first collaborative terminals. Different terminals correspond to different model parameters.

For example, the trained model parameters of the first terminal are divided into four parts: a model parameter 1, a model parameter 2, a model parameter 3, and a model parameter 4. A quantity of first collaborative terminals corresponding to the first terminal is 3, which are a collaborative terminal 1, a collaborative terminal 2, and a collaborative terminal 3. The first terminal allocates the model parameter 1 to the first terminal, allocates the model parameter 2 to the collaborative terminal 1, allocates the model parameter 3 to the collaborative terminal 2, and allocates the model parameter 4 to the collaborative terminal 3. It may be understood that the first terminal allocates different model parameters to different terminals.

Step S6010: The first terminal encrypts, by using first encryption noise, a model parameter allocated to the first terminal, to obtain an encrypted first model parameter, where the N first collaborative terminals encrypt, by using respective second encryption noise, model parameters allocated to the N first collaborative terminals, to obtain encrypted second model parameters; and no noise is included after superposition of the first encryption noise and the respective second encryption noise of the N first collaborative terminals.

In this embodiment of this application, for an implementation process of how the first terminal and the first collaborative terminal generate respective encryption noise, refer to the foregoing description. Specifically, after generating the respective encryption noise, the first terminal and the first collaborative terminal may encrypt, by using the respective encryption noise, model parameters allocated to the first terminal and the first collaborative terminal. In this implementation, data security can be improved.

As described in the foregoing example, the trained model parameters of the first terminal are divided into four parts: a model parameter 1, a model parameter 2, a model parameter 3, and a model parameter 4. A quantity of first collaborative terminals corresponding to the first terminal is 3, which are a collaborative terminal 1, a collaborative terminal 2, and a collaborative terminal 3. The first terminal allocates the model parameter 1 to the first terminal, allocates the model parameter 2 to the collaborative terminal 1, allocates the model parameter 3 to the collaborative terminal 2, and allocates the model parameter 4 to the collaborative terminal 3. In this case, the first terminal encrypts the model parameter 1 by using the first encryption noise, to obtain a first model parameter. The collaborative terminal 1 encrypts the model parameter 2 by using second encryption noise a corresponding to the collaborative terminal 1, to obtain a second model parameter a. The collaborative terminal 2 encrypts the model parameter 3 by using second encryption noise b corresponding to the collaborative terminal 2, to obtain a second model parameter b. The collaborative terminal 3 encrypts the model parameter 4 by using second encryption noise c corresponding to the collaborative terminal 3, to obtain a second model parameter c.

Step S6012: Send the first model parameter to the server by using the first terminal, and send the second model parameters to the server by using the first collaborative terminals.

In this embodiment of this application, for the first collaborative terminal, a real second model parameter cannot be obtained, because the second model parameter is an encrypted model parameter, and the encrypted second model parameter is formed by a model parameter and a corresponding index value of the model parameter.

As described in the foregoing example, the first terminal encrypts the model parameter 1 by using the first encryption noise, to obtain a first model parameter. The collaborative terminal 1 encrypts the model parameter 2 by using second encryption noise a corresponding to the collaborative terminal 1, to obtain a second model parameter a. The collaborative terminal 2 encrypts the model parameter 3 by using second encryption noise b corresponding to the collaborative terminal 2, to obtain a second model parameter b. The collaborative terminal 3 encrypts the model parameter 4 by using second encryption noise c corresponding to the collaborative terminal 3, to obtain a second model parameter c. In this case, the first terminal sends the first model parameter encrypted by using the encryption noise to the server, and the collaborative terminals corresponding to the first terminal send the second model parameters (a+b+c) encrypted by using the respective encryption noise to the server.

Step S6014: The server aggregates trained model parameters of a plurality of terminals, to obtain a second machine learning model.

In this embodiment of this application, after the server obtains all the model parameters of the plurality of terminals, the server may aggregate the plurality of model parameters. Specifically, the server may perform average calculation on the plurality of model parameters based on a corresponding weight coefficient of each model parameter, to obtain the second machine learning model. The second machine learning model includes an averaged global model parameter. Herein, the weight coefficient is a percentage of a data amount of each terminal to a total data amount in the federated learning system. For example, the model parameter is gradient information, and the model parameter corresponding to each terminal is gradient information including encryption noise. In an example, a quantity of terminals in the federated learning system is M. After the server obtains all model parameters of the M terminals, when the server aggregates the plurality of model parameters, obtained global gradient information does not include noise. In this case, when the server performs training by using the global model parameter, because encryption noise may cancel each other, adverse impact (for example, an accuracy decrease of the machine learning model) caused by noise on accuracy of the machine learning model can be avoided. In an example, a quantity of terminals in the federated learning system is M. A terminal (terminal 1) is used as an example. When the server does not obtain all model parameters corresponding to the terminal 1, when the server aggregates a plurality of model parameters, obtained global gradient information includes noise. In this case, when the server performs training by using the global model parameter, encryption noise stays in the gradient information, which causes severe impact on accuracy of the machine learning model. To resolve this problem, aggregation performed by a server on a plurality of model parameters under any condition is described in detail in a subsequent embodiment, to avoid adverse impact of encryption noise on accuracy of a machine learning model.

Step S6016: The server determines whether the trained second machine learning model meets a convergent state. If the convergent state is met, step S6018 is performed. If the convergent state is not met, step S6020 is performed.

Step S6018: When the server determines that the second machine learning model meets the convergent state, the server determines the second machine learning model as a trained result of the federated learning system.

Step S6020: When the server determines that the second machine learning model does not meet the convergent state, the server delivers the second machine learning model to the first terminal, so that the first terminal retrains the second machine learning model by using the local data stored by the first terminal, to obtain trained model parameters, until the server obtains, based on trained model parameters of a plurality of terminals, a second machine learning model meeting the convergent state.

Step S6022: The server sends the second machine learning model to the first terminal.

Step S6024: The first terminal receives the second machine learning model.

In this embodiment of this application, for specific implementations of step S6014 to step S6024, refer to descriptions of step S408 to step S4018.

By implementing this embodiment of this application, when the machine learning model is trained by using the federated learning system, each terminal in the federated learning system may send a part of the trained model parameters of each terminal to the server by using a collaborative terminal that has a collaboration relationship with the terminal. Herein, the trained model parameters of each terminal are model parameters obtained by using respective encryption noise by each terminal and the collaborative terminal corresponding to each terminal. This can prevent an attacker from obtaining the trained model parameters of each terminal after attacking the terminal, to avoid a potential risk of data leakage, thereby improving security of data exchange between the server and the terminal.

Based on the noise encryption method shown in FIG. 5, as shown in FIG. 6b-1 and FIG. 6b-2, an embodiment of this application further provides another federated learning training method. Specifically, how the method is implemented when all trained model parameters of a first terminal are sent to a server by using a first collaborative terminal is described. For example, trained model parameters of the first terminal are divided into N parts, and a quantity of first collaborative terminals corresponding to the first terminal is N. In this case, the N parts of model parameters are respectively sent to the server by using the N first collaborative terminals. Specifically, the method may be performed by the federated learning system shown in FIG. 1a. The federated learning system may include a plurality of terminals and a server. Specifically, the server stores a corresponding collaboration relationship of each terminal in the federated learning system, the collaboration relationship indicates a corresponding collaborative terminal of each terminal, and the method may include but is not limited to the following steps.

Step S600': The server sends a to-be-trained first machine learning model to a first terminal. The first terminal is any one of the plurality of terminals.

Step S602': The first terminal receives the first machine learning model sent by the server.

Step S604': The first terminal trains the first machine learning model by using local data stored by the first terminal, to obtain trained model parameters.

Step S606': The first terminal determines, based on a collaboration relationship, a first collaborative terminal corresponding to the first terminal.

In this embodiment of this application, for specific implementations of step S600' to step S606', refer to descriptions of step S400 to step S406.

Step S608': The first terminal allocates one part of model parameters to each of N first collaborative terminals. Different terminals correspond to different model parameters.

For example, the trained model parameters of the first terminal are divided into three parts: a model parameter 1, a model parameter 2, and a model parameter 3. A quantity of first collaborative terminals corresponding to the first terminal is 3, which are a collaborative terminal 1, a collaborative terminal 2, and a collaborative terminal 3. The first terminal allocates the model parameter 1 to the collaborative terminal 1, allocates the model parameter 2 to the collaborative terminal 2, and allocates the model parameter 3 to the collaborative terminal 3. It may be understood that the first terminal allocates different model parameters to different collaborative terminals.

Step S6010': The first terminal encrypts target data by using first encryption noise, to obtain an encrypted third model parameter, where the target data is null; the N first collaborative terminals encrypt, by using respective second encryption noise, model parameters allocated to the N first collaborative terminals, to obtain encrypted fourth model parameters; and no noise is included after superposition of the first encryption noise and the respective second encryption noise of the N first collaborative terminals.

In this embodiment of this application, for an implementation process of how the first terminal and the first collaborative terminal generate respective encryption noise, refer to the foregoing description. Specifically, after generating the respective encryption noise, the first terminal and the first collaborative terminal may encrypt, by using the respective encryption noise, model parameters allocated to the first terminal and the first collaborative terminal. In this implementation, data security can be improved.

As described in the foregoing example, the trained model parameters of the first terminal are divided into three parts: a model parameter 1, a model parameter 2, and a model parameter 3. A quantity of first collaborative terminals corresponding to the first terminal is 3, which are a collaborative terminal 1, a collaborative terminal 2, and a collaborative terminal 3. Because the first terminal does not send a model parameter to the server, the first terminal allocates the model parameter 1 to the collaborative terminal 1, allocates the model parameter 2 to the collaborative terminal 2, and allocates the model parameter 3 to the collaborative terminal 3. In this case, the first terminal encrypts the null target data by using the first encryption noise, to obtain a third model parameter. The collaborative terminal 1 encrypts the model parameter 1 by using second encryption noise a corresponding to the collaborative terminal 1, to obtain a fourth model parameter a. The collaborative terminal 2 encrypts the model parameter 2 by using second encryption noise b corresponding to the collaborative terminal 2, to obtain a fourth model parameter b. The collaborative terminal 3 encrypts the model parameter 3 by using second encryption noise c corresponding to the collaborative terminal 3, to obtain a fourth model parameter c.

Step S6012': Send the third model parameter to the server by using the first terminal, and send the fourth model parameters to the server by using the first collaborative terminal.

As described in the foregoing example, the first terminal encrypts the null target data by using the first encryption noise, to obtain a third model parameter. The collaborative terminal 1 encrypts the model parameter 1 by using second encryption noise a corresponding to the collaborative terminal 1, to obtain a fourth model parameter a. The collaborative terminal 2 encrypts the model parameter 2 by using second encryption noise b corresponding to the collaborative terminal 2, to obtain a fourth model parameter b. The collaborative terminal 3 encrypts the model parameter 3 by using second encryption noise c corresponding to the collaborative terminal 3, to obtain a fourth model parameter c. In this case, the collaborative terminals corresponding to the first terminal send the second model parameters (a+b+c) encrypted by using the respective encryption noise to the server. Step S6014': The server aggregates trained model parameters of a plurality of terminals, to obtain a second machine learning model.

In this embodiment of this application, after the server obtains all the model parameters of the plurality of terminals, the server may aggregate the plurality of model parameters. Specifically, the server may perform average calculation on the plurality of model parameters based on a corresponding weight coefficient of each model parameter, to obtain the second machine learning model. The second machine learning model includes an averaged global model parameter. Herein, the weight coefficient is a percentage of a data amount of each terminal to a total data amount in the federated learning system. For example, the model parameter is gradient information, and the model parameter corresponding to each terminal is gradient information including encryption noise. In an example, a quantity of terminals in the federated learning system is M. After the server obtains all model parameters of the M terminals, when the server aggregates the plurality of model parameters, obtained global gradient information does not include noise. In this case, when the server performs training by using the global model parameter, because encryption noise may cancel each other, adverse impact (for example, an accuracy decrease of the machine learning model) caused by noise on accuracy of the machine learning model can be avoided. In an example, a quantity of terminals in the federated learning system is M. A terminal (terminal 1) is used as an example. When the server does not obtain all model parameters corresponding to the terminal 1, when the server aggregates a plurality of model parameters, obtained global gradient information includes noise. In this case, when the server performs training by using the global model parameter, encryption noise stays in the gradient information, which causes severe impact on accuracy of the machine learning model. To resolve this problem, aggregation performed by a server on a plurality of model parameters under any condition is described in detail in a subsequent embodiment, to avoid adverse impact of encryption noise on accuracy of a machine learning model.

Step S6016': The server determines whether the trained second machine learning model meets a convergent state. If the convergent state is met, step S6018' is performed. If the convergent state is not met, step S6020' is performed.

Step S6018': When the server determines that the second machine learning model meets the convergent state, the server determines the second machine learning model as a trained result of the federated learning system.

Step S6020': When the server determines that the second machine learning model does not meet the convergent state, the server delivers the second machine learning model to the first terminal, so that the first terminal retrains the second machine learning model by using the local data stored by the first terminal, to obtain trained model parameters, until the server obtains, based on trained model parameters of a plurality of terminals, a second machine learning model meeting the convergent state.

Step S6022': The server sends the second machine learning model to the first terminal.

Step S6024': The first terminal receives the second machine learning model.

In this embodiment of this application, for specific implementations of step S6014' to step S6024', refer to descriptions of step S408 to step S4018.

By implementing this embodiment of this application, when the machine learning model is trained by using the federated learning system, each terminal in the federated learning system may send all trained model parameters of each terminal to the server only by using a collaborative terminal that has a collaboration relationship with the terminal. Herein, the trained model parameters of each terminal are model parameters obtained by using respective encryption noise by each terminal and the collaborative terminal corresponding to each terminal. This can prevent an attacker from obtaining the trained model parameters of each terminal after attacking the terminal, to avoid a potential risk of data leakage, thereby improving security of data exchange between the server and the terminal.

In this embodiment of this application, for example, the model parameter is gradient information. After obtaining corresponding gradient information of the plurality of terminals, the server may obtain global gradient information. Specifically, the global gradient information may be represented as shown in formula (2):

$$\text{Grandient}' = C\_i * \text{Gradient} + \text{noise}_i - \text{noise}'_i \qquad (2)$$

Figures 1, 6C:
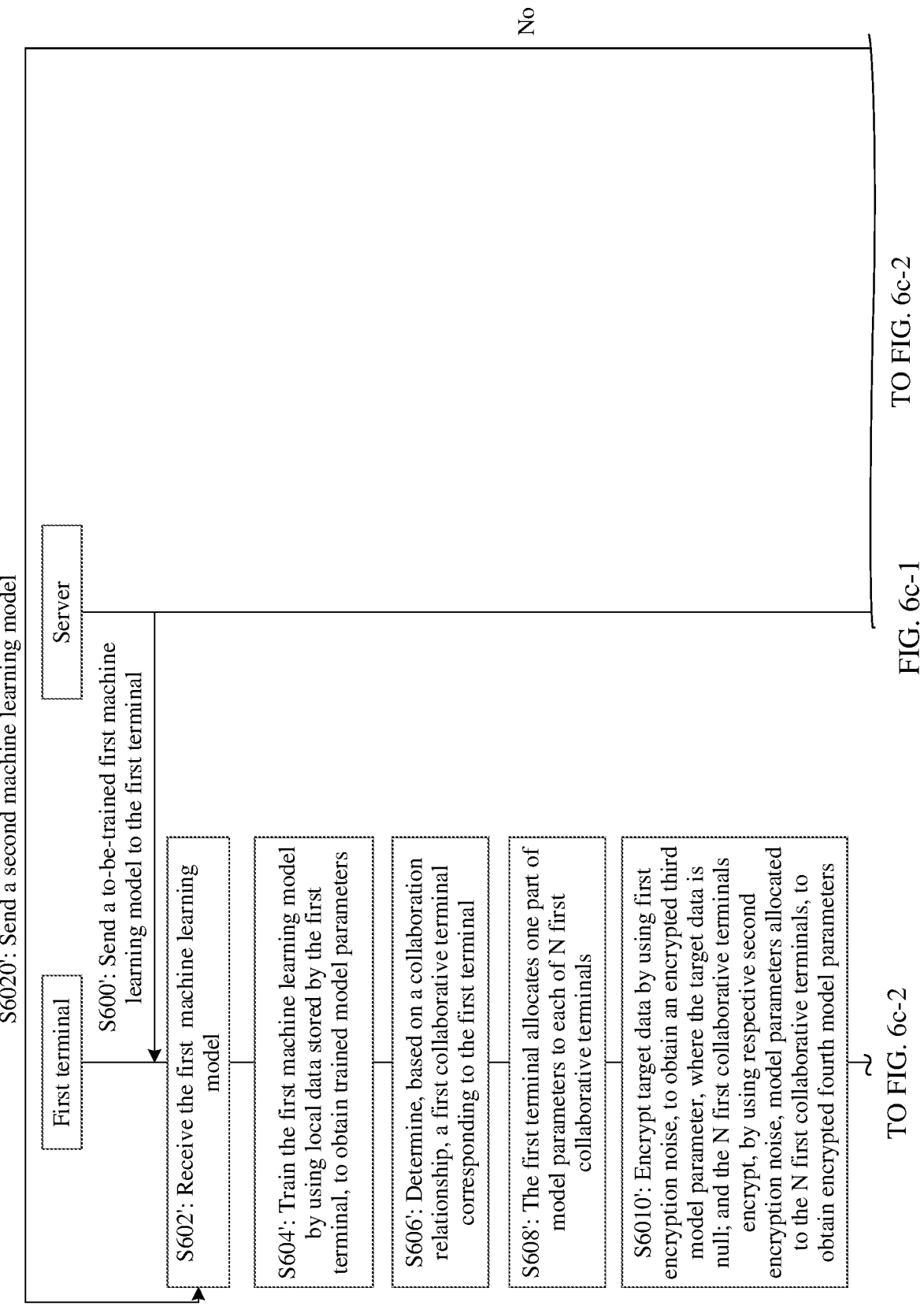
Figures 2, 3, 6C:
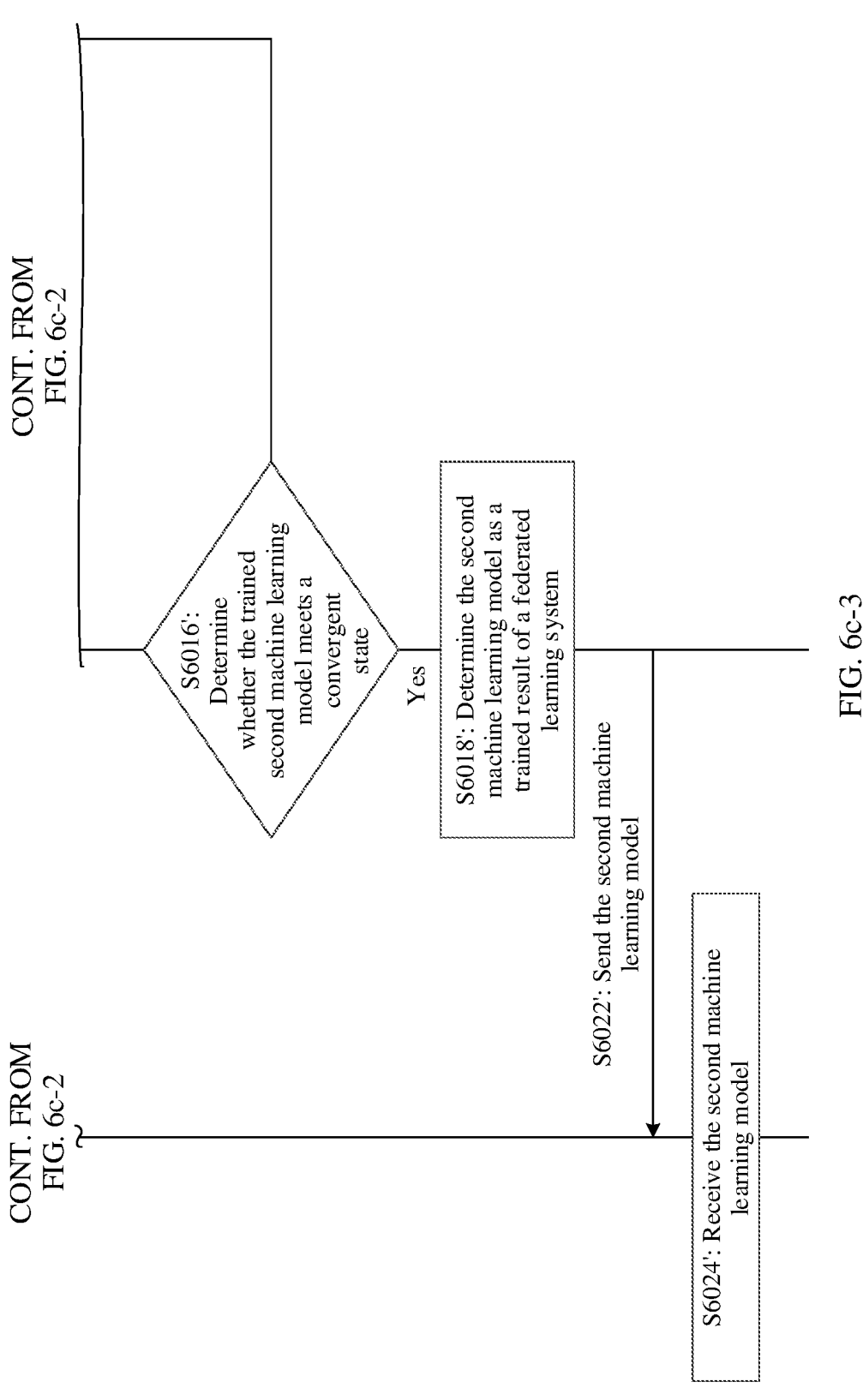

$C\_i$ represents a weight coefficient corresponding to an $i^{th}$ terminal in the federated learning system, $\text{noise}_i$ represents encryption noise corresponding to the $i^{th}$ terminal, and $\text{noise}'_i$ represents respective encryption noises of a collaborative terminal corresponding to the $i^{th}$ terminal. It may be understood that, when the server aggregates a plurality of pieces of gradient information, if noise and noise' cannot cancel each other, encryption noise stays in the gradient information, which causes severe impact (for example, an accuracy decrease of the machine learning model) on accuracy of the machine learning model. To avoid impact on accuracy of the machine learning model from encryption noise that cannot cancel each other, as shown in FIG. 6c-1 to FIG. 6c-3, an embodiment of this application further provides another federated learning training method. Before step S6014 shown in FIG. 6a-2 (or step S6014' shown in FIG. 6b-2), the method may further include step S6026 and step S6028, which are specifically described as follows:

Step S6026: The server determines whether corresponding model parameters of the plurality of terminals include noise after superposition. If no noise is included, step S6014 is performed. If noise is included, step S6028 is performed.

Step S6028: The server re-obtains the corresponding model parameters of the plurality of terminals, until the corresponding model parameters of the plurality of terminals that are obtained by the server do not include noise after superposition.

For example, a quantity of terminals in the federated learning system is M. Only when the server obtains all model parameters of the M terminals, the server aggregates the plurality of model parameters, to avoid adverse impact of noise on accuracy of the machine learning model.

By implementing this embodiment of this application, because the plurality of model parameters obtained by the server are model parameters obtained through encryption by using the respective encryption noise by each terminal and the collaborative terminal corresponding to each terminal, when the server determines that the corresponding model parameters of the plurality of terminals do not include noise after superposition, training may be performed based on the plurality of model parameters. This can avoid a failure to cancel encryption noise, thereby avoiding adverse impact (for example, an accuracy decrease of the machine learning model) caused by noise on accuracy of the machine learning model.

It should be noted that, in any one of the foregoing embodiments, the trained model parameters of the first terminal may be compressed model parameters. The compressed model parameters include model parameters and corresponding index values. For example, a model parameter whose length is 100 may be obtained when the first terminal trains the first machine learning model by using the local data stored by the first terminal. In an example, a value of a compression proportion R is given randomly. For example, if the model parameter whose length is 100 is compressed by using the compression proportion R=0.1, a model parameter whose length is 10 may be obtained. It may be understood that, in different application scenarios, the compression proportion R may have different values. That is, an adapted compression proportion R may be set based on a specific application scenario. In an example, 100 model parameters may be each compared with a specified threshold, and a model parameter less than the threshold is removed, to obtain compressed model parameters. In this implementation, when it is ensured that accuracy of the machine learning model does not change, the terminal in the federated learning system may send compressed model parameters to the server, thereby improving efficiency of data transmission between the terminal and the server.

The foregoing embodiments focus on how to train the machine learning model by using the federated learning system, to obtain the trained second machine learning model. Next, how to use the trained second machine learning model is described in detail.

Figure 7A:
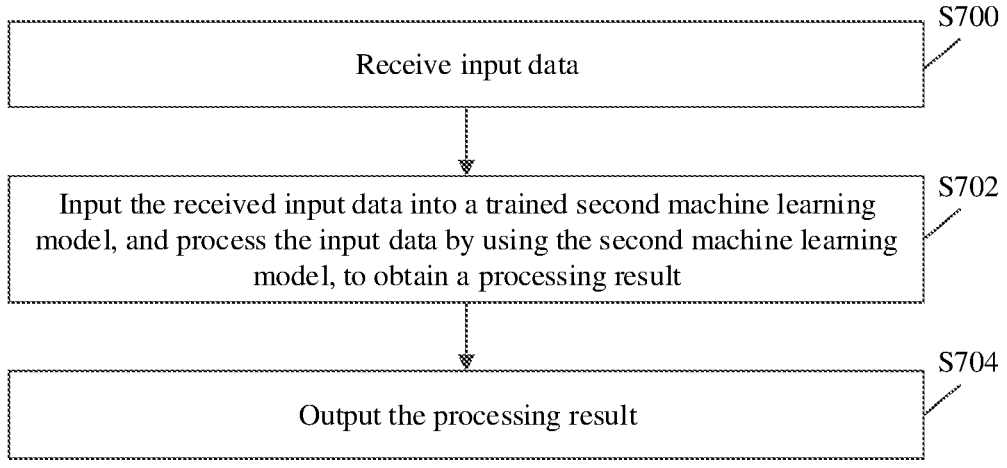
FIG. 7*a* is an example schematic flowchart of a data processing method according to an embodiment of this application.

In an example, after obtaining the trained machine learning model, the server 222 may send the trained machine learning model to the client device 240 (that is, a terminal in the federated learning system). The client device 240 sends the trained machine learning model to the user device 250 (terminal). In an example, the server 222 may alternatively directly send the trained machine learning model to the user device 250. The user device 250 may run the trained machine learning model to implement a specific function. With reference to FIG. 7a, the following describes a data processing method provided in an embodiment of this application. The method may include but is not limited to a part or all of the following steps.

S700: Receive input data.

S702: Input the input data into a trained second machine learning model, and process the input data by using the second machine learning model, to obtain a processing result.

S704: Output the processing result.

An output manner includes but is not limited to output by using a text, an image, voice, a video, or the like.

The trained second machine learning model is obtained through training by using the federated learning training method in any one of the foregoing embodiments. The input data may be an image, a text, or the like, and is related to a specific function of a to-be-trained machine learning model. For a training process of the machine learning model, refer to related descriptions in the foregoing embodiments.

Figure 7B:
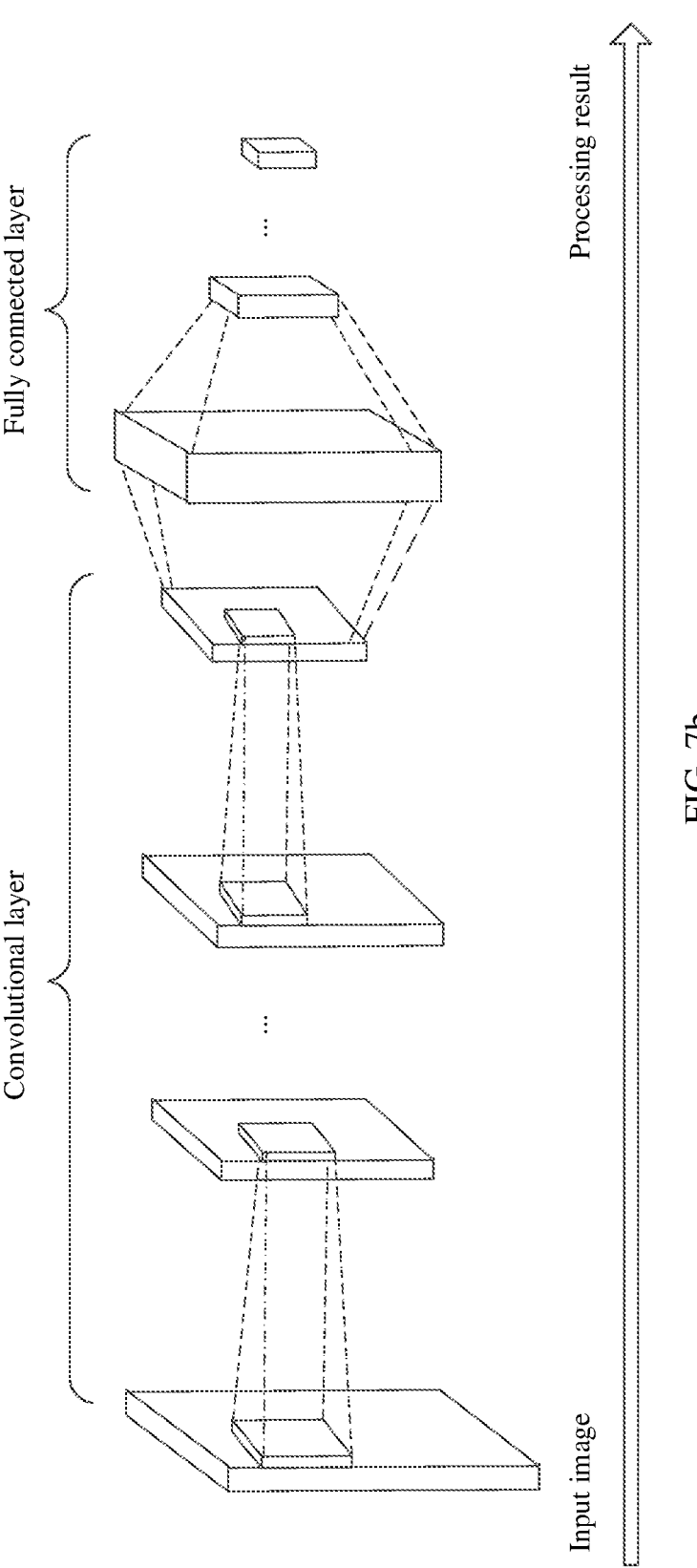
FIG. 7*b* is an example schematic diagram of a data processing process according to an embodiment of this application.

In an application scenario of this embodiment of this application, the data processing method is specifically an image processing method, including: A terminal receives an input image, and inputs the input image into a trained second machine learning model. For example, the second machine learning model may be specifically a convolutional neural network. The input image is processed by using the trained convolutional neural network to obtain a processing result. For example, a processing process may be shown in FIG. 7b. Content of the processing result depends on a function of the trained neural network, and may be an image classification result, recognition result, or the like. The function of the trained neural network depends on a function of a to-be-trained neural network. For example, if the to-be-trained neural network is a face attribute recognition network, and is configured to recognize an attribute, such as a gender, an age, and a race, of a person described in an input face image, the trained neural network may recognize a gender, an age, a race, and the like of a person described in the input image. The processing result may include the recognized gender, age, and race in the input image.

In another application scenario of this embodiment of this application, the data processing method is specifically a text processing method, including: A terminal receives an input text, and inputs the input text into a trained second machine learning model. For example, the second machine learning model may be specifically a recurrent neural network. The input text is processed by using the trained recurrent neural network to obtain a processing result. Content of the processing result depends on a function of the trained neural network, and may be a text classification result, recognition result, or the like. The function of the trained neural network depends on a function of a to-be-trained neural network. For example, if the to-be-trained neural network is a text recognition network and is configured to recognize an intent of a description of an input text, the trained neural network may recognize an intent of the input text, and further perform an operation corresponding to the recognized intent. For example, when the recognized intent is to "answer a call", the terminal (such as a mobile phone) may answer a current call.

By implementing this embodiment of this application, because the second machine learning model is obtained by performing training by using corresponding local data of a plurality of different terminals, regardless of whether the local data of the terminals differs greatly or little, in this implementation, the trained second machine learning model can have a strong generalization capability, and when the input data is processed by using the trained second machine learning model, processing accuracy of the input data can be improved. For example, when the input data is an image, image recognition accuracy can be improved. For another example, when the input data is voice, voice recognition accuracy can be improved.

The following describes apparatuses in embodiments of this application with reference to accompanying drawings.

Figure 8:
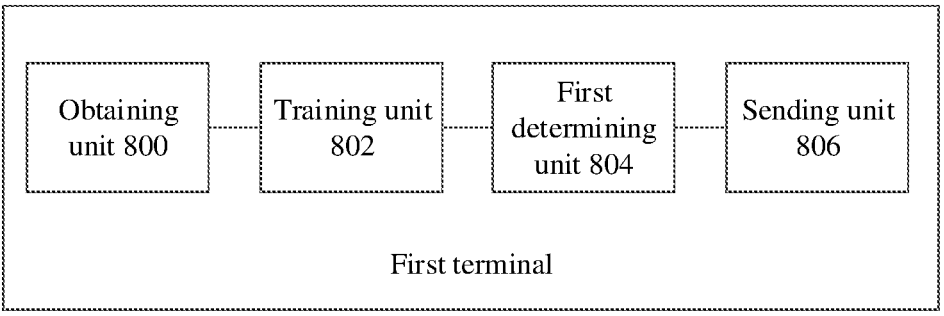
FIG. 8 is an example schematic diagram of a structure of a terminal according to an embodiment of this application.

FIG. 8 is a schematic block diagram of a terminal according to an embodiment of this application. Specifically, the first terminal shown in FIG. 8 may be specifically the terminal shown in FIG. 2*a*. As shown in FIG. 8, the first terminal 80 may include:

an obtaining unit 800, configured to obtain a to-be-trained first machine learning model from the server, where the first terminal is any one of the plurality of terminals;

a training unit 802, configured to train the first machine learning model by using local data stored by the first terminal, to obtain trained model parameters;

a first determining unit 804, configured to determine, based on a collaboration relationship, a first collaborative terminal corresponding to the first terminal; and a sending unit 806, configured to send a part or all of the trained model parameters of the first terminal to the server by using the first collaborative terminal, where the collaboration relationship is delivered by the server to the first terminal; and when the server aggregates trained model parameters of the plurality of terminals to obtain a second machine learning model that meets a convergent state, the server determines the second machine learning model as a trained result of the federated learning system.

In a possible implementation, the sending unit 806 is configured to:

send all the trained model parameters of the first terminal to the server by using the first collaborative terminal; or send the trained model parameters of the first terminal to the server jointly by using the first terminal and the first collaborative terminal.

In a possible implementation, the first terminal 80 may further include:

a second determining unit 808 (not shown), configured to determine a quantity of first collaborative terminals required in collaboration with the first terminal to send the model parameters to the server.

The first determining unit 804 is configured to:

determine the first collaborative terminal based on the determined quantity and the collaboration relationship.

In a possible implementation, a quantity of first collaborative terminals corresponding to the first terminal is N. When a part of the trained model parameters of the first terminal are sent to the server by using the first collaborative terminal, the trained model parameters of the first terminal include N+1 parts. N is a positive integer greater than 1. The first terminal may further include:

a first processing unit 8010, configured to: allocate one part of model parameters to each of the first terminal and the N first collaborative terminals, where different terminals correspond to different model parameters; and encrypt, by using first encryption noise, a model parameter allocated to the first terminal, to obtain an encrypted first model parameter, where the N first collaborative terminals encrypt, by using respective second encryption noise, model parameters allocated to the N first collaborative terminals, to obtain encrypted second model parameters; and no noise is included after superposition of the first encryption noise and the respective second encryption noise of the N first collaborative terminals.

The sending unit 806 is configured to:

send the first model parameter to the server by using the first terminal, and send the second model parameters to the server by using the first collaborative terminals.

In a possible implementation, a quantity of first collaborative terminals corresponding to the first terminal is N. When all the trained model parameters of the first terminal are sent to the server by using the first collaborative terminal, the trained model parameters of the first terminal include N parts. N is a positive integer greater than 1. The first terminal 80 may further include:

a second processing unit 8012 (not shown), configured to: allocate one part of model parameters to each of the N first collaborative terminals, where different terminals correspond to different model parameters; and encrypt target data by using first encryption noise, to obtain an encrypted third model parameter, where the target data is null; the N first collaborative terminals encrypt, by using respective second encryption noise, model parameters allocated to the N first collaborative terminals, to obtain encrypted fourth model parameters; and no noise is included after superposition of the first encryption noise and the respective second encryption noise of the N first collaborative terminals.

The sending unit 806 is configured to:

send the third model parameter to the server by using the first terminal, and send the fourth model parameters to the server by using the first collaborative terminal.

In a possible implementation, the server stores a corresponding public key of each terminal in the federated learning system, the terminal in the federated learning system stores a public key that is delivered by the server and that corresponds to a collaborative terminal having a collaboration relationship with the terminal, the N first collaborative terminals include a first collaborative sub-terminal, and the first terminal 80 may further include:

a noise encryption unit 8014 (not shown), configured to: generate the first encryption noise based on a random seed; and encrypt the first encryption noise by using a public key corresponding to the first collaborative sub-terminal, to obtain first intermediate noise, where the first intermediate noise is used by the first collaborative sub-terminal to decrypt the first intermediate noise by using a private key corresponding to the first collaborative sub-terminal, to obtain the second encryption noise; and the first collaborative sub-terminal is any one of the N first collaborative terminals.

In a possible implementation, the trained model parameters of the first terminal are compressed model parameters.

In a possible implementation, the trained model parameters of the first terminal include corresponding index values, and the index values are used to represent storage addresses corresponding to the model parameters. The sending unit 806 is specifically configured to:

the first terminal sends, to the first collaborative terminal, an index value corresponding to a model parameter that needs to be sent by the first terminal to the server by using the first collaborative terminal.

The first collaborative terminal obtains the corresponding model parameter based on the index value, and sends the obtained model parameter to the server.

In this embodiment of this application, for specific implementations of the units, refer to related descriptions in the foregoing embodiments.

By implementing this embodiment of this application, when the machine learning model is trained by using the federated learning system, each terminal in the federated learning system may send trained model parameters of each terminal to the server by using a collaborative terminal that has a collaboration relationship with the terminal. This can prevent an attacker from obtaining the trained model parameters of each terminal after attacking the terminal, to avoid a potential risk of data leakage, thereby improving security of data exchange between the server and the terminal.

Figure 9:
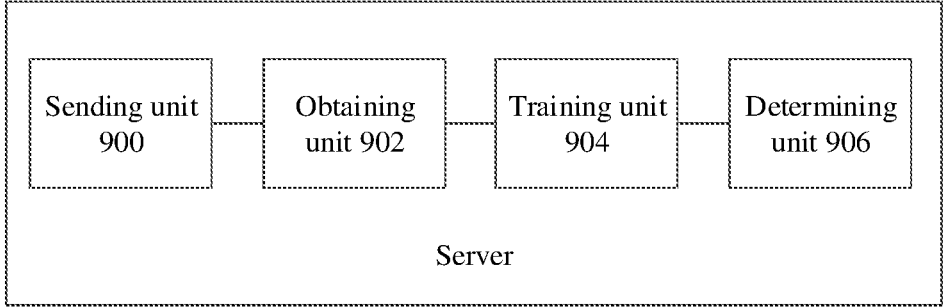
FIG. 9 is an example schematic diagram of a structure of a server according to an embodiment of this application.

FIG. 9 is a schematic block diagram of a server according to an embodiment of this application. Specifically, the server shown in FIG. 9 may be specifically the server shown in FIG. 2*a*. As shown in FIG. 9, the server 90 may include:

a sending unit 900, configured to send a to-be-trained first machine learning model to each of the plurality of terminals;

an obtaining unit 902, configured to obtain a part or all of model parameters that are determined by each of the plurality of terminals based on the collaboration relationship and that are sent by the collaborative terminal, where the plurality of model parameters are obtained by each terminal by training the first machine learning model by using local data stored by the terminal, and the collaboration relationship is delivered by the server to the terminal;

a training unit 904, configured to aggregate the plurality of model parameters to obtain a second machine learning model; and a determining unit 906, configured to: when the server determines that the second machine learning model meets a convergent state, determine the second machine learning model as a trained result of the federated learning system.

In a possible implementation, the plurality of model parameters are model parameters obtained through encryption by using respective encryption noise by each terminal and the collaborative terminal corresponding to each terminal. The server 90 may further include:

a judging unit 908 (not shown), configured to determine whether corresponding model parameters of the plurality of terminals include noise after superposition; and a first execution unit 9010, configured to: when the judging unit 908 determines that the corresponding model parameters of the plurality of terminals do not include noise after superposition, perform the step of aggregating, by the training unit, the plurality of model parameters to obtain a second machine learning model.

The training unit 904 is configured to:

perform average calculation on the plurality of model parameters to obtain a global model parameter, and train the first machine learning model based on the global model parameter to obtain the second machine learning model.

In a possible implementation, the server 90 may further include:

a second execution unit 9012 (not shown), configured to: when the judging unit 908 determines that the corresponding model parameters of the plurality of terminals include noise after superposition, re-obtain the corresponding model parameters of the plurality of terminals, until the corresponding model parameters of the plurality of terminals that are obtained by the server do not include noise after superposition.

In this embodiment of this application, for specific implementations of the units, refer to related descriptions in the foregoing embodiments.

By implementing this embodiment of this application, when the machine learning model is trained by using the federated learning system, each terminal in the federated learning system may send trained model parameters of each terminal to the server by using a collaborative terminal that has a collaboration relationship with the terminal. This can prevent an attacker from obtaining the trained model parameters of each terminal after attacking the terminal, to avoid a potential risk of data leakage, thereby improving security of data exchange between the server and the terminal.

Figure 10:
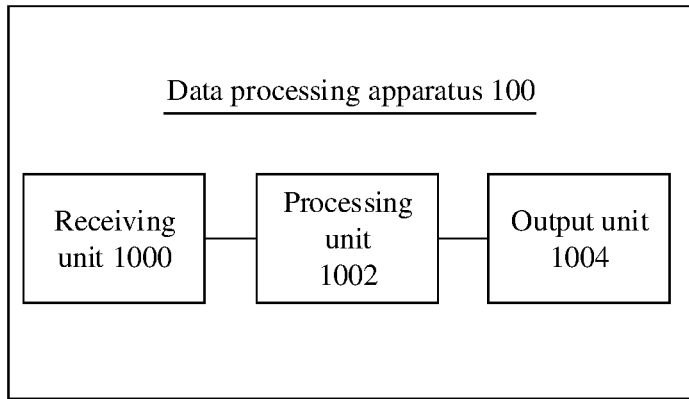
FIG. 10 is an example schematic diagram of a structure of a data processing apparatus according to an embodiment of this application.

FIG. 10 is a schematic block diagram of a data processing apparatus 100 (a terminal) according to an embodiment of this application. The data processing apparatus 100 shown in FIG. 10 (the apparatus 100 may be specifically the user device 250 in FIG. 2*a*) may include:

a receiving unit 1000, configured to receive input data;

a processing unit 1002, configured to: input the input data into a trained second machine learning model, and process the input data by using the second machine learning model, to obtain a processing result, where the trained second machine learning model is obtained by using any federated learning training method described in the foregoing embodiment; and an output unit 1004, configured to output the processing result.

For specific implementation of the functional units, refer to related descriptions in the foregoing method embodiments.

Figure 11:
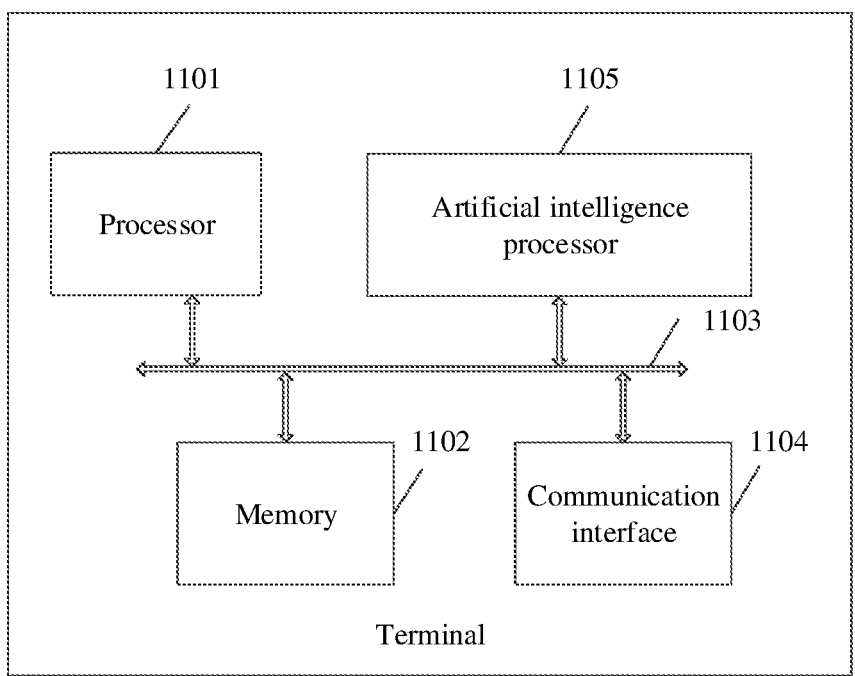
FIG. 11 is an example schematic diagram of a structure of another terminal according to an embodiment of this application.

As shown in FIG. 11, an embodiment of this application provides another terminal. The terminal may include a processor 1101, a memory 1102, a communication bus 1103, and a communication interface 1104. The processor 1101 is connected to the memory 1102 and the communication interface 1104 by using the communication bus 1103.

The processor 1101 may use a general-purpose central processing unit (CPU), a microprocessor, an application-specific integrated circuit (ASIC), a graphics processing unit (GPU), a neural-network processing unit (NPU), or one or more integrated circuits, and is configured to execute a related program, to perform the federated learning training method in the method embodiments of this application.

The processor 1101 may be an integrated circuit chip and has a signal processing capability. In an implementation process, steps of the federated learning training method in this application may be implemented by using a hardware integrated logical circuit in the processor 1101 or instructions in a form of software. The processor 1101 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1101 may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a storage medium mature in the art, such as a random access memory, a flash memory, a read-only memory, a programmable read-only memory, an electrically erasable programmable memory, or a register. The storage medium is located in the memory 1102, and the processor 1101 reads information in the memory 1102 and completes the federated learning training method in the method embodiments of this application in combination with hardware of the processor.

The memory 1102 may be a read-only memory (ROM), a static storage device, a dynamic storage device, or a random access memory (RAM). The memory 1102 may store a program and data, for example, a program of the federated learning training method in embodiments of this application. When the program stored in the memory 1102 is executed by the processor 1101, the processor 1101 and the communication interface 1104 are configured to perform steps of the federated learning training method in embodiments of this application, for example, the program that is in embodiments of this application and that is configured to implement the federated learning training method in embodiments of this application.

The communication interface 1104 uses a transceiver apparatus such as but not limited to a transceiver, to implement communication between the terminal 1100 and another device or a communication network. For example, a trained neural network may be obtained by using the communication interface 1104, to implement information exchange with an execution device, a client device, a user device, a terminal device, or the like.

Optionally, the terminal may further include an artificial intelligence processor 1105. The artificial intelligence processor 1105 may be any processor suitable for large-scale exclusive OR operation processing, such as a neural-network processing unit (NPU), a tensor Processing Unit (TPU), or a graphics processing unit (GPU). The artificial intelligence processor 1105 may be connected to a host CPU as a coprocessor, and assigned a task by the host CPU. The artificial intelligence processor 1105 may implement one or more operations in the federated learning training method. For example, the NPU is used as an example. A core part of the NPU is an operation circuit, and the operation circuit is controlled by using a controller to extract matrix data in the memory 1102 and perform multiplication and addition operations.

The processor 1101 is configured to invoke the data and the program code in the memory to perform the following operations:

obtaining a to-be-trained first machine learning model from the server, where the first terminal is any one of the plurality of terminals;

training the first machine learning model by using local data stored by the first terminal, to obtain trained model parameters;

determining, based on a collaboration relationship, a first collaborative terminal corresponding to the first terminal, and sending a part or all of the trained model parameters of the first terminal to the server by using the first collaborative terminal, where the collaboration relationship is delivered by the server to the first terminal; and when the server aggregates trained model parameters of the plurality of terminals to obtain a second machine learning model that meets a convergent state, the server determines the second machine learning model as a trained result of the federated learning system.

The sending, by the processor 1101 by using the first collaborative terminal, a part or all of the trained model parameters of the first terminal to the server may include:

sending all the trained model parameters of the first terminal to the server by using the first collaborative terminal; or sending the trained model parameters of the first terminal to the server jointly by using the first terminal and the first collaborative terminal.

The processor 1101 may be further configured to:

determine a quantity of first collaborative terminals required in collaboration with the first terminal to send the model parameters to the server.

The determining, by the processor 1101 based on a collaboration relationship, a first collaborative terminal corresponding to the first terminal includes:

determining the first collaborative terminal based on the determined quantity and the collaboration relationship.

A quantity of first collaborative terminals corresponding to the first terminal is N. When a part of the trained model parameters of the first terminal are sent to the server by using the first collaborative terminal, the trained model parameters of the first terminal are divided into N+1 parts. N is a positive integer greater than 1. After the determining, by the processor 1101 based on a collaboration relationship, a first collaborative terminal corresponding to the first terminal, before the sending a part or all of the trained model parameters of the first terminal to the server by using the first collaborative terminal, the operations may further include:

allocating one part of model parameters to each of the first terminal and the N first collaborative terminals, where different terminals correspond to different model parameters; and encrypting, by using first encryption noise, a model parameter allocated to the first terminal, to obtain an encrypted first model parameter, where the N first collaborative terminals encrypt, by using respective second encryption noise, model parameters allocated to the N first collaborative terminals, to obtain encrypted second model parameters; and no noise is included after superposition of the first encryption noise and the respective second encryption noise of the N first collaborative terminals.

The sending a part or all of the trained model parameters of the first terminal to the server by using the first collaborative terminal includes:

sending the first model parameter to the server by using the first terminal, and sending the second model parameters to the server by using the first collaborative terminals.

A quantity of first collaborative terminals corresponding to the first terminal is N. When all the trained model parameters of the first terminal are sent to the server by using the first collaborative terminal, the trained model parameters of the first terminal include N parts. N is a positive integer greater than 1. After the determining, by the processor 1101 based on a collaboration relationship, a first collaborative terminal corresponding to the first terminal, before the sending a part or all of the trained model parameters of the first terminal to the server by using the first collaborative terminal, the operations further include:

allocating one part of model parameters to each of the N first collaborative terminals, where different terminals correspond to different model parameters; and encrypting target data by using first encryption noise, to obtain an encrypted third model parameter, where the target data is null; the N first collaborative terminals encrypt, by using respective second encryption noise, model parameters allocated to the N first collaborative terminals, to obtain encrypted fourth model parameters; and no noise is included after superposition of the first encryption noise and the respective second encryption noise of the N first collaborative terminals.

The sending a part or all of the trained model parameters of the first terminal to the server by using the first collaborative terminal includes:

sending the third model parameter to the server by using the first terminal, and sending the fourth model parameters to the server by using the first collaborative terminal.

The server stores a corresponding public key of each terminal in the federated learning system, the terminal in the federated learning system stores a public key that is delivered by the server and that corresponds to a collaborative terminal having a collaboration relationship with the terminal, the N first collaborative terminals include a first collaborative sub-terminal, and the processor 1101 may be further configured to:

generate the first encryption noise based on a random seed; and encrypt the first encryption noise by using a public key corresponding to the first collaborative sub-terminal, to obtain first intermediate noise, where the first intermediate noise is used by the first collaborative sub-terminal to decrypt the first intermediate noise by using a private key corresponding to the first collaborative sub-terminal, to obtain the second encryption noise; and the first collaborative sub-terminal is any one of the N first collaborative terminals.

The trained model parameters of the first terminal are compressed model parameters.

The trained model parameters of the first terminal include corresponding index values, and the index values are used to represent storage addresses corresponding to the model parameters. The sending a part or all of the trained model parameters of the first terminal to the server by using the first collaborative terminal includes:

The first terminal sends, to the first collaborative terminal, an index value corresponding to a model parameter that needs to be sent by the first terminal to the server by using the first collaborative terminal.

The first collaborative terminal obtains the corresponding model parameter based on the index value, and sends the obtained model parameter to the server.

It should be understood that, for implementations of the components, refer to corresponding descriptions in the foregoing federated learning training method embodiments.

Figure 12:
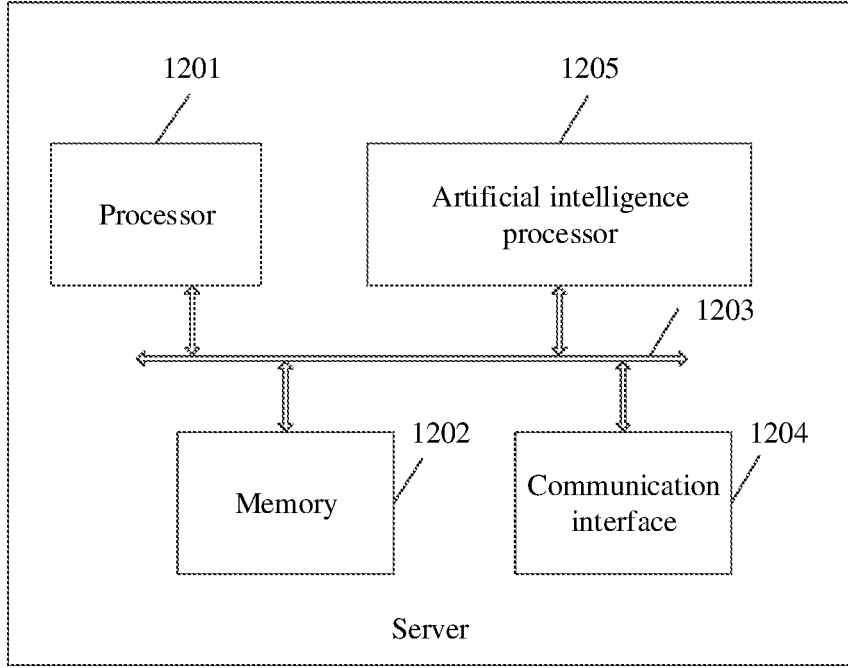
FIG. 12 is an example schematic diagram of a structure of another server according to an embodiment of this application.

As shown in FIG. 12, an embodiment of this application provides another server. The server may include a processor 1201, a memory 1202, a communication bus 1203, and a communication interface 1204. The processor 1201 is connected to the memory 1202 and the communication interface 1204 by using the communication bus 1203.

The processor 1201 may use a general-purpose central processing unit (CPU), a microprocessor, an application-specific integrated circuit (ASIC), a graphics processing unit (GPU), a neural-network processing unit (NPU), or one or more integrated circuits, and is configured to execute a related program, to perform the federated learning training method in the method embodiments of this application.

The processor 1201 may be an integrated circuit chip and has a signal processing capability. In an implementation process, steps of the federated learning training method in this application may be implemented by using a hardware integrated logical circuit in the processor 1201 or instructions in a form of software. The processor 1201 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1201 may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a storage medium mature in the art, such as a random access memory, a flash memory, a read-only memory, a programmable read-only memory, an electrically erasable programmable memory, or a register. The storage medium is located in the memory 1202, and the processor 1201 reads information in the memory 1202 and completes the federated learning training method in the method embodiments of this application in combination with hardware of the processor.

The memory 1202 may be a read-only memory (ROM), a static storage device, a dynamic storage device, or a random access memory (RAM). The memory 1202 may store a program and data, for example, a program of the federated learning training method in embodiments of this application. When the program stored in the memory 1202 is executed by the processor 1201, the processor 1201 and the communication interface 1204 are configured to perform steps of the federated learning training method in embodiments of this application, for example, the program that is in embodiments of this application and that is configured to implement the federated learning training method in embodiments of this application.

The communication interface 1204 uses a transceiver apparatus such as but not limited to a transceiver, to implement communication between the server 1200 and another device or a communication network. For example, a trained neural network may be obtained by using the communication interface 1204, to implement information exchange with an execution device, a client device, a user device, a terminal device, or the like.

Optionally, the server may further include an artificial intelligence processor 1205. The artificial intelligence processor 1205 may be any processor suitable for large-scale exclusive OR operation processing, such as a neural-network processing unit (NPU), a tensor Processing Unit (TPU), or a graphics processing unit (GPU). The artificial intelligence processor 1205 may be connected to a host CPU as a coprocessor, and assigned a task by the host CPU. The artificial intelligence processor 1205 may implement one or more operations in the federated learning training method. For example, the NPU is used as an example. A core part of the NPU is an operation circuit, and the operation circuit is controlled by using a controller to extract matrix data in the memory 1202 and perform multiplication and addition operations.

The processor 1201 is configured to invoke the data and the program code in the memory to perform the following operations:

sending a to-be-trained first machine learning model to each of the plurality of terminals;

obtaining a part or all of model parameters that are determined by each of the plurality of terminals based on the collaboration relationship and that are sent by the collaborative terminal, where the plurality of model parameters are obtained by each terminal by training the first machine learning model by using local data stored by the terminal, and the collaboration relationship is delivered by the server to the terminal;

aggregating the plurality of model parameters to obtain a second machine learning model; and when determining that the second machine learning model meets a convergent state, determining the second machine learning model as a trained result of the federated learning system.

The plurality of model parameters are model parameters obtained through encryption by using respective encryption noise by each terminal and the collaborative terminal corresponding to each terminal. Before the aggregating, by the processor 1201, the plurality of model parameters to obtain a second machine learning model, the operations further include:

determining whether corresponding model parameters of the plurality of terminals include noise after superposition; and if no noise is included, performing the step of aggregating the plurality of model parameters to obtain a second machine learning model.

The aggregating, by the processor 1201, the plurality of model parameters to obtain a second machine learning model includes:

performing average calculation on the plurality of model parameters to obtain a global model parameter, and training the first machine learning model based on the global model parameter to obtain the second machine learning model.

The processor 1201 may be further configured to:

if noise is included, re-obtain the corresponding model parameters of the plurality of terminals, until the corresponding model parameters of the plurality of terminals that are obtained by the server do not include noise after superposition.

It should be understood that, for implementations of the components, refer to corresponding descriptions in the foregoing federated learning training method embodiments.

Figure 13:
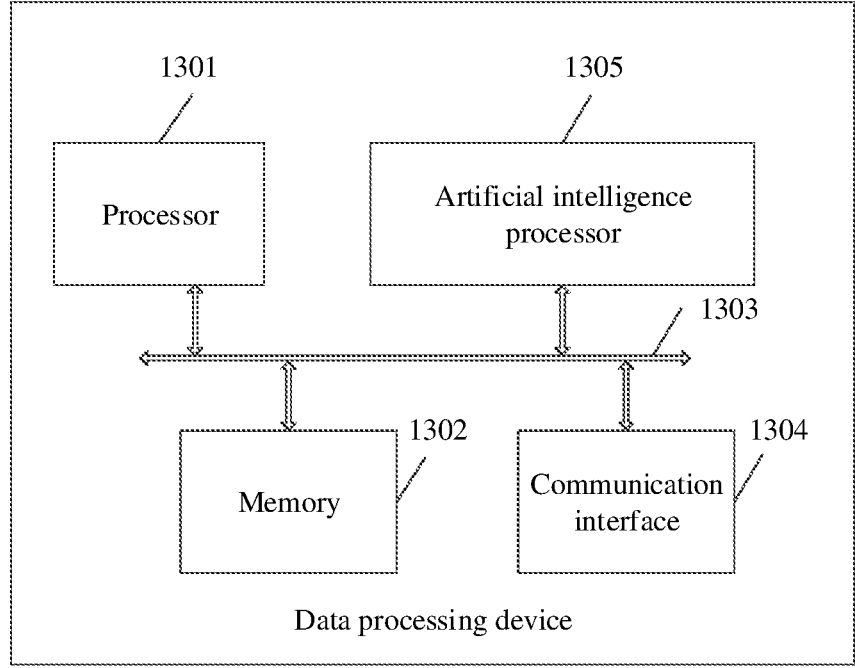
FIG. 13 is an example schematic diagram of a structure of a data processing device according to an embodiment of this application.

FIG. 13 is a schematic diagram of a structure of a data processing device according to an embodiment of this application. As shown in FIG. 13, the data processing device may include a processor 1301, a memory 1302, a communication bus 1303, and a communication interface 1304. The processor 1301 is connected to the memory 1302 and the communication interface 1304 by using the communication bus 1303.

The processor 1301 may use a general-purpose central processing unit (CPU), a microprocessor, an application-specific integrated circuit (ASIC), a graphics processing unit (GPU), a neural-network processing unit (NPU), or one or more integrated circuits, and is configured to execute a related program, to perform the data processing method in the method embodiments of this application.

The processor 1301 may be an integrated circuit chip and has a signal processing capability. In an implementation process, steps of the data processing method may be implemented by using a hardware integrated logical circuit in the processor 1301 or instructions in a form of software. The processor 1301 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1301 may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a storage medium mature in the art, such as a random access memory, a flash memory, a read-only memory, a programmable read-only memory, an electrically erasable programmable memory, or a register. The storage medium is located in the memory 1302, and the processor 1301 reads information in the memory 1302 and completes the data processing method in the method embodiments of this application in combination with hardware of the processor.

The memory 1302 may be a read-only memory (ROM), a static storage device, a dynamic storage device, or a random access memory (RAM). The memory 1302 may store a program and data, for example, a program of the data processing method in embodiments of this application. When the program stored in the memory 1302 is executed by the processor 1301, the processor 1301 and the communication interface 1304 are configured to perform steps of the data processing method in embodiments of this application, for example, the program that is in embodiments of this application and that is configured to implement the data processing method in embodiments of this application.

The communication interface 1304 uses a transceiver apparatus such as but not limited to a transceiver, to implement communication between the data processing device 1300 and another device or a communication network. For example, a trained neural network may be obtained by using the communication interface 1304, to implement information exchange with an execution device, a client device, a user device, a terminal device, or the like.

Optionally, the data processing device may further include an artificial intelligence processor 1305. The artificial intelligence processor 1305 may be any processor suitable for large-scale exclusive OR operation processing, such as a neural-network processing unit (NPU), a tensor Processing Unit (TPU), or a graphics processing unit (GPU). The artificial intelligence processor 1305 may be connected to a host CPU as a coprocessor, and assigned a task by the host CPU. The artificial intelligence processor 1305 may implement one or more operations in the data processing method. For example, the NPU is used as an example. A core part of the NPU is an operation circuit, and the operation circuit is controlled by using a controller to extract matrix data in the memory 1302 and perform multiplication and addition operations.

The processor 1301 is configured to invoke the data and the program code in the memory to perform the following operations:

receiving input data;

inputting the input data into a trained second machine learning model, and processing the input data by using the second machine learning model, to obtain a processing result, where the trained second machine learning model is obtained by using the data processing method in any one of the foregoing embodiments; and outputting the processing result.

It should be understood that, for implementations of the components, refer to corresponding descriptions in the foregoing federated learning training method embodiments.

An embodiment of the present technology further provides a computer storage medium. The computer-readable storage medium stores instructions, and when the instructions are run on a computer or a processor, the computer or the processor performs one or more steps in the method in any one of the foregoing embodiments. When implemented in a form of software functional units and sold or used as an independent product, the component modules of the apparatus may be stored in the computer-readable storage medium. Based on such an understanding, the technical solutions of this application essentially, or a part contributing to a conventional technology, or all or some of the technical solutions may be implemented in a form of a software product. The computer product is stored in the computer-readable storage medium.

The computer-readable storage medium may be an internal storage unit of the device in the foregoing embodiment, for example, a hard disk or an internal memory. Alternatively, the computer-readable storage medium may be an external storage device of the device, for example, an equipped plug-in hard disk, smart media card (SMC), secure digital (SD) card, or flash card. Further, the computer-readable storage medium may alternatively include both the internal storage unit of the device and the external storage device. The computer-readable storage medium is configured to store the computer program and other programs and data that are required by the device. The computer-readable storage medium may be further configured to temporarily store data that has been output or is to be output.

A person of ordinary skill in the art may understand that all or some of the processes of the methods in embodiments may be implemented by a computer program instructing related hardware. The computer program may be stored in a computer-readable storage medium. When the program runs, the processes of the methods in embodiments are performed. The foregoing storage medium includes any medium that can store program code, such as a ROM, a RAM, a magnetic disk, or an optical disc.

An order of the steps of the method in embodiments of this application may be adjusted, combined, or removed based on an actual requirement.

The modules in the apparatus in embodiments of this application may be combined, divided, and deleted based on an actual requirement.

A person of ordinary skill in the art may be aware that, in combination with the examples described in embodiments disclosed in this application, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art can appreciate that functions described with reference to various illustrative logical blocks, modules, and algorithm steps disclosed and described in embodiments of this application may be implemented by hardware, software, firmware, or any combination thereof. If software is used for implementation, the functions described with reference to the illustrative logical blocks, modules, and steps may be stored in or transmitted over a computer-readable medium as one or more instructions or code and executed by a hardware-based processing unit. The computer-readable medium may include a computer-readable storage medium corresponding to a tangible medium, such as a data storage medium, or any communication medium that facilitates transmission of a computer program from one place to another (for example, based on a communication protocol). In this manner, the computer-readable medium may generally correspond to: (1) a non-transitory tangible computer-readable storage medium, or (2) a communication medium, for example, a signal or a carrier. The data storage medium may be any usable medium that can be accessed by one or more computers or one or more processors to retrieve instructions, code, and/or data structures for implementing the technologies described in this application. A computer program product may include a computer-readable medium.

It may be clearly understood by a person skilled in the art that, for the purpose of convenient and brief description, for a detailed working process of the foregoing system, apparatus, and unit, refer to a corresponding process in the foregoing method embodiments.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or a part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A federated learning training method applied to a federated learning system, the federated learning system includes a server and a plurality of terminals, and the server is configured to store a corresponding collaboration relationship of each terminal in the federated learning system, the federated learning training method comprising:

obtaining, by a first terminal, a to-be-trained first machine learning model from the server;

training, by the first terminal, the first machine learning model by using local data stored by the first terminal, to obtain trained model parameters;

determining, by the first terminal based on a collaboration relationship, a first collaborative terminal corresponding to the first terminal;

allocating, by the first terminal, a part of the model parameters to the first collaborative terminal;

encrypting, by the first terminal, target data by using first encryption noise, to obtain an encrypted first model parameter; and sending, by the first terminal, the first model parameter to the server, wherein the collaboration relationship is delivered by the server to the first terminal, the collaboration relationship indicates a corresponding collaborative terminal of each terminal of the plurality of terminals, in association with the server aggregating trained model parameters of the plurality of terminals to obtain a second machine learning model that meets a convergent state, the server determines the second machine learning model as a trained result of the federated learning system, the first collaborative terminal encrypts, by using second encryption noise, the part of the model parameters allocated to the first collaborative terminal to obtain encrypted second model parameters, and the second model parameter is sent to the server by using the first collaborative terminal.

2. The method according to claim 1, further comprising:

determining, by the first terminal, a quantity of first collaborative terminals required in collaboration with the first terminal to send the model parameters to the server; and determining, by the first terminal based on the collaboration relationship, the first collaborative terminal corresponding to the first terminal comprises:

determining, by the first terminal, the first collaborative terminal based on the determined quantity of the first collaborative terminals and the collaboration relationship.

3. The method according to claim 1, wherein a quantity of first collaborative terminals corresponding to the first terminal is N, when a part of the trained model parameters of the first terminal are sent to the server by using the first collaborative terminal, the trained model parameters of the first terminal are divided into N+1 parts, wherein N is a positive integer greater than 1, and after determining, by the first terminal based on the collaboration relationship, the first collaborative terminal corresponding to the first terminal, and before sending the part or all of the trained model parameters of the first terminal to the server by using the first collaborative terminal, the method further comprises:

allocating, by the first terminal, one part of model parameters to each of the first terminal and the N first collaborative terminals, wherein different terminals correspond to different model parameters; and encrypting, by the first terminal by using first encryption noise, a model parameter allocated to the first terminal, to obtain an encrypted first model parameter, wherein the N first collaborative terminals encrypt, by using respective second encryption noise, model parameters allocated to the N first collaborative terminals, to obtain encrypted second model parameters, and no noise is comprised after superposition of the first encryption noise and the respective second encryption noise of the N first collaborative terminals, wherein sending the part or all of the trained model parameters of the first terminal to the server by using the first collaborative terminal comprises:

sending the first model parameter to the server by using the first terminal, and sending the second model parameters to the server by using the first collaborative terminals.

4. The method according to claim 1, wherein a quantity of first collaborative terminals corresponding to the first terminal is N, when all the trained model parameters of the first terminal are sent to the server by using the first collaborative terminal, the trained model parameters of the first terminal comprise N parts, wherein N is a positive integer greater than 1, and after determining, by the first terminal based on the collaboration relationship, the first collaborative terminal corresponding to the first terminal, and before sending the part or all of the trained model parameters of the first terminal to the server by using the first collaborative terminal, the method further comprises:

allocating, by the first terminal, one part of model parameters to each of the N first collaborative terminals, wherein different terminals correspond to different model parameters; and encrypting, by the first terminal, target data by using first encryption noise, to obtain an encrypted third model parameter, wherein the target data is null, the N first collaborative terminals encrypt, by using respective second encryption noise, model parameters allocated to the N first collaborative terminals, to obtain encrypted fourth model parameters, and no noise is comprised after superposition of the first encryption noise and the respective second encryption noise of the N first collaborative terminals, wherein sending the part or all of the trained model parameters of the first terminal to the server by using the first collaborative terminal comprises:

sending the third model parameter to the server by using the first terminal, and sending the fourth model parameters to the server by using the first collaborative terminal.

5. The method according to claim 3, wherein the server stores a corresponding public key of each terminal in the federated learning system, the terminal in the federated learning system stores a public key delivered by the server and corresponding to a collaborative terminal having a collaboration relationship with the terminal, the N first collaborative terminals comprise a first collaborative sub-terminal, and the method further comprises:

generating, by the first terminal, the first encryption noise based on a random seed; and encrypting, by the first terminal, the first encryption noise by using a public key corresponding to the first collaborative sub-terminal, to obtain first intermediate noise, wherein the first intermediate noise is used by the first collaborative sub-terminal to decrypt the first intermediate noise by using a private key corresponding to the first collaborative sub-terminal, to obtain the second encryption noise, and the first collaborative sub-terminal is any one of the N first collaborative terminals.

6. The method according to claim 1, wherein the trained model parameters of the first terminal are compressed model parameters.

7. The method according to claim 1, wherein the trained model parameters of the first terminal comprise corresponding index values, and the index values represent storage addresses corresponding to the model parameters, and the method further comprises:

sending, by the first terminal to the first collaborative terminal, an index value corresponding to a model parameter that needs to be sent by the first terminal to the server by using the first collaborative terminal; and obtaining, by the first collaborative terminal, the corresponding model parameter based on the index value, and sending the obtained model parameter to the server.

8. The method according to claim 1, wherein no noise is comprised after superposition of the first encryption noise and the respective second encryption noise.

9. A federated learning training method applied to a federated learning system, wherein the federated learning system includes a server and a plurality of terminals, and the server is configured to store a corresponding collaboration relationship of each terminal in the federated learning system, the federated learning training method comprising:

sending, by the server, a to-be-trained first machine learning model to each of the plurality of terminals;

obtaining, by the server, a part or all of model parameters determined by each of the plurality of terminals based on the collaboration relationship and sent by the collaborative terminal, wherein the plurality of model parameters are obtained by each terminal by training the first machine learning model by using local data stored by the terminal, and the collaboration relationship is delivered by the server to the terminal; and aggregating, by the server, the plurality of model parameters to obtain a second machine learning model, wherein the collaboration relationship indicates a corresponding collaborative terminal of each terminal of the plurality of terminals; and in association with the server determining that the second machine learning model meets a convergent state, determining, by the server, the second machine learning model as a trained result of the federated learning system, a part of the model parameters are allocated to a first collaborative terminal, target data is encrypted by using first encryption noise, to obtain an encrypted first model parameter, the part of the model parameters allocated to the first collaborative terminal are encrypted, by using second encryption noise, to obtain encrypted second model parameters, and the server receives the first model parameter via a first terminal, and receives the second model parameter via the first collaborative terminal.

10. The method according to claim 9, wherein the plurality of model parameters are obtained through encryption by using respective encryption noise by each terminal and the collaborative terminal corresponding to each terminal, and before aggregating, by the server, the plurality of model parameters to obtain the second machine learning model, the method further comprises:

determining, by the server, whether corresponding model parameters of the plurality of terminals comprise noise after superposition; and if no noise is comprised after the superposition, aggregating, by the server, the plurality of model parameters to obtain the second machine learning model; and aggregating, by the server, the plurality of model parameters to obtain the second machine learning model comprises:

performing, by the server, average calculation on the plurality of model parameters to obtain a global model parameter, and training the first machine learning model based on the global model parameter to obtain the second machine learning model.

11. The method according to claim 10, further comprising:

if noise is comprised, re-obtaining, by the server, the corresponding model parameters of the plurality of terminals, until the corresponding model parameters of the plurality of terminals that are obtained by the server do not comprise noise after superposition.

12. A data processing method, comprising:

receiving input data;

inputting the received input data into a trained second machine learning model, and processing the input data by using the second machine learning model, to obtain a processing result, wherein the trained second machine learning model is obtained by using the federated learning training method according to claim 1; and outputting the processing result.

13. A non-transitory computer-readable storage medium having computer readable instructions that, when executed by a processor, cause the processor to implement the federated learning training method according to claim 9.

14. The method according to claim 9, wherein no noise is comprised after superposition of the first encryption noise and the respective second encryption noise.

15. A first terminal, comprising:

a processor; and a memory configured to store computer readable instructions that, when executed by the processor, cause the processor to:

obtain a to-be-trained first machine learning model from a server;

train the first machine learning model by using local data stored by the first terminal, to obtain trained model parameters;

determine, based on a collaboration relationship, a first collaborative terminal corresponding to the first terminal;

allocate a part of the model parameters to the first collaborative terminal;

encrypt target data by using first encryption noise, to obtain an encrypted first model parameter; and send the first model parameter to the server, wherein the collaboration relationship indicates a corresponding collaborative terminal of each terminal of a plurality of terminals, the collaboration relationship is delivered by the server to the first terminal, and when the server aggregates trained model parameters of a plurality of terminals to obtain a second machine learning model that meets a convergent state, the server determines the second machine learning model as a trained result of a federated learning system, the first collaborative terminal encrypts, by using second encryption noise, the part of the model parameters allocated to the first collaborative terminal to obtain encrypted second model parameters, and the second model parameter is sent to the server by using the first collaborative terminal.

16. The first terminal according to claim 15, wherein the processor is further caused to:

determine a quantity of first collaborative terminals required in collaboration with the first terminal to send the model parameters to the server; and determine the first collaborative terminal based on the determined quantity of the first collaborative terminals and the collaboration relationship.

17. The first terminal according to claim 15, wherein no noise is comprised after superposition of the first encryption noise and the respective second encryption noise.

18. A server used in a federated learning system, wherein the federated learning system includes the server and a plurality of terminals, and the server is configured to store a corresponding collaboration relationship of each terminal in the federated learning system, the server comprising:

a processor; and a memory configured to store computer readable instructions that, when executed by the processor, cause the processor to:

send a to-be-trained first machine learning model to each of the plurality of terminals;

obtain a part or all of model parameters determined by each of the plurality of terminals based on the collaboration relationship and sent by the collaborative terminal, wherein the plurality of model parameters are obtained by each terminal by training the first machine learning model by using local data stored by the terminal, the collaboration relationship indicates a corresponding collaborative terminal of each terminal of the plurality of terminals, and the collaboration relationship is delivered by the server to the terminal;

aggregate the plurality of model parameters to obtain a second machine learning model; and when the server determines that the second machine learning model meets a convergent state, determine the second machine learning model as a trained result of the federated learning system, wherein a part of the model parameters are allocated to a first collaborative terminal, target data is encrypted by using first encryption noise, to obtain an encrypted first model parameter, the part of the model parameters allocated to the first collaborative terminal are encrypted, by using second encryption noise, to obtain encrypted second model parameters, and the server receives the first model parameter via a first terminal, and receives the second model parameter via the first collaborative terminal.

19. The server according to claim 18, wherein the plurality of model parameters are obtained through encryption by using respective encryption noise by each terminal and the collaborative terminal corresponding to each terminal, and before aggregating the plurality of model parameters to obtain the second machine learning model, the processor is further caused to:

determine whether corresponding model parameters of the plurality of terminals comprise noise after superposition;

if no noise is comprised after the superposition, aggregate the plurality of model parameters to obtain the second machine learning model; and perform average calculation on the plurality of model parameters to obtain a global model parameter, and training the first machine learning model based on the global model parameter to obtain the second machine learning model, wherein the processor is further caused to:

if noise is comprised, re-obtain the corresponding model parameters of the plurality of terminals, until the corresponding model parameters of the plurality of terminals that are obtained by the server do not comprise noise after superposition.

20. The server according to claim 18, wherein no noise is comprised after superposition of the first encryption noise and the respective second encryption noise.

* * * * *